(12) United States Patent
Wang et al.

(10) Patent No.: US 6,735,204 B1
(45) Date of Patent: May 11, 2004

(54) ATM CELL MULTIPLEXING APPARATUS AND ATM CELL MULTIPLEXING METHOD

(75) Inventors: Cai Dong Wang, Tokyo (JP); Makoto Fukuyoshi, Tokyo (JP); Masaru Ishizuka, Tokyo (JP); Toru Furuhashi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/398,219

(22) Filed: Sep. 17, 1999

(30) Foreign Application Priority Data

Sep. 17, 1998 (JP) ............................................. 10/262902
Mar. 1, 1999 (JP) ............................................. 11/052807

(51) Int. Cl.$^7$ ............................................. H04L 12/28
(52) U.S. Cl. ............................... 370/395.1; 370/395.21
(58) Field of Search ............................. 370/389, 395.1, 370/395.2, 395.42, 395.6, 400, 412, 421, 428, 466, 465, 229, 230, 239, 235, 236.1, 236.2, 355, 414, 418

(56) References Cited

U.S. PATENT DOCUMENTS

| | | | | |
|---|---|---|---|---|
| 5,818,818 A | * | 10/1998 | Soumiya | 370/252 |
| 5,999,533 A | * | 12/1999 | Peres | 370/395 |
| 6,021,135 A | * | 2/2000 | Ishihara | 370/474 |
| 6,081,504 A | * | 6/2000 | Tanaka | 370/230 |
| 6,219,339 B1 | * | 4/2001 | Doshi | 370/235 |
| 6,430,156 B1 | * | 8/2002 | Park | 370/232 |
| 6,470,014 B1 | * | 10/2002 | Ono | 370/395.1 |
| 6,538,992 B1 | * | 3/2003 | Subbiah | 370/230 |

OTHER PUBLICATIONS

ATM Technologies for IMT–2000, Sep. 8, 1999, APII ATM Summit.*
Kawakami et al. ATM access control scheme for implementing IMT–2000 mobile multimedia {Denshi Joho Tsushin Gakkai Kenkyu Hokoku, vol. 98, No, 18, pp. 41–48 Shingaku Giho, SSE98–6, RCS98–6 (Apr. 1998).

* cited by examiner

*Primary Examiner*—Douglas Olms
*Assistant Examiner*—Ricardo M. Pizarro
(74) *Attorney, Agent, or Firm*—Venable LLP; James R. Burdett

(57) ABSTRACT

An ATM cell multiplexing apparatus comprising an AAL multiplexer for generating ATM cells from AAL type-2 user data, a buffer for cells to be sent for temporarily holding the ATM cells generated, and an ATM multiplexer for ATM-multiplexing ATM cells read out from the buffer for cells to be sent is configured. The buffer for cells to be sent comprises functions for discarding an ATM cell when the transmission wait time therefor exceeds a time-over period, and the AAL multiplexer comprises functions for giving priority to user data for which a higher quality of service is demanded than a discarded ATM cell, as the ATM cell to be generated immediately following the discard.

21 Claims, 18 Drawing Sheets

ATM CELL MULTIPLEXING APPARATUS AND ATM CELL MULTIPLEXING METHOD

BACKGROUND OF THE INVENTION

1. Field of the Invention

This invention relates to an ATM (asynchronous transfer mode) cell multiplexing apparatus, and particularly to such an apparatus and method suitable for providing functions for performing multiplexed transmissions of AAL (ATM adaptation layer) type-2 ATM cells.

2. Description of Related Art

Referenced Literature: Kawakami, et. al.: "IMT-2000 mobairu maruchimedeia wo jitsugen suru ATM akusesu seigyo hoshiki [ATM access control scheme for implementing IMT-2000 mobile multimedia]," Denshi Joho Tsushin Gakkai Kenkyu Hokoku [Research Report of The Institute of Electronics, Information and Communication Engineers (IEICE)], Vol. 98, No. 18, pp 41–48, "Kokan shisutemu [Switching systems]," Shingaku Giho, SSE98-6 RCS98-6 (April, 1998).

In regard to research done conventionally on multiplex-transmission functions of this type, the literature cited above is available. In particular, in FIG. 15 on page 48 in the literature cited, the configuration of a multiplex-transmission apparatus comprising functions for generally controlling the multiplexed transmission of AAL type-1, type-2, and type-5 ATM cells is disclosed. This configuration is shown in FIG. 1 in the present specification.

In general, in AAL type-1 and type-5 ATM cells, it is possible to provide various quality of service (QoS) levels in response to user demand. More specifically, ATM cells are divided into a plurality of QoS classes (priorities), and, by implementing band control according to each class, that QoS class is guaranteed.

The details of this process are now described. With the ATM cell multiplexing apparatus shown in FIG. 1, when an AAL type-1 or type-2 ATM cell is input, the QoS class thereof is identified by a distribution module 1. The distribution module 1 distributes ATM cells to corresponding buffers 2i (where i=1, 2, . . . n) for cells to be sent, provided beforehand for each class, based on the QoS class identified. An ATM multiplexer 3 fetches ATM cells held in the buffers 2i (where i=1, 2, . . . n) for cells to be sent, in accordance with established fetch order and output timing, and transmits them on a transmission path.

In the case of AAL type-2 cells, when the user requires different QoS levels, the QoS levels are divided into classes that represent priorities. In such cases, however, CPS (common part sublayer) packets are input to the ATM cell multiplexing apparatus.

When CPS packets are input to the ATM cell multiplexing apparatus, a CPS packet distribution module 4 identifies the QoS classes of the packets. Then, the CPS packet distribution module 4 distributes the input CPS packets into corresponding buffers 5i (where i=1, 2, . . . n) for packets to be ALL multiplexed, provided beforehand for each class, based on the QoS class identified. The AAL multiprocessing timing and ATM cell transmission timing are synchronized by a timing controller 6. When it is time to output ATM cells, irrespective of the input traffic volume, the timing controller 6 sends a multiprocessing start request to the AAL multiplexer 7. The AAL multiplexer 7 reads out CPS packets according to the receiving timing of processing start request, and performs AAL multiplexing in ATM cell format. When this is done, even when there are not enough CPS packets present in the buffers for packets to be AAL multiplexed to sufficiently fill out an ATM cell payload, the AAL multiplexer 7 sends an ATM cell (AAL 2) partially carrying CPS packets to a buffer 8 for ATM cells (AAL 2) to be sent. Thus the configuration is such that CPS packets of the same QoS are AAL multiplexed in one ATM cell.

However, the prior art is subject to a technical difficulty that will now be described. That is, in the apparatus configuration as described in the foregoing, in guaranteeing QoS levels, there is a problem in that a phenomenon called uncontrolled priority inversion may occur, making it impossible to satisfy the most critical QoS demands of multimedia services.

By priority inversion here is meant a phenomenon whereby data of high priority are made to wait by data of low priority. When, moreover, the maximum value of this forced wait time cannot be logically predicted, this is called an uncontrolled priority inversion. Such uncontrolled priority inversions become serious hindrances in real time systems and multimedia services and the like.

An example of uncontrolled priority inversion is now described, with reference to FIG. 1. In this description, the priority is higher the smaller the number of the QoS class.

Let it be assumed that an AAL type-2 CPS packet for which the QoS class is 1 is held in a buffer 51 for packets to be AAL multiplexed at the point in time when an AAL type-2 CPS packet for which the QoS class is 3 is input to the buffer 8 for ATM cells to be sent.

Conventionally, when QoS levels are guaranteed, a QoS class-1 CPS packet must be AAL multiplexed in ATM cell and sent out after the ATM cells in the buffer 8 for ATM cells to be sent are transmitted. However, when the QoS class in AAL type-5 ATM cells is 2, the priority is higher for the AAL type-5 ATM cells than for the AAL type-2 ATM cells, wherefore the AAL type-5 ATM cells are successively transmitted. Until that transmission is completed, the transmission of AAL type-2 ATM cells is made to wait.

It does not matter that AAL type-2 ATM cells are made to wait because their priority is itself low. However, so long as AAL type-2 ATM cells are not transferred, with the ATM multiplex-transmission apparatus shown in FIG. 2, the AAL type-2 CPS packets of the highest priority (QoS class 1) held in the buffer 5 for packets to be AAL multiplexed may be made to wait for unlimited times, causing uncontrolled priority inversions. In other words, with the conventional apparatus, the buffer 8 for ATM cells (AAL 2) to be sent becomes a bottleneck.

SUMMARY OF THE INVENTION

One object of the invention is to provide an ATM cell multiplexing apparatus and method which can be implemented wherewith uncontrolled priority inversions do not occur.

Another object of the invention is to provide an ATM cell multiplexing apparatus and method which can be implemented wherewith not only do uncontrolled priority inversions not occur, but the cell loss ratio can also be guaranteed.

A further object of the invention is to provide an ATM cell multiplexing apparatus and method which can be implemented wherewith the multiplexing efficiency is superior to that obtainable with the conventional ones.

(A) According to one aspect of the invention, there is provided an ATM cell multiplexing apparatus comprising: an AAL multiplexer for generating ATM cells from AAL type-2 user data; a buffer for cells to be sent for temporarily holding generated ATM cells; and an ATM multiplexer for ATM-multiplexing ATM cells read out from the buffer for cells to be sent; wherein the buffer for cells to be sent comprises functions for discarding ATM cells when the transmission waiting period exceeds a time-over period; and the AAL multiplexer comprises functions for giving priority to user data for which a higher quality of service is demanded than for the discarded ATM cells, which data are ATM cells generated immediately after the discarding.

According to the second aspect of the invention, there is provided an ATM cell multiplexing apparatus comprising: AAL multiplexers for generating ATM cells from AAL type-2 user data; and buffers for cells to be sent for temporarily holding generated AAL type-2 ATM cells; wherein: said AAL multiplexers and said buffers for cells to be sent are comprised in a plurality of sets for each quality of service; ATM cells read out from said buffers for cells to be sent are ATM-multiplexed by said ATM multiplexers; and said buffers for cells to be sent, respectively, comprise functions for discarding ATM cells when transmission waiting periods thereof exceed time-over periods set for each quality of service.

According to the third aspect of the invention, there is provided an ATM cell multiplexing apparatus comprising: a plurality of sets of buffers for packets to be AAL multiplexed provided for each quality of service; an AAL multiplexer for generating ATM cells from AAL type-2 user data read out from said buffers for packets to be AAL multiplexed; a buffer for cells to be sent for temporarily holding ATM cells generated; and an ATM multiplexer for ATM-multiplexing ATM cells read out from said buffers for cells to be sent; wherein: said buffers for packets to be AAL multiplexed, respectively, comprise functions for directly notifying said ATM multiplexer, when user data awaiting multiplexing are present, of quality of service corresponding to those user data.

According to the fourth aspect of the invention, there is provided an ATM cell multiplexing apparatus comprising: a plurality of sets of buffers for packets to be AAL multiplexed provided for each quality of service; an AAL multiplexer for generating ATM cells from AAL type-2 user data read out from said buffers for packets to be AAL multiplexed; a buffer for cells to be sent for temporarily holding ATM cells generated; an ATM multiplexer for ATM-multiplexing ATM cells read out from said buffers for cells to be sent; a priority inheritance module for comparing quality of service notified of from said buffers for packets to be AAL multiplexed holding user data awaiting multiplexing against quality of service of ATM cell held in said buffer for cells to be sent, and, when quality of service of said user data is higher than quality of service of said ATM cell, causing quality of service of said user data to be inherited as quality of service of said ATM cell; and a quality of service recovery module for determining multiplexing order and for restoring quality of service of ATM cells read into said ATM multiplexer from said buffer for cells to be sent to original pre-inheritance quality of service.

According to the fifth aspect of the invention, there is provided an ATM cell multiplexing apparatus comprising: a plurality of sets of buffers for packets to be AAL multiplexed provided for each quality of service; an AAL multiplexer for generating ATM cells from AAL type-2 user data read out from said buffers for packets to be AAL multiplexed; a buffer for cells to be sent for temporarily holding ATM cells generated; an ATM multiplexer for ATM-multiplexing ATM cells read out from said buffers for cells to be sent; and a temporary priority inheritance module for comparing quality of service notified of from said buffers for packets to be AAL multiplexed holding user data awaiting multiplexing against quality of service of ATM cell held in said buffer for cells to be sent, and, when quality of service of said user data is higher than quality of service of said ATM cell, notifying said ATM multiplexer of said quality of service of said user data as quality of service of said ATM cell.

In a preferred embodiment of the ATM cell multiplexing apparatus according to the fourth aspect of the invention, said buffers for packets to be AAL multiplexed notify said priority inheritance module of quality of service only when wait queue length for user data held therein exceeds a critical level set for each quality of service that corresponds to said user data.

In another preferred embodiment of the ATM cell multiplexing apparatus according to the fourth aspect of the invention, said buffers for packets to be AAL multiplexed notify said priority inheritance module of quality of service only when wait period for user data held therein exceeds a critical level set for each quality of service that corresponds to said user data.

In another preferred embodiment of the ATM cell multiplexing apparatus according to the fourth aspect of the invention, said buffers for packets to be AAL multiplexed notify said priority inheritance module of quality of service only when either wait queue length for user data held therein or wait period for user data held therein exceeds a respective corresponding critical level set for each quality of service that corresponds to said user data.

In a preferred embodiment of the ATM cell multiplexing apparatus according to the fifth aspect of the invention, said buffers for packets to be AAL multiplexed notify said temporary priority inheritance module of quality of service only when wait queue length for user data held therein exceeds a critical level set for each quality of service that corresponds to said user data.

In another preferred embodiment of the ATM cell multiplexing apparatus according to the fifth aspect of the invention, said buffers for packets to be AAL multiplexed notify said temporary priority inheritance module of quality of service only when wait period for user data held therein exceeds a critical level set for each quality of service that corresponds to said user data.

In another preferred embodiment of the ATM cell multiplexing apparatus according to the fifth aspect of the invention, said buffers for packets to be AAL multiplexed notify said temporary priority inheritance module of quality of service only when either wait queue length for user data held therein or wait period for user data held therein exceeds a respective corresponding critical level set for each quality of service that corresponds to said user data.

According to the sixth aspect of the invention, there is provided an ATM cell multiplexing apparatus comprising: a plurality of sets of buffers for packets to be AAL multiplexed provided for each quality of service; a plurality of sets of recovery buffers forming pairs with said buffers for packets to be AAL multiplexed; an AAL multiplexer for generating ATM cells from AAL type-2 user data read out from said buffers for packets to be AAL multiplexed; a buffer for cells to be sent for temporarily holding ATM cells generated; and an ATM multiplexer for ATM-multiplexing ATM cells read out from said buffers for cells to be sent; wherein: said buffer for cells to be sent comprises functions for discarding ATM cells when transmission wait period therefor exceeds a time-over period; and said AAL multiplexer comprises:

functions for giving priority to user data having a quality of service higher than quality of service of discarded ATM cell user data, as priority of ATM cells to be generated immediately after discarding; and functions for, when generating next ATM cell from user data having same quality of service as quality of service of discarded ATM cell, reading out same user data as discarded ATM cell from recovery buffer corresponding to that quality of service, and again generating same ATM cell from said user data.

According to the seventh aspect of the invention, there is provided an ATM cell multiplexing apparatus comprising: a plurality of sets of buffers for packets to be AAL multiplexed provided for each quality of service; a plurality of sets of recovery buffers forming pairs with said buffers for packets to be AAL multiplexed; an AAL multiplexer for generating ATM cells from AAL type-2 user data read out from said buffers for packets to be AAL multiplexed; a buffer for cells to be sent for temporarily holding ATM cells generated; and an ATM multiplexer for ATM-multiplexing ATM cells read out from said buffers for cells to be sent; wherein: said buffer for cells to be sent comprises functions for discarding ATM cell currently held therein when quality of service of buffer for packets to be AAL multiplexed requesting ATM cell discard is higher than quality of service of said ATM cell held therein; said buffers for packets to be AAL multiplexed each comprises functions for requesting said buffer for cells to be sent to discard ATM cell only when wait queue length for user data held in that buffer for packets to be AAL multiplexed exceeds a critical level set for each quality of service corresponding to those user data; and said AAL multiplexer comprises: functions for giving priority to user data having a quality of service higher than quality of service of discarded ATM cell user data, as priority of ATM cell to be generated immediately after discarding; and functions for, when generating next ATM cell from user data having same quality of service as quality of service of discarded ATM cell, reading out same user data as discarded ATM cell from recovery buffer corresponding to that quality of service, and again generating same ATM cell from said user data.

According to the eighth aspect of the invention, there is provided an ATM cell multiplexing apparatus comprising: a plurality of sets of buffers for packets to be AAL multiplexed provided for each quality of service; a plurality of sets of recovery buffers forming pairs with said buffers for packets to be AAL multiplexed; an AAL multiplexer for generating ATM cells from AAL type-2 user data read out from said buffers for packets to be AAL multiplexed; a buffer for cells to be sent for temporarily holding ATM cells generated; and an ATM multiplexer for ATM-multiplexing ATM cells read out from said buffers for cells to be sent; wherein: said buffer for cells to be sent comprises functions for discarding ATM cell currently held therein when quality of service of buffer for packets to be AAL multiplexed requesting ATM cell discard is higher than quality of service of said ATM cell held therein; said buffers for packets to be AAL multiplexed each comprises functions for requesting said buffer for cells to be sent to discard ATM cell only when wait time for user data held in that buffer for packets to be AAL multiplexed exceeds a critical level set for each quality of service corresponding to those user data; and said AAL multiplexer comprises: functions for giving priority to user data having a quality of service higher than quality of service of discarded ATM cell user data, as priority of ATM cell to be generated immediately after discarding; and functions for, when generating next ATM cell from user data having same quality of service as quality of service of discarded ATM cell, reading out same user data as discarded ATM cell from recovery buffer corresponding to that quality of service, and again generating same ATM cell from said user data.

According to the nineth aspect of the invention, there is provided an ATM cell multiplexing apparatus comprising: a plurality of sets of buffers for packets to be AAL multiplexed provided for each quality of service; a plurality of sets of recovery buffers forming pairs with said buffers for packets to be AAL multiplexed; an AAL multiplexer for generating ATM cells from AAL type-2 user data read out from said buffers for packets to be AAL multiplexed; a buffer for cells to be sent for temporarily holding ATM cells generated; and an ATM multiplexer for ATM-multiplexing ATM cells read out from said buffers for cells to be sent; wherein: said buffer for cells to be sent comprises functions for discarding ATM cell currently held therein when quality of service of buffer for packets to be AAL multiplexed requesting ATM cell discard is higher than quality of service of said ATM cell held therein; said buffers for packets to be AAL multiplexed each comprises functions for requesting said buffer for cells to be sent to discard ATM cell only when either wait queue length for user data held in that buffer for packets to be AAL multiplexed or wait time for user data held therein exceeds a critical level set respectively for each quality of service corresponding to those user data; and said AAL multiplexer comprises: functions for giving priority to user data having a quality of service higher than quality of service of discarded ATM cell user data, as priority of ATM cell to be generated immediately after discarding; and functions for, when generating next ATM cell from user data having same quality of service as quality of service of discarded ATM cell, reading out same user data as discarded ATM cell from recovery buffer corresponding to that quality of service, and again generating same ATM cell from said user data.

According to the tenth aspect of the invention, there is provided an ATM cell multiplexing apparatus comprising: an AAL multiplexer for generating ATM cells from AAL type-2 user data; a buffer for cells to be sent for temporarily holding generated ATM cells; and an ATM multiplexer for ATM-multiplexing ATM cells read out from said buffer for cells to be sent; wherein: said buffer for cells to be sent comprises functions for fixing quality of service demanded for ATM cell held therein to a fixed value determined irrespective of the quality of service applied to user data prior to multiplexing.

According to the eleventh aspect of the invention, there is provided an ATM cell multiplexing apparatus comprising: packet distribution means for outputting input packets after distributing them in quality classes; packet accumulation means, connected to said packet distribution mans, for accumulating packets in each of said quality classes and outputting them according to read-out timing; packet multiplexing means, connected to said packet accumulation means, for multiplexing packets into ATM cells and outputting same; ATM cell distribution means, connected to said packet multiplexing means, for outputting ATM cells after distributing them in quality classes; ATM cell accumulation means, connected to said ATM cell distribution means, for accumulating ATM cells in quality classes and outputting them according to read-out timing; and ATM cell multiplexing means, connected to said ATM cell accumulation means, and for multiplexing ATM cells and outputting same.

In a preferred embodiment of the ATM cell multiplexing apparatus according the eleventh aspect of the invention, said packets are AAL type-2 CPS packets.

In another preferred embodiment of the ATM cell multiplexing apparatus according the eleventh aspect of the invention, said ATM cell distribution means take input AAL type-1, type-2, and type-5 ATM cells and distribute them in quality classes.

In another preferred embodiment of the ATM cell multiplexing apparatus according the eleventh aspect of the invention, quality class or classes handled by said packet distribution means and said ATM cell distribution means are same class or classes.

According to the twelfth aspect of the invention, there is provided an ATM cell multiplexing method wherein: input CPS packets are distributed by packet distribution means based on quality classes; CPS packets distributed on basis of said quality classes are accumulated in packet accumulation means in order input; said CPS packets are read out from said packet accumulation means and multiplexed in ATM cells by packet multiplexing means; AAL type-2 ATM cells wherein said CPS packets are multiplexed are distributed on basis of quality classes by ATM cell distribution means together with ATM cells of other AAL types; ATM cells distributed on basis of said quality classes are accumulated in ATM cell accumulation means; and said ATM cells are read out from said ATM cell accumulation means and multiplexed by ATM cell multiplexing means.

In a preferred embodiment of the ATM cell multiplexing method according the twelfth aspect of the invention, an awaiting-multiplexing timer is started upon arrival of a CPS packet, and, when a predetermined awaiting-multiplexing time is reached, or when quantity of input CPS packets accumulated in said packet accumulation means sufficiently fills an ATM cell payload, said CPS packets are read out from said packet accumulation means and multiplexed in an ATM cell.

In another preferred embodiment of the ATM cell multiplexing method according to the twelfth aspect of the invention, when ATM cells are input to ATM cell multiplexing means from ATM cell accumulation means, multiprocessing is performed after determining priority or priorities among classes of ATM cells belonging to AAL type-1, type-2, or type-5 in cases where demanded band does not exceed band that can be provided, and multiprocessing is performed based on priorities in cases where demanded band does exceed band that can be provided.

BRIEF DESCRIPTION OF THE DRAWINGS

The forgoing and other objects, features and advantages of the present invention will be better understood from the following description taken in connection with the accompanying drawings, in which:

FIG. 14 is a functional block configuration diagram of a fourteenth embodiment of an ATM cell multiplexing apparatus according to the invention;

DESCRIPTION OF THE PREFERRED EMBODIMENTS

With reference to the accompanying drawings, embodiments of the present invention will be hereinafter described. The description will be given to a case where the present invention is applied to an ATM cell multiplexing apparatuses comprising AAL type-1, type-2, and type-5 ATM cell multiplex-transmission functions. In the descriptions which follow, the priority is assumed to be higher the smaller is the QoS class number.

(A) First Embodiment
(A-1) Apparatus Configuration

Figure 1:
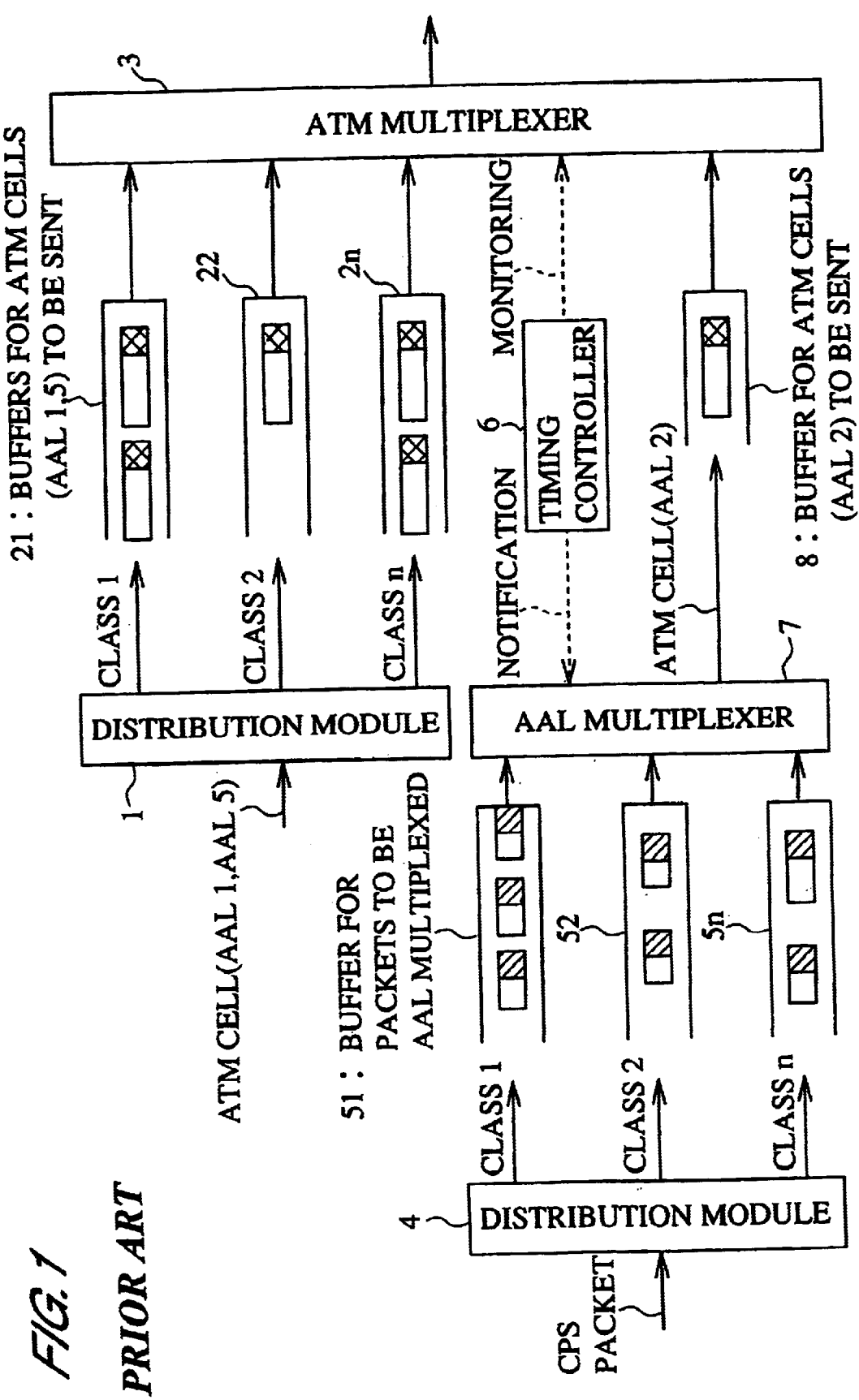
FIG. 1 is a functional block configuration diagram of a conventional apparatus.
Figure 2:
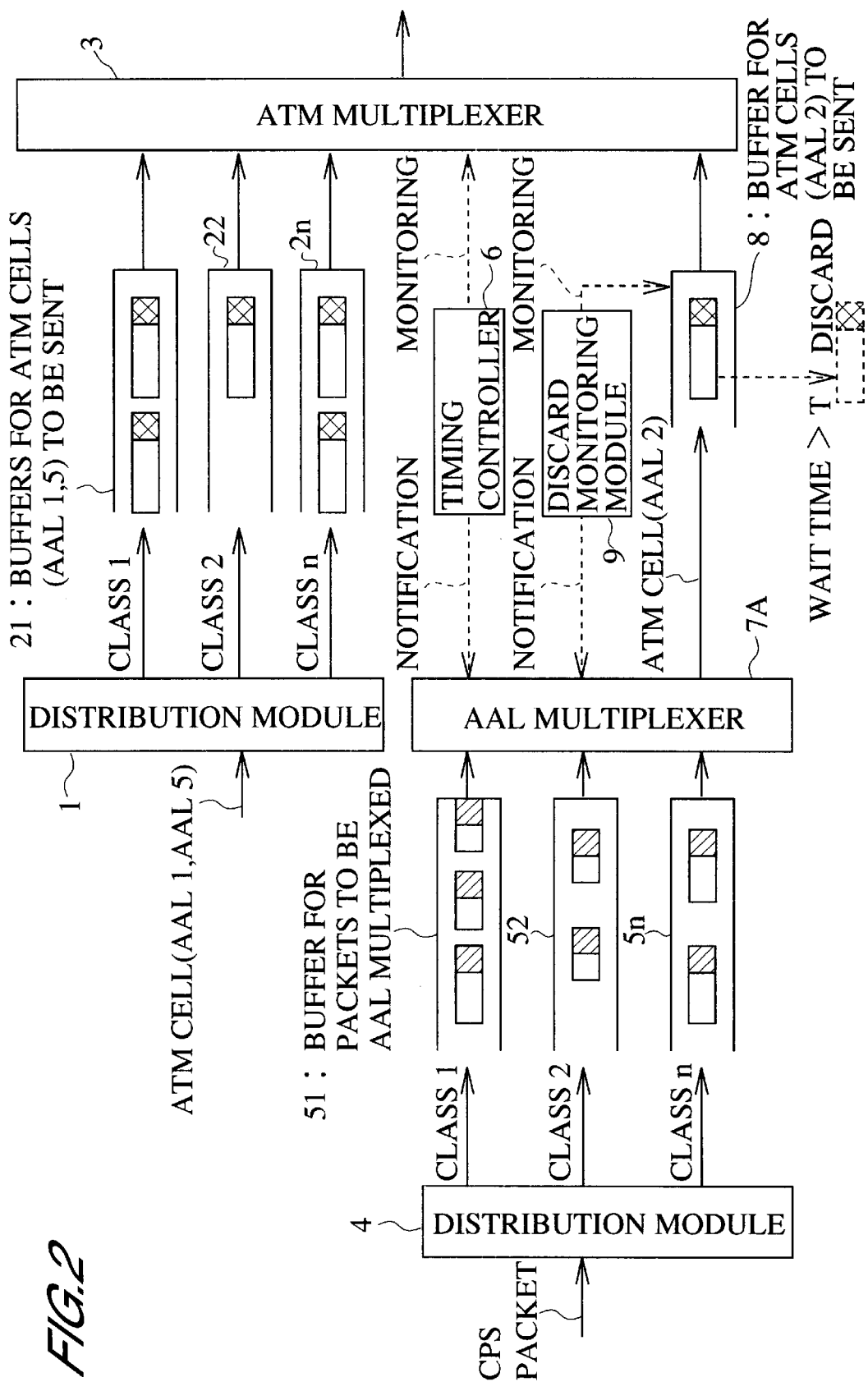
FIG. 2 is a functional block configuration diagram of a first embodiment of an ATM cell multiplexing apparatus according to the invention.

A functional block configuration diagram of an ATM cell multiplexing apparatus according to the first embodiment is shown in FIG. 2. Here, in FIG. 2, parts that are the same as or that correspond to the parts shown in FIG. 1, are designated by the same or corresponding symbols, respectively.

There are two points of difference between the conventional apparatus and the ATM cell multiplexing apparatus of this embodiment. First, a buffer 8 for ATM cells (AAL 2) to be sent is provided with a cell discarding function, and, second, a discard monitoring module 9 is provided as means for monitoring such cell discarding.

The functional configuration of each part is now described, with the focus on the configurational differences noted.

A distribution module 1 is for distributing ATM cells of AAL type-1 and 5. When ATM cells are input, the distribution module 1 distributes them to corresponding buffers 2i (where i=1, 2, . . . n) for ATM cells (AAL 1 and 5) to be sent, according to the QoS class thereof.

The buffers 2i (where i=1, 2, ... n) for ATM cells (AAL 1 and 5) to be sent are provided in a number that corresponds with the number of QoS classes (n buffers in the case shown in FIG. 2). These are FIFO buffers each capable of accommodating a plurality of ATM cells.

A CPS packet distribution module 4 is for distributing CPS packets wherein the AAL type is 2. When CPS packets are input, the CPS packet distribution module 4 distributes them to the corresponding buffers 5i (where i=1, 2, ... n) for packets to be AAL multiplexed according to the QoS class thereof.

The buffers 5i (where i=1, 2, ... n) for packets to be AAL multiplexed are also provided in a number corresponding to the number of QoS classes (n buffers in the case shown in FIG. 2), and these are also FIFO buffers each capable of accommodating a plurality of ATM cells. When one of these buffers 5i for packets to be AAL multiplexed outputs a CPS packet to an AAL multiplexer 7A, it also simultaneously outputs QoS class information specific to that buffer.

A timing controller 6 is for synchronizing the AAL multiprocessing timing and the ATM cell transmission timing. This timing controller 6 also sends multiprocessing start requests to the AAL multiplexer 7A, in accordance with the ATM cell (AAL 2) output timing, irrespective of the input traffic volume.

The AAL multiplexer 7A, under normal circumstances (when there is no notification of cell discard), is the means for determining the buffer 5 for packets to be AAL multiplexed that is to read out the CPS packets so that the band demanded for each QoS class is guaranteed, as well as the means for multiplexing the read CPS packets in an ATM cell format and outputting them to a buffer 8A for ATM cells (AAL 2) to be sent. When a cell discard notification has been sent from the discard monitoring module 9, however, the AAL multiplexer 7A designates the next CPS packet to be multiplexed having the highest priority (i.e. the lowest QoS class), reads this out, and multiplexes it to an ATM cell. It is also possible to discretionarily select any CPS packet of high priority from the discarded CPS packets.

The buffer 8A for ATM cells (AAL 2) to be sent is a buffer having the capacity to hold (or store) one ATM cell. This buffer 8A for ATM cells to be sent sends out held (or stored) ATM cells based on read-out requests from the ATM multiplexer 3. This buffer 8A has a function for discarding the ATM cell when the holding (or storing) time therefor becomes longer than a prescribed time-over period T without a read-out.

The discard monitoring module 9 constitutes means for determining whether or not an ATM cell discard has occurred in the buffer 8A for ATM cells to be sent. When an ATM cell discard is confirmed, the discard monitoring module 9 sends a notification to that effect to the AAL multiplexer 7A positioned in a previous stage.

The ATM multiplexer 3 constitutes means for multiplexing and outputting the ATM cells input, respectively, from the buffers 2 for ATM cells (AAL 1 and 5) to be sent and from the buffer 8A for ATM cells (AAL 2) to be sent. Here, the ATM multiplexer 3, when the demanded band does not exceed the band that can be provided, determines priorities among the classes of ATM cells belonging to AAL type-1 and 5, and performs multiprocessing, at times other than those allotted to AAL type-2 ATM cells. When the demanded band does exceed the band that can be provided, the ATM multiplexer 3 performs multiprocessing based on the priority.

(A-2) Multiplexing Operations

The multiplexing operations in the ATM multiplex-transmission apparatus having such a configuration will be hereinafter described. For this embodiment, moreover, because of the characteristics resident in the AAL type-2 ATM multiplex-transmission functions, the description focuses on those multiplex-transmission operation.

The ATM multiplex-transmission apparatus, when AAL type-2 user data (CPS packets) are input, sends these to the CPS packet distribution module 4 and executes distribution processing based on the QoS class. The CPS packets are thus written, in the order input, into the corresponding buffers 5 for packets to be multiplexed.

The timing controller 6 synchronizes the AAL multiprocessing timing and the ATM cell (AAL 2) transmission timing. When it is time to output ATM cells (AAL 2), irrespective of the input traffic volume, the timing controller 6 sends a multiprocessing start request to the AAL multiplexer 7A. In the AAL multiplexer 7A the CPS packets are read out in accordance with the notified process start timing and the CPS packets so read are multiply included in an ATM cell (AAL 2).

When this is done, even when there are not enough CPS packets present in the buffers 5 for packets to be AAL multiplexed to sufficiently fill out an ATM cell payload, the CPS packets are included in part of the ATM cell (AAL 2) by the AAL multiplexer, and then the ATM cell (AAL 2) is sent to the buffer 8A for ATM cells (AAL 2) to be sent from the AAL multiplexer 7A.

Here, the ATM cells (AAL 2) written to the buffer 8A for ATM cells (AAL 2) to be sent are read out and ATM-multiplexed with timing synchronized to the read operation so long as the band demanded for the ATM multiplexer 3 does not exceed the band that can be supplied.

However, when the demanded band does exceed the band that can be provided, and ATM cell multiprocessing in the ATM multiplexer 3 is being performed in the order of priority, the ATM cells (AAL 2) are not sent out unless their QoS class is higher than the QoS class of the other ATM cells (AAL 1 and 5).

Here, the ATM cells (AAL 2) written to the buffer 8A for ATM cells (AAL 2) to be sent are output immediately if their QoS class is higher than that of the other ATM cells (AAL 1 and 5). When, on the other hand, these ATM cells (AAL 2) have a QoS class that is lower than the QoS class of the other ATM cells (AAL 1 and 5), the ATM cells (AAL 2) are not readout and, accordingly, a situation ensues wherein the wait period exceeds the prescribed time-over period T.

In this case, the buffer 8A for ATM (AAL 2) cells to be sent discards the ATM cell (AAL 2) currently held and enters a state preparative to transmitting CPS packets of high priority.

When such ATM cell discarding occurs, the discard monitoring module 9 detects this and notifies the AAL multiplexer 7A of the occurrence of that ATM cell discarding. When it has confirmed that an ATM cell has been discarded, the AAL multiplexer 7A reads out the CPS packets of the lowest QoS class (i.e. highest priority) from among the CPS packets stored in the buffers 5 for packets to be AAL multiplexed and AAL-multiplexes these in ATM cell format.

As a result, the priority of the ATM cells held in the buffer 8A for ATM cells (AAL 2) to be sent becomes higher, in general, than the immediately previous priority (although it is also possible that that priority will be the same). The ATM multiplexer 3 performs priority determination between the newly replaced ATM cells (AAL 2) and the other ATM cells (AAL 1 and 5), and, based on the results of that determination, performs ATM multiplexing in the prescribed order. When this is done, if the priority of the AAL type-2

ATM cells is higher than that of the other types of ATM cells (AAL 1 and 5), those AAL type-2 ATM cells will be transmitted without fail, even when the demanded band exceeds the band that can be provided. This transmission ability is the major point of difference with the conventional apparatus.

(A-3) Benefits of the First Embodiment

According to the ATM cell multiplexing apparatus of the first embodiment, the configuration is made so that, when the wait period for an ATM cell (AAL 2) in the buffer 8A for ATM cells (AAL 2) to be sent exceeds a prescribed time-over period T, the ATM cells (AAL 2) are discarded. Therefore, the danger of ATM cells of relatively high priority (i.e. low QoS class) being made to wait for an unlimited period of time by ATM cells of relatively low priority (i.e. high QoS class) can be definitely eliminated (so that no uncontrolled priority inversions occur).

Furthermore, not only can the integrated multiplexing of AAL type-1 and type-5 ATM cells be made possible, but QoS classes (priorities) can be guaranteed as well.

(B) Second Embodiment (B-1) Apparatus Configuration

Figure 3:
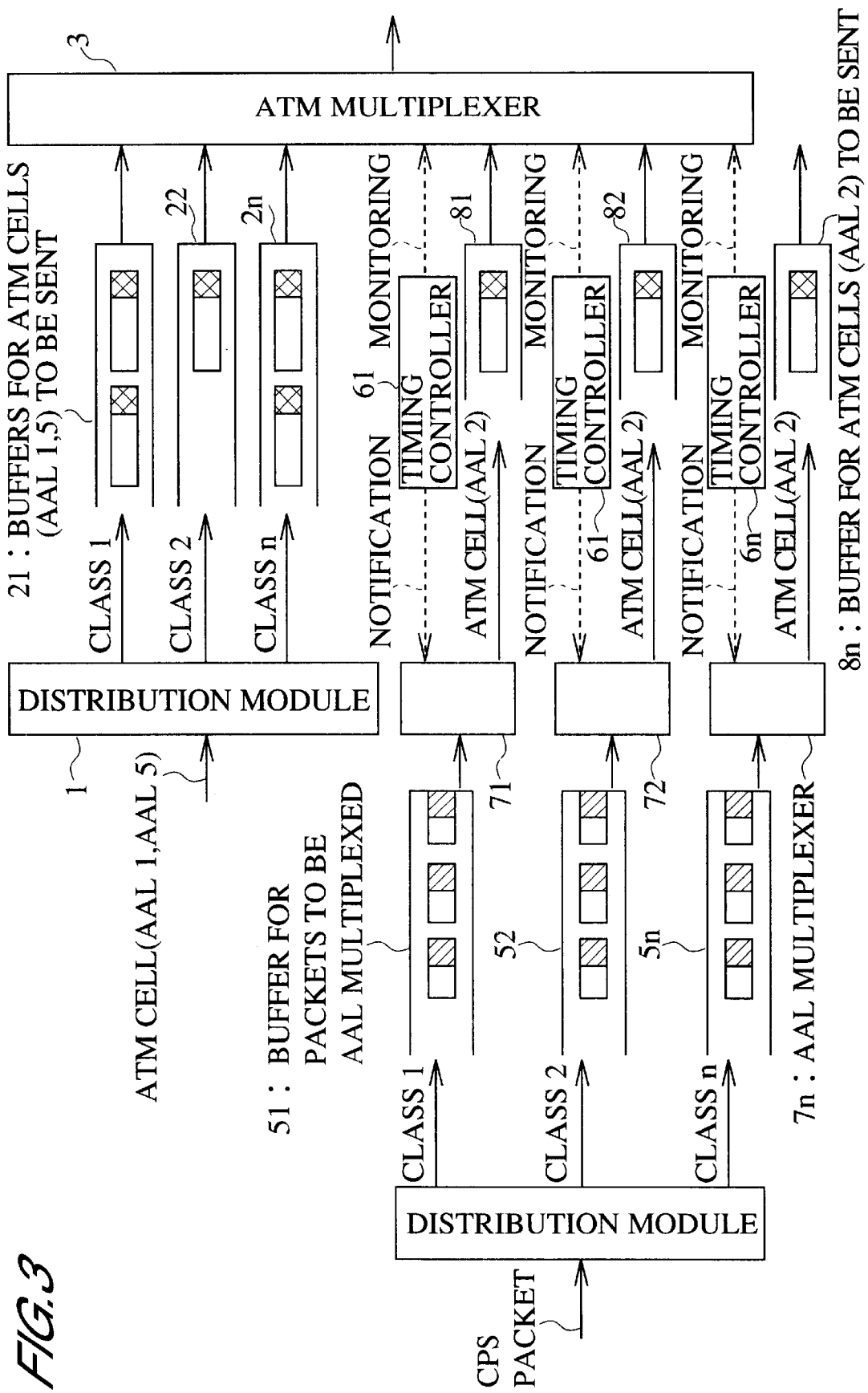
FIG. 3 is a functional block configuration diagram of a second embodiment of an ATM cell multiplexing apparatus according to the invention.

A functional block configuration diagram of an ATM cell multiplexing apparatus pertaining to this embodiment is shown in FIG. 3. In this figure, parts that are the same as or that correspond to the parts shown in FIG. 1, are designated by the same or corresponding symbols, respectively.

The difference between the conventional apparatus and the ATM cell multiplexing apparatus in this embodiment is that, in this embodiment, timing controllers 6i, AAL multiplexers 7i, and buffers 8i (where i=1, 2, ... n) for ATM cells (AAL 2) to be sent are provided separately for each QoS class, wherewith ATM cells (AAL 2) separated by class are synthesized. In the conventional apparatus, incidentally, a timing controller 6, AAL multiplexer 7, and buffer 8 for ATM cells (AAL 2) to be sent are provided commonly for all classes.

The functional configuration of each part will be described with an emphasis on the configurational differences noted. The ATM cell multiplexing apparatus in this embodiment, moreover, is configured with a distribution module 1, buffers 2i (where i=1, 2, ... n) for ATM cells (AAL 1 and 5) to be sent, an ATM multiplexer 3, a CPS packet distribution module 4, buffers 5i (where i=1, 2, ... n) for packets to be AAL multiplexed, timing controllers 6i (where i=1, 2, .... n), AAL multiplexers 7i (where i=1, 2, ... n), and buffers 8i (where i=1, 2, ... n) for ATM cells (AAL 2) to be sent.

Of these components, the timing controllers 6i are for synchronizing the AAL multiprocessing timing and the ATM cell transmission timing. Each of these timing controllers 6i is provided for sending multiprocessing start requests according to the output timing of the corresponding QoS class to the corresponding AAL multiplexer 7i, irrespective of the input traffic volume.

The AAL multiplexers 7i are provided so that, every time one of them receives a multiprocessing start request from a timing controller 6i, that AAL multiplexer 7i executes multiprocessing on CPS packets held in the corresponding buffer 5i for packets to be AAL multiplexed, and sends them to the corresponding buffer 8i for ATM cells (AAL 2) to be sent.

Each buffer 8i for ATM cells (AAL 2) to be sent is a buffer which has the capacity to accommodate one ATM cell. This buffer 8A for ATM cells to be sent sends out the ATM cell held therein based on a read-out request from the ATM multiplexer 3. In the buffers 8i for ATM cells (AAL 2) to be sent in this embodiment, moreover, a separate time-over period Ti (where i=1, 2, ... n) corresponding to each QoS class is set, so that, when the wait period becomes longer than a given time-over period Ti, the ATM cell held is discarded. This function makes it possible, in this embodiment, to also guarantee the cell loss rate.

(B-2) Multiplexing Operations

The multiplexing operations in the ATM multiplex-transmission apparatus having such a configuration will be described. For this embodiment, moreover, because of the characteristics resident in the AAL type-2 ATM multiplex-transmission functions, the description focuses on those multiplex-transmission operation.

The ATM multiplex-transmission apparatus, when AAL 2 user data (CPS packets) are input, sends these to the CPS packet distribution module 4 and executes distribution processing based on the QoS class. The CPS packets are thus written, in the order input, into the buffers 5 for packets to be multiplexed corresponding to these CPS packets.

The n timing controllers 6i (where i=1, 2, ... n) corresponding to the QoS classes synchronize the AAL multi-processing timing and the ATM cell (AAL 2) transmission timing for each corresponding QoS class, respectively. When it is time to output ATM cells (AAL 2) in a corresponding QoS class, irrespective of the input traffic volume, the timing controllers 6i send multiprocessing start requests to the corresponding AAL multiplexers 7i. In each of the AAL multiplexers 7I, the CPS packets are multiply included in ATM cells (AAL 2) in accordance with the notified process start timing. That is, the AAL multiplexers 7I make the multiple inclusion of the CPS packets in the ATM cells (AAL 2).

When this is done, even when there are not enough CPS packets present in the buffers 5i for packets to be AAL multiplexed to sufficiently fill out an ATM cell payload, the CPS packets are included in part of an ATM cell (AAL 2), by the AAL multiplexer 7i, and then the ATM cell (AAL 2) is sent to the buffers 8i for ATM cells (AAL 2) to be sent from the AAL multiplexer 7i. Thus a plurality of ATM cells (AAL 2) (or, in some cases, one such ATM cell) having different QoS classes is placed in an awaiting-multiplexing state.

The ATM multiplexer 3 handles these multiple ATM cells (AAL 2) (or single ATM cell in some cases) and the AAL class 1 and class 5 ATM cells equally and performs pre-scribed multiprocessing.

Here, when the demanded band does not exceed the band that can be supplied, AAL type-2 ATM cells selected so that they fill out the bands for the QoS classes are multiplexed with send timing allotted to the AAL type-2, and AAL type-1 and type-5 ATM cells selected so that they fill out the bands for the QoS classes are multiplexed with send timing allotted to the AAL type-1 and type-5 ATM cells.

When the demanded band does exceed the band that can be supplied, on the other hand, those ATM cells (AAL 1, 2, and 5) to be sent having high priority are multiplexed and transmitted on a priority basis. Thereupon, with this embodiment, even if a plurality of ATM cells having different QoS classes is waiting to be sent, as AAL type-2 ATM cells, it is possible to avoid situations where, due to the presence of ATM cells (AAL 2) of low priority, the transmission of ATM cells (AAL 2) having higher priority than other ATM cells (AAL 1 and 5) is delayed.

Furthermore, because priority is given to ATM cells (AAL 2) of high priority, in some cases there will be ATM cells (AAL 2) having relatively low priority, with a later sending order, even though they are stored earlier in the buffers 8i for ATM cells (AAL 2) to be sent than the ATM cells (AAL 2) of high priority. In such cases, those ATM cells (AAL 2) can await the next send timing without being discarded so long as the time-over period Ti set for that QoS class is not exceeded. As a consequence, the possibility of ATM cells (AAL 2) being unnecessarily discarded can be lowered, and it is possible to simultaneously establish both QoS classes and cell loss rates.

(B-3) Benefits of the Second Embodiment

According to the ATM cell multiplexing apparatus of the second embodiment, the AAL type-2 ATM cell processing module has provided therein timing controllers 6i, AAL multiplexers 7i, and buffers 8i for ATM cells (AAL 2) to be sent that correspond, respectively, with the QoS classes, and each of the buffers 8I for ATM cells to be sent has set time-over period Ti specific to each QoS class. Accordingly, it becomes possible to guarantee ATM cell (AAL 2) loss rates while simultaneously guaranteeing QoS classes (priorities).

(C) Third Embodiment (C-1) Apparatus Configuration

Figure 4:
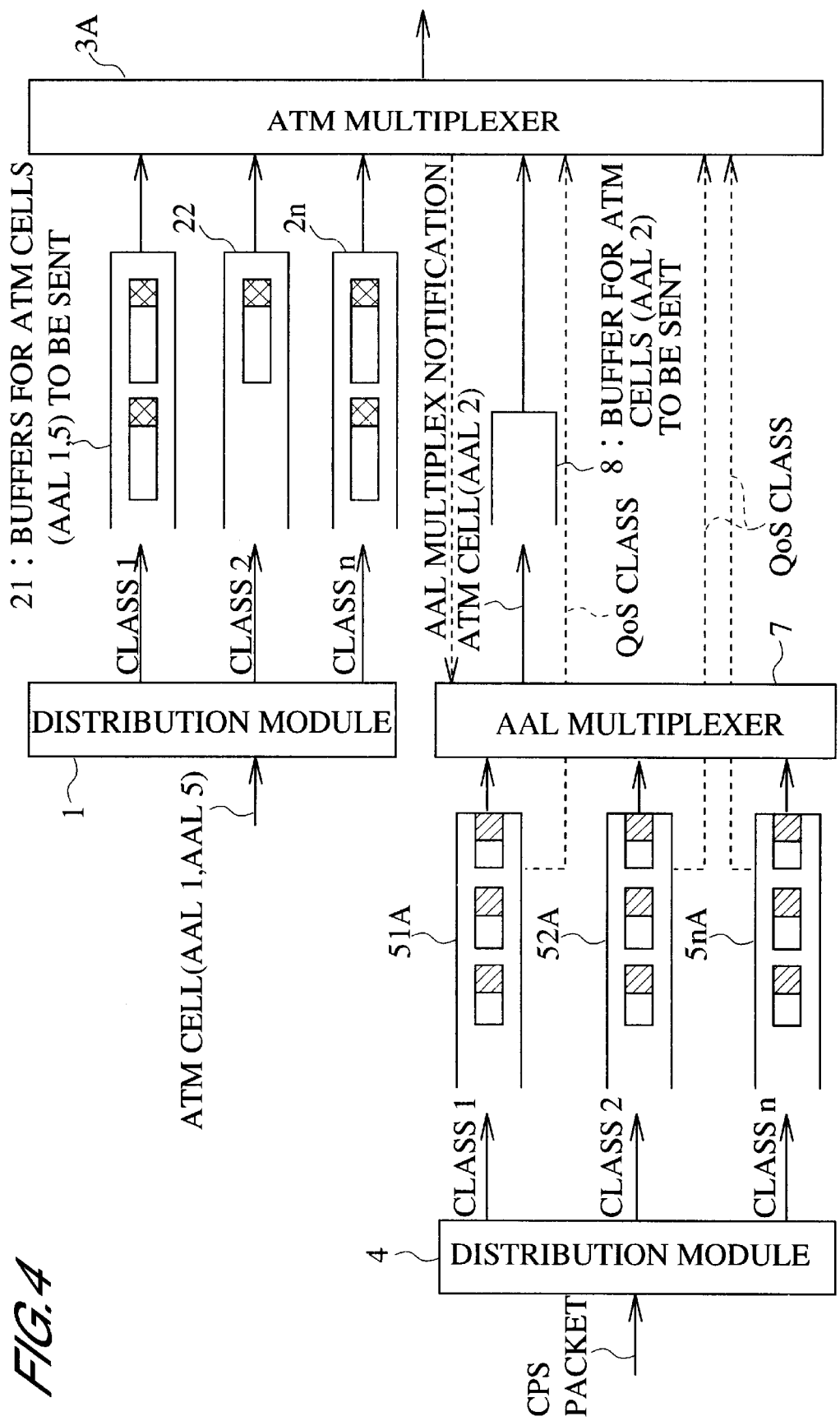
FIG. 4 is a functional block configuration diagram of a third embodiment of an ATM cell multiplexing apparatus according to the invention.

A functional block configuration diagram of an ATM cell multiplexing apparatus pertaining to this embodiment is shown in FIG. 4. In this figure, parts that are the same as or that correspond to the parts shown in FIG. 1, are designated by the same or corresponding symbols, respectively.

The differences between the conventional apparatus and the ATM cell multiplexing apparatus in the third embodiment are that, in the third embodiment, an ATM multiplexer 3A directly controls the presence of CPS packets awaiting multiplexing in buffers 5iA for packets to be AAL multiplexed, and the priorities and demanded bands for ATM cells awaiting multiplexing are taken into consideration in controlling the AAL multiplexing operations.

The functional configuration of each part is now described with an emphasis on the configurational differences noted. The ATM cell multiplexing apparatus in this embodiment, moreover, is configured with a distribution module 1, buffers 2i for ATM cells (AAL 1 and 5) to be sent, an ATM multiplexer 3A, a CPS packet distribution module 4, buffers 5iA for packets to be AAL multiplexed, an AAL multiplexer 7, and a buffer 8 for ATM cells (AAL 2) to be sent.

Of these components, the ATM multiplexer 3A is used for effecting the ATM multiplexing of ATM cells (AAL 1, 2, and 5) of different type, while directly controlling the presence of the CPS packets awaiting multiplexing in the buffers 5iA for packets to be AAL multiplexed.

The buffers 5iA (where i=1, 2, . . . n) for packets to be AAL multiplexed are FIFO buffers capable of accommodating a plurality of ATM cells, provided according to the number of QoS classes (n buffers in the case shown in FIG. 4). Each buffer 5iA for packets to be AAL multiplexed, moreover, is configured so that it directly outputs QoS class information specific to that buffer to the ATM multiplexer 3A when either a new CPS packet is written internally therein or a CPS packet is present internally therein.

In this embodiment, furthermore, there is only one buffer 8 for ATM cells (AAL 2) to be sent, provided commonly for all QoS classes. In this embodiment, moreover, the configuration does not employ a timing controller such as is used in the first and second embodiments.

(C-2) Multiplexing Operations

The multiplexing operations in the ATM multiplex-transmission apparatus having such a configuration will be described. For this embodiment, moreover, because of the characteristics resident in the AAL type-2 ATM multiplex-transmission functions, the description focuses on those multiplex-transmission operation.

The ATM multiplex-transmission apparatus, when AAL 2 user data (CPS packets) are input, sends these to the CPS packet distribution module 4 and executes distribution processing based on the QoS class. The CPS packets are thus written, in the order input, into the corresponding buffers 5iA for packets to be multiplexed.

When a CPS packet is input, the buffers 5iA for packets to be multiplexed directly notify the ATM multiplexer 3A of the QoS class(es) thereof.

When the demanded band fills the band that can be provided, the ATM multiplexer 3A performs multiprocessing after determining the multiplexing order so that the AAL type-1 ATM cells, AAL type-2 ATM cells, and AAL type-5 ATM cells all fill the demanded band and priorities. Here, when the ATM-multiplexer 3A determines that the next ATM cell to be multiplexed is an AAL type-2 ATM cell, the ATM multiplexer 3A determines the QoS class of the CPS packet to be multiplexed, based on the demanded band and priorities for the CPS packet awaiting multiplexing, and notifies the AAL multiplexer 7 to that effect.

The AAL multiplexer 7, based on the notification noted above, AAL-multiplexes the CPS packet and sends this AAL-multiplexed CPS packet to the buffer 8 for ATM cells (AAL 2) to be sent. Thereupon, because the AAL multiprocessing timing and ATM cell (AAL 2) send timing are synchronized, the ATM cells sent to the buffer 8 for ATM cells (AAL 2) to be sent are immediately read by the ATM multiplexer 3A and transmitted over a transmission path. This processing is executed sequentially. So long as the notification noted earlier is not made from the ATM multiplexer 3A, moreover, the AAL multiplexer 7 is placed in an awaiting-notification state and, accordingly, the buffer 8 for ATM cells (AAL 2) to be sent remains empty.

When the demanded band exceeds the band that can be provided, on the other hand, the ATM multiplexer 3A determines the multiplexing order in accordance with the ATM cells or CPS packets awaiting transmission. With this third embodiment, however, each of the buffers 5iA for packets to be AAL multiplexed is informed of the QoS class of the CPS packets to be multiplexed. Therefore, when a CPS packet having a high priority is present among the AAL type-2 packets, the ATM multiplexer 3A selects that CPS packet for priority transmission ahead of the other CPS packets or ATM cells (AAL 1 and 5), and also transmits the ATM cells (AAL 2) read via the AAL multiplexer 7 over transmission path. Thus the occurrence of uncontrolled priority inversions is avoided.

(C-3) Benefits of the Third Embodiment

As based on the ATM cell multiplexing apparatus in the third embodiment, as described in the foregoing, it is possible to implement an ATM cell multiplexing apparatus wherein uncontrolled priority inversion does not occur, with a configuration that is simpler than that of either the first or second embodiment.

(D) Fourth Embodiment (D-1) Apparatus Configuration

Figure 5:
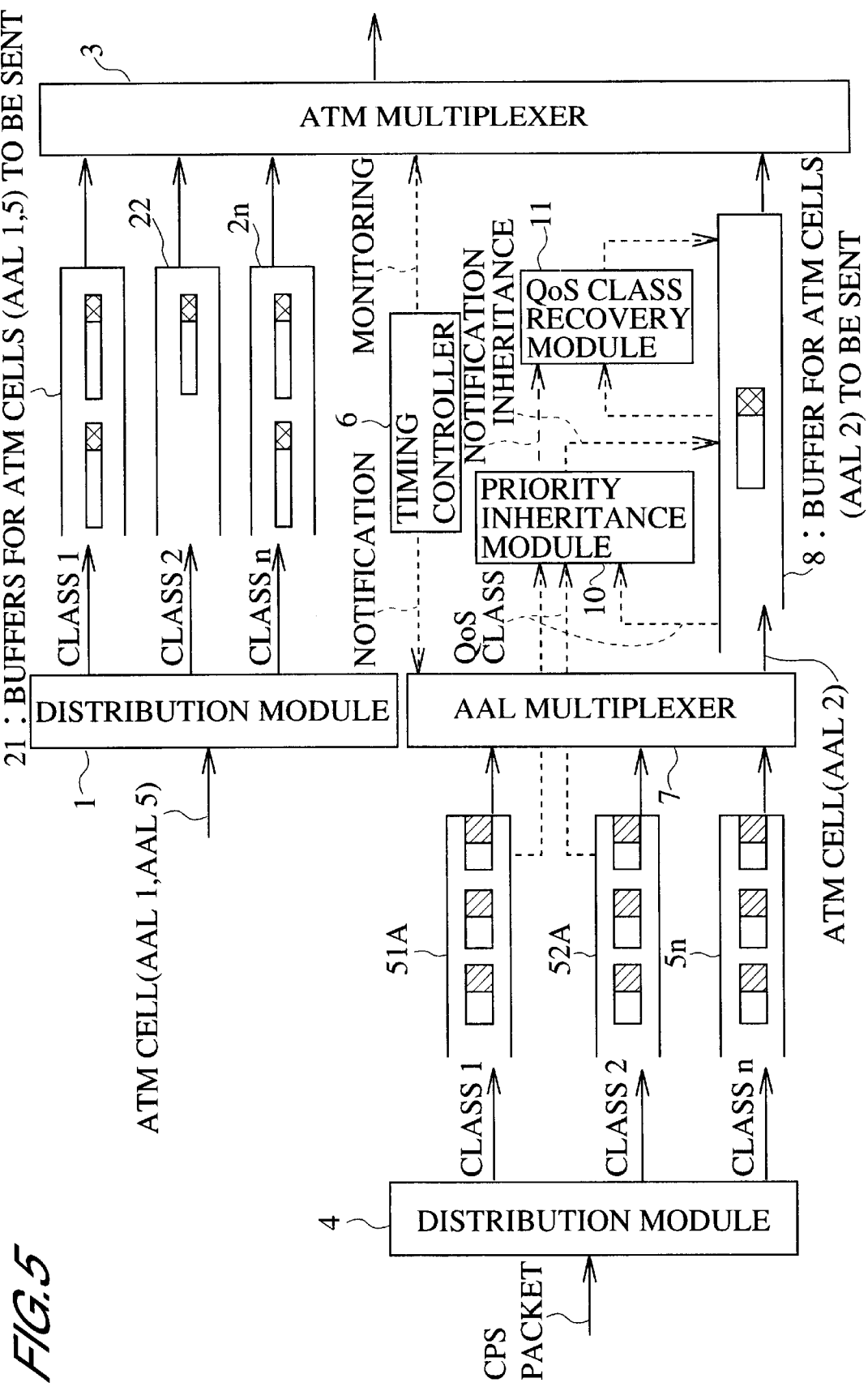
FIG. 5 is a functional block configuration diagram of a fourth embodiment of an ATM cell multiplexing apparatus according to the invention.

A functional block configuration diagram of an ATM cell multiplexing apparatus pertaining to the fourth embodiment is shown in FIG. 5. In this figure, parts that are the same as or that correspond to the parts shown in FIG. 1 are designated by the same or corresponding symbols, respectively.

The differences between the conventional apparatus and the ATM cell multiplexing apparatus in the fourth embodiment are as follows. In this embodiment, specifically, when the QoS class of the ATM cells (AAL 2) awaiting transmission in the buffer 8 for ATM cells to be sent is greater than the QoS class of the CPS packets awaiting multiplexing in the buffers 5iA (where i=1, 2, ... n−1) for packets to be AAL multiplexed, this QoS class of higher priority is temporarily used as the QoS class for the buffer 8 for ATM cells to be sent, and the reading of the ATM cells (AAL 2) awaiting transmission is accelerated.

In other words, the point of difference is that the occurrence of uncontrolled priority inversions is avoided by creating a simulated environment wherein the ATM cells of low QoS class stored in the buffer 8 for ATM cells to be sent are read out early.

In this embodiment, therefore, a function is provided for notifying n−1 buffers 51 to 5n−1 for packets to be AAL multiplexed of QoS classes excluding the highest QoS class, and, in addition, a priority inheritance module 10 and QoS class recovery module 11 are newly provided.

The functional configuration of each part will be described with an emphasis on the configurational differences noted. The ATM cell multiplexing apparatus of this embodiment, moreover, is configured with a distribution module 1, buffers 2i (where i=1, 2, ... n) for ATM cells (AAL 1 and 5) to be sent, an ATM multiplexer 3, a CPS packet distribution module 4, buffers 5iA (where i=1, 2, ... n−1) and 5n for packets to be AAL multiplexed, a timing controller 6, an AAL multiplexer 7, a buffer 8 for ATM cells (AAL 2) to be sent, the priority inheritance module 10, and the QoS class recovery module 11.

Of these components, the n−1 buffers 51 to 5n−1 for packets to be AAL multiplexed that have high priority are configured so as to output QoS class information specific to a certain buffer to the priority inheritance module 10 when either a new CPS packet is written internally therein or a CPS packet is present internally therein.

The priority inheritance module 10 constitutes means for comparing one or a plurality of QoS classes provided from the buffers 51 to 5n−1 for packets to be AAL multiplexed and the QoS class of the ATM cell held in the buffer 8 for ATM cells (AAL 2) to be sent, and for temporarily replacing the QoS class of the buffer 8 for ATM cells (AAL 2) to be sent with the QoS class of highest priority.

These means, in other words, are for inheriting the priority on the awaiting-multiplexing side and temporarily rewriting the ATM cell QoS class in cases where the priority of the CPS packet to be AAL-multiplexed is higher than the priority of the ATM cell to be sent. By these means, the priority of the AAL type-2 ATM cells as seen from the ATM multiplexer 3 temporarily appears to be a high priority, as a consequence whereof the ATM multiplexer 3 will seek to raise the probability of those ATM cells being read out in order to be multiplexed. When there has been such a priority inheritance, moreover, the priority inheritance module 10 notifies the QoS class recovery module 11 of that priority inheritance.

The QoS class recovery module 11, which is under a condition of the notice of the priority inheritance, constitutes means for restoring the QoS class of the ATM cells read out by the ATM multiplexer 3 to the pre-inheritance (original) QoS class.

The reason here for providing this QoS class recovery module 11 is as follows. The objective in providing for priority inheritance is to more quickly read out an ATM cell of low QoS class in the buffer 8 for ATM cells (AAL 2) to be sent. Once that ATM cell has been read out, however, there is no more need to use the inherited QoS class. In other words, the inherited priority is only used as the priority of this ATM cell internally in this ATM multiplexing apparatus.

Also, after the multiplexing order has once been determined, multiprocessing is performed according to that determined order, wherefore, that the QoS class used in determining the multiplexing order differs from the actual QoS class hinges on the fact that no effects whatever are produced.

The QoS class recovery module 11, moreover, identifies the original QoS class by the procedure described next, for example, or by another technique. If QoS class information is recorded in the ATM cell header, for example, the QoS class recovery module 11 identifies the original QoS class from the QoS class information recorded in that header. If no QoS class information is recorded in the header, on the other hand, the QoS class recovery module 11 reads VCI information (in the case of an ATM cell) or CID information (in the case of a CPS packet) from the header, references table means containing corresponding relationships between that information and the QoS class, and thereby identifies the original QoS class.

(D-2) Multiplexing Operations

The multiplexing operations in the ATM multiplex-transmission apparatus having such a configuration will be described next. For this embodiment, moreover, because of the characteristics resident in the AAL type-2 ATM multiplex-transmission functions, the description focuses on those multiplex-transmission operation.

The ATM multiplex-transmission apparatus, when AAL 2 user data (CPS packets) are input, sends these data to the CPS packet distribution module 4 and executes distribution processing based on the QoS class. The CPS packets are thus written, in the order input, into the corresponding buffers 5iA for packets to be multiplexed.

When a CPS packet is input, each of the buffers 5iA (where i=1 to n−1) for packets to be multiplexed notifies the priority inheritance module 10 of that QoS class.

The timing controller 6 synchronizes the AAL multiprocessing timing and the ATM cell transmission timing. When it is time to output ATM cells (AAL 2), the timing controller 6 sends a multiprocessing start request to the AAL multiplexer 7, irrespective of the input traffic volume. In the AAL multiplexer 7, the CPS packets are read out in accordance with the processing start timing so notified, and the CPS packets read out are multiply included in an ATM cell (AAL 2). That is, the AAL multiplexer 7 makes the reading out of the CPS packets and the multiple inclusion of the CPS packets in the ATM cell (AAL 2).

When this is done, even when there are not enough CPS packets present in the buffers 5i (where i=1 to n) for packets to be AAL multiplexed to sufficiently fill an ATM cell payload, the CPS packets are included in a part of the ATM cell (AAL 2) by the AAL multiplexer 7, and then the ATM cell (AAL 2) is sent to the buffer 8 for ATM cells (AAL 2) to be sent from the AAL multiplexer.

When a new ATM cell is written to the buffer 8 for ATM cells (AAL 2) to be sent, the priority inheritance module 10 makes a determination as to whether to perform a priority inheritance. Here, in cases where the QoS class of the CPS packet awaiting multiplexing in the buffers 5i (where i=1 to n−1) for packets to be AAL multiplexed is smaller (that is, the priority is higher) than the priority of the ATM cell(s) written, the priority inheritance module 10 raises the QoS class of the ATM cell held in the buffer 8 for ATM cells (AAL 2) to be sent to the highest priority among the CPS packets in the awaiting-multiplexing state.

In the case, for example, where user data of AAL type-2 and QoS class 1 are in the buffer 51 for packets to be AAL multiplexed at the point in time where user data of AAL type-2 and QoS class 3 have been AAL-multiplexed and made into an ATM cell, the QoS class of the ATM cell held in the buffer 8 for ATM cells (AAL 2) to be sent will be raised to 1 from 3.

As a result, as seen from the ATM multiplexer 3, the ATM cell in the buffer 8 for ATM cells (AAL 2) to be sent will be recognized as having a high priority, and the probability of that ATM cell being read out will be raised even in cases where the demanded band exceeds the band that can be provided and subjects for multiplexing are selected based on the priority.

For example, even when ATM cells of AAL type-5 and QoS class 2 are successively transmitted, in cases as in the previous example where ATM cells of QoS class 1 are priority-inherited for AAL type-2 ATM cells, the priority of those ATM cells will become higher than that of the AAL type-5 ATM cells, wherefore the multiplex-transmission of ATM cells (AAL 2) can be effected on a priority basis even though the transmission of an ATM cell of AAL type-5 and QoS class of 2 has not been completed.

Furthermore, when a priority is inherited in an ATM cell read out from the buffer 8 for ATM cells (AAL 2) to be sent in this manner, the QoS class recovery module 11 restores the QoS class of that ATM cell to the original QoS class when it is read out.

When the demanded band in the ATM multiplexer 3 is smaller than the band that can be provided, of course, the ATM cell held in the buffer 8 for ATM cells (AAL 2) to be sent is read out with the output timing allotted to AAL type-2.

Notification of the fact that an ATM cell (AAL 2) is being multiplexed is sent via the timing controller 6 to the AAL multiplexer 7, moreover. The AAL multiplexer that receives that notification determines the next CPS packets to be multiplexed, based on the prescribed band and priority. Those CPS packets so determined are multiply included in an ATM cell by the AAL multiplexer.

In the previous example, however, the CPS packet of QoS class 1 having the highest priority is in an awaiting-multiplexing state, wherefore that CPS packet is AAL multiplexed, written to the buffer 8 for ATM cells (AAL 2) to be sent, and, after that, multiplex-transmitted on a priority basis in accordance with that priority.

(D-3) Benefits of the Fourth Embodiment

As based on the ATM cell multiplexing apparatus of the fourth embodiment, as described in the foregoing, the configuration is such that, when an ATM cell of a relatively low QoS class is held in the buffer 8 for ATM cells (AAL 2) to be sent, and a CPS packet of relatively high priority is in an awaiting-multiplexing state in the buffers 5i for packets to be AAL multiplexed, a priority inheritance is performed to temporarily raise the priority of the ATM cell (AAL 2), whereby the probability of that ATM cell being multiplexed is improved. With this configuration, not only is it possible to perform unified AAL 1 and AAL 5 control, while maintaining high multiplexing efficiency, but the occurrence of uncontrolled priority inversions can be prevented.

In the case of this embodiment, furthermore, because the ATM cells which are not affected by priority inheritance are also multiplex-transmitted without being discarded, the loss rate can be guaranteed for ATM cells for which the cell loss rate is strictly controlled.

(E) Fifth Embodiment (E-1) Apparatus Configuration

Figure 6:
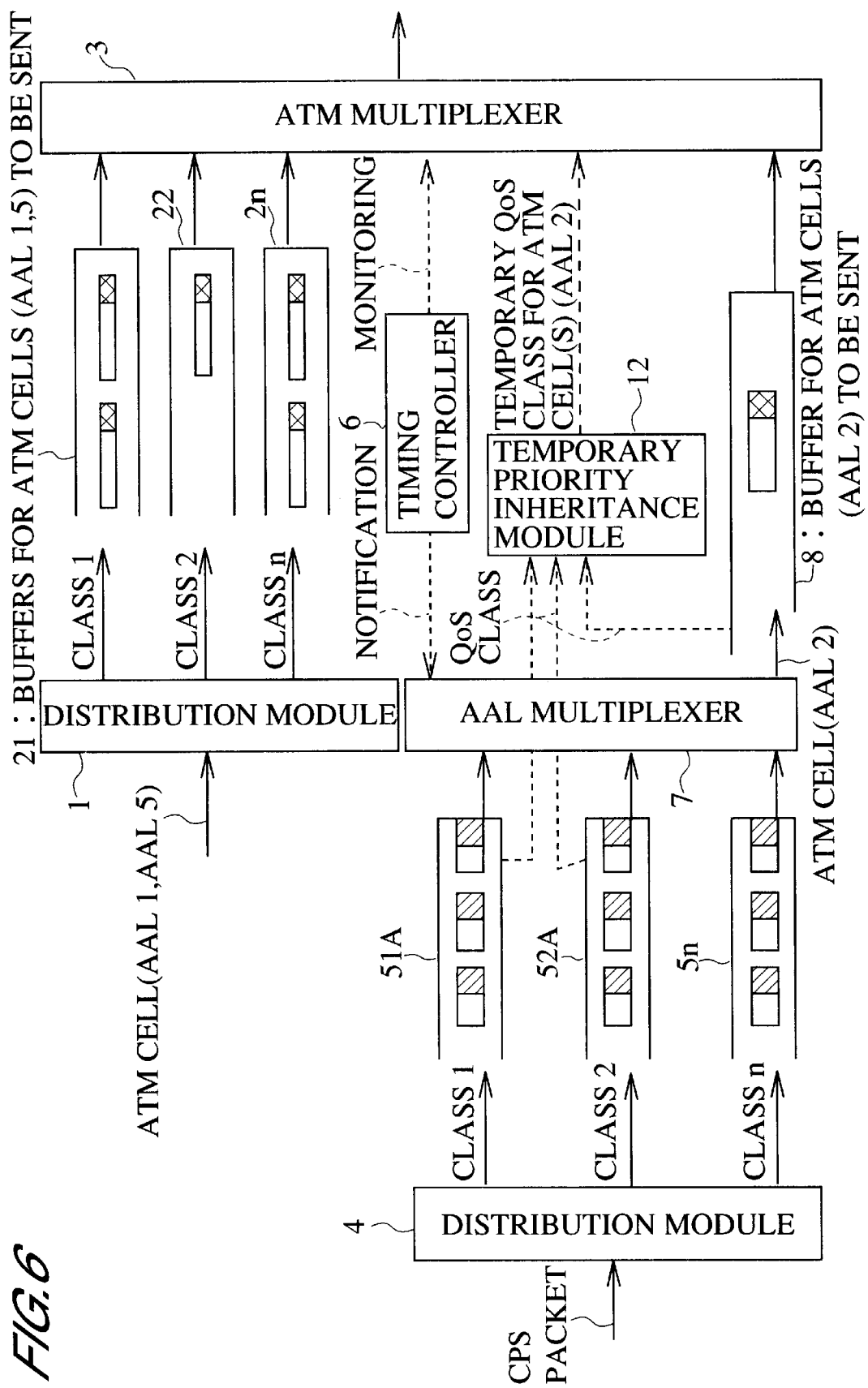
FIG. 6 is a functional block configuration diagram of a fifth embodiment of an ATM cell multiplexing apparatus according to the invention.

A functional block configuration diagram of an ATM cell multiplexing apparatus pertaining to the fifth embodiment is shown in FIG. 6. In this figure, parts that are the same as or that correspond to the parts shown in FIG. 5, are designated by the same or corresponding symbols, respectively. This is because the fifth embodiment has a point in common with the fourth embodiment in that instead of using the proper priority of ATM cells to be sent, virtual use is made of a priority that is higher up in the priorities of the CPS packets to be sent.

The ATM cell multiplexing apparatus in the fifth embodiment, however, is different insofar as no processing is actually performed to rewrite the QoS class of an ATM cell and then restore it to the original class at read-out time. In other words, the ATM cell multiplexing apparatus in the fifth embodiment is different in that only a temporary priority inheritance module 12 is used in such processing.

The functional configuration of each part will be described with an emphasis on the configurational differences noted. The ATM cell multiplexing apparatus in this embodiment, moreover, is configured with a distribution module 1, buffers 2i (where i=1, 2, . . . n) for ATM cells (AAL 1 and 5) to be sent, an ATM multiplexer 3, a CPS packet distribution module 4, buffers 5iA (where i=1, 2, . . . n−1) and 5n for packets to be AAL multiplexed, a timing controller 6, an AAL multiplexer 7, a buffer 8 for ATM cells (AAL 2) to be sent, and the temporary priority inheritance module 12.

Of these components, the temporary priority inheritance module 12 constitutes means for, when QoS classes are provided from one or a plurality of buffers 51 to 5n−1 for packets to be AAL multiplexed, comparing these against the QoS class of the ATM cell held in the buffer 8 for ATM cells (AAL 2) to be sent, treating the QoS class of highest priority as the virtual QoS class of the ATM cell held in the buffer 8 for ATM cells (AAL 2) to be sent, and notifying the ATM multiplexer 3 of this fact.

In other words, instead of making changes in QoS classes associated with ATM cells, as is done by the priority inheritance module 10 in the fourth embodiment, the temporary priority inheritance module 12 only makes temporary changes in the QoS class information provided to the ATM multiplexer 3.

The ATM multiplexer 3 in this embodiment, furthermore, does not read out QoS classes for ATM cells (AAL 2) to be ATM-multiplexed from the buffer 8 for ATM cells (AAL 2) to be sent, but is configured instead to receive notifications from the temporary priority inheritance module 12.

(E-2) Multiplexing Operations

The multiplexing operations in the ATM multiplex-transmission apparatus having such a configuration will be described next. For this embodiment, moreover, because of the characteristics resident in the AAL type-2 ATM multiplex-transmission functions, the description focuses on those multiplex-transmission operation.

The ATM multiplex-transmission apparatus, when AAL 2 user data (CPS packets) are input, sends these data to the CPS packet distribution module 4 and executes distribution processing based on the QoS class. The CPS packets are thus written, in the order input, into the corresponding buffers 5iA for packets to be multiplexed.

The timing controller 6 synchronizes the AAL multiprocessing timing and the ATM cell transmission timing. When it is time to output ATM cells (AAL 2), the timing controller 6 sends a multiprocessing start request to the AAL multiplexer 7, irrespective of the input traffic volume. In the AAL multiplexer 7, the CPS packets are read out in accordance with the processing start timing so notified, and the CPS packet(s) read out are multiply included in an ATM cell (AAL 2). That is, the AAL multiplexer 7 makes the reading out of the CPS packets and the multiple inclusion of the CPS packets in the ATM cell (AAL 2).

When this is done, even when there are not enough CPS packets present in the buffers 5i (where i=1 to n) for packets to be AAL multiplexed to sufficiently fill out an ATM cell payload, the CPS packets are included in a part of an ATM cell (AAL 2) by the AAL multiplexer 7, and then the ATM cell (AAL 2) is sent to the buffer 8 for ATM cells (AAL 2) to be sent from the AAL multiplexer 7.

The CPS packets are thus written to the buffer 8 for ATM cells (AAL 2) to be sent, and that QoS class thereby becomes valid.

The temporary priority inheritance module 12 treats the highest QoS class of the QoS classes of the CPS packets held in the buffers 5iA (where i=1, 2, . . . n−1) for packets to be AAL multiplexed as a virtual QoS class for the ATM cell (AAL 2) in the buffer 8 for ATM cells (AAL 2) to be sent and notifies the ATM multiplexer 3 of that fact. Thus a characteristic of this embodiment is that the AAL cell (AAL 2) QoS class indicated in the ATM multiplexer 3 differs from the actual QoS class.

So long as the demanded band does not exceed the band that can be supplied, the ATM multiplexer 3 reads out the ATM cells (AAL 2) written to the buffer 8A for ATM cells (AAL 2) to be sent with timing synchronized to the writing thereof to the ATM multiplexer 3.

When the demanded band does exceed the band that can be supplied, however, the ATM multiplexer 3 will determine the multiplexing order of ATM cells in the order of priority. Even in this case, however, the ATM multiplexer 3 determines the multiplexing order based on the virtual QoS class notified thereto from the temporary priority inheritance module 12, wherefore multiplexing will be conducted on a priority basis even when the actual QoS class is low.

Furthermore, the QoS class of the ATM cells (AAL 2) actually multiplexed is still the original QoS class, but, because multiprocessing is performed in the order determined, the multiplexing operation is not affected after the multiplexing order has once been determined. On the contrary, as was already described in conjunction with the fourth embodiment, when a change develops in an actual QoS class, there is a danger of user data being transposed during transmission, wherefore this feature is necessary in order to eliminate that danger.

When the ATM cells described in the foregoing are read out, by the way, the AAL multiplexer 7 selects the highest-priority CPS packet that contributed to temporary priority inheritance, as the object of the next multiplexing operation, and writes an ATM cell resulting from AAL-multiplexing of this CPS packet to the buffer 8 for ATM cells (AAL 2) to be sent.

The multiplexing operations in this fifth embodiment are described in the foregoing. All that remains now is to describe why uncontrolled priority inversions do not occur. Let it be assumed, for example, that a CPS packet having a QoS class of 1 is input to the buffer 51 for packets to be AAL multiplexed at the point in time where user data of AAL type-2 and QoS class 3 are AAL multiplexed and formed into an ATM cell.

In this case, the priority of the QoS class 1 is higher than that of the QoS class 3 of the ATM cell in the buffer 8 for ATM cells (AAL 2) to be sent. That being so, the temporary priority inheritance module 12 notifies the ATM multiplexer 3 of QoS class 1. The ATM multiplexer 3 judges, from that notification, that the QoS class of the ATM cell held in the buffer 8 for ATM cells (AAL 2) to be sent is ranked the highest, and ATM-multiplexes the AAL cell (AAL 2) with priority over other ATM cells (AAL 1 and 5).

When that ATM cell is read out, moreover, an ATM cell formed by AAL-multiplexing the CPS packet that temporarily inherited the priority to that ATM cell is written to the buffer 8 for ATM cells (AAL 2) to be sent and is read out on a priority bases just as the earlier ATM cell (AAL 2).

In this manner the priority transfer of CPS packets (user data) having a QoS class of high priority is guaranteed. When this is the case, moreover, ATM cells (AAL 2) that have inherited a priority higher than their own priority are also transferred, wherefore this can be guaranteed even in cases where the demands are strict in terms of loss rate.

(E-3) Benefits of the Fifth Embodiment

As based on the ATM cell multiplexing apparatus in the fifth embodiment, as described in the foregoing, not only is the unified control of AAL type-1 and type-5 possible while maintaining high multiplexing effectiveness, but priority levels in QoS classes and ATM cell loss rates can also be guaranteed, and the benefits noted below can also be gained.

That is, the same benefits as realized in the fourth embodiment can be realized with a simpler configuration and at higher speed. It is also possible to eliminate the necessity of providing an area for preserving the original QoS class.

(F) Sixth Embodiment (F-1) Apparatus Configuration

Figure 7:
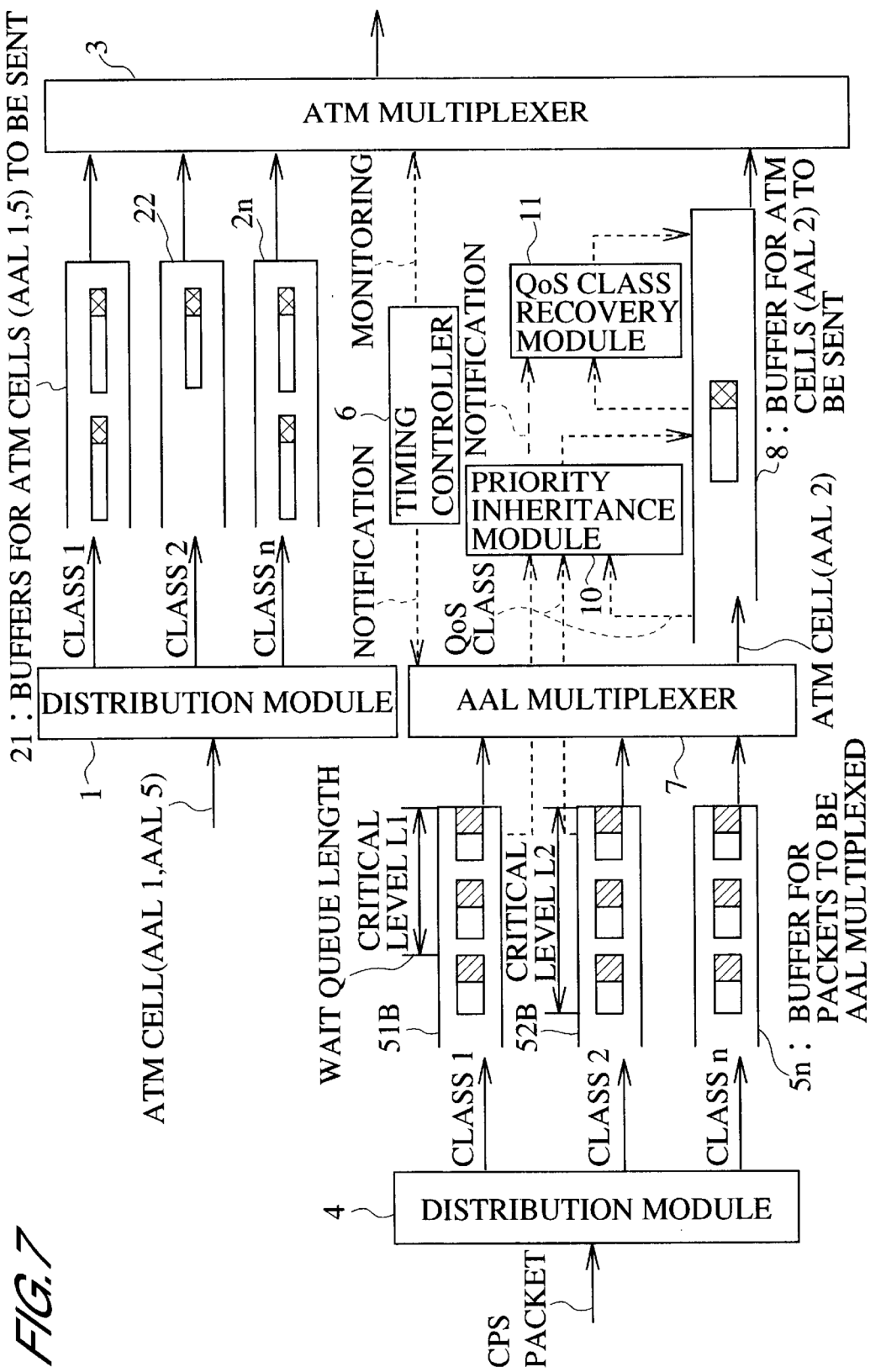
FIG. 7 is a functional block configuration diagram of a sixth embodiment of an ATM cell multiplexing apparatus according to the invention.

A functional block configuration diagram of an ATM cell multiplexing apparatus in a sixth embodiment is shown in FIG. 7. In FIG. 7, parts that are the same as or that correspond to the parts shown in FIG. 5, are designated by the same or corresponding symbols, respectively. That is because the configuration of this sixth embodiment is based on the configuration of the fourth embodiment.

The difference between this sixth embodiment and the fourth embodiment is a difference of whether the priority inheritance is performed conditionally or unconditionally. That is, in the fourth embodiment, the configuration is such that the highest priority available in the CPS packet(s) awaiting multiplexing is unconditionally inherited. The fundamental objective here can be attained, however, by executing a priority inheritance only when the QoS class cannot be guaranteed.

That being so, in this embodiment, a function is added to the apparatus of the fourth aspect for inheriting priorities conditionally.

In this sixth embodiment, what is used as the condition is whether or not the length L of a wait queue in the buffers 5iB (where i=1, 2, . . . n−1) for packets to be AAL multiplexed corresponding to a QoS class exceeds a critical level (i.e. the boundary value Li (where i=1, 2, . . . n−1) where the possibility arises of the QoS being unguaranteeable when the length of the wait queue exceeds that critical level) established separately for each buffer.

When the length of the wait queue exceeds the critical level, there is a high possibility that the QoS cannot be guaranteed. Thereupon, in this embodiment, a function is added for outputting QoS class information to the buffers 5iB (where i=1, 2, . . . n−1) for packets to be AAL multiplexed only when the length of the wait queue exceeds the critical level. Thus the configuration is made such that priorities are inherited only in cases where there is a possibility of not being able to guarantee a QoS.

(F-2) Multiplexing Operations

The multiplexing operations in the ATM multiplex-transmission apparatus having such a configuration will be described next. For this embodiment, moreover, because of the characteristics resident in the AAL type-2 ATM multiplex-transmission functions, the description focuses on those multiplex-transmission operation.

The ATM multiplex-transmission apparatus, when AAL 2 user data (CPS packets) are input, sends these to the CPS packet distribution module 4 and executes distribution processing based on the QoS class. The CPS packets are thus written, in the order input, into either the buffers 5iB or the buffer 5n for packets to be multiplexed.

The timing controller 6 synchronizes the AAL multiprocessing timing and the ATM cell transmission timing. When it is time to output ATM cells (AAL 2), the timing controller 6 sends a multiprocessing start request to the AAL multiplexer 7, irrespective of the input traffic volume. In the AAL multiplexer 7, the CPS packets are read out in accordance with the processing start timing so notified, and the CPS packet(s) read out are multiply included in an ATM cell (AAL 2). That is, the AAL multiplexer 7 makes the reading out of the CPS packets and the multiple inclusion of the CPS packets in the ATM cell (AAL 2).

When this is done, even when there are not enough CPS packets present in the buffers 5iB (where i=1 to n−1) and 5n for packets to be AAL multiplexed to sufficiently fill out an ATM cell payload, the ATM cell, after partially including the CPS packets, is sent to the buffers for ATM cells (AAL 2) to be sent.

Now, in parallel with this processing, the n−1 buffers 5iB (where i=1 to n−1) for packets to be AAL multiplexed, which exclude the buffer 5n for packets to be AAL multiplexed that has the lowest priority, perform monitoring to determine whether or not the length L of the wait queue at the current point in time exceeds a critical level Li determined for each QoS class and, when they judge that the wait queue length has exceeded a critical level, they communicate the QoS class information to the priority inheritance module 10.

Needless to say, moreover, the output of QoS class information ceases (priority inheritance is not requested) as soon as the length of the queue of CPS packets awaiting AAL multiplexing falls below the critical levels determined for the QoS classes.

The priority inheritance module 10 thus compares a QoS class that it is notified of (or the QoS class of highest priority when there is a plurality of such notifications) against the QoS class of the ATM cell held in the buffer 8 for ATM cells (AAL 2) to be sent, and determines which is smaller, only in cases where a CPS packet exists for which the inheritance of a priority is requested.

Now, when it is determined that the QoS class of the CPS packet awaiting AAL multiplexing is smaller (i.e. that the priority is higher), the priority inheritance module 10 executes processing to inherit the QoS class of the ATM cell in the buffer 8 for ATM cells (AAL 2) to be sent as the QoS class of that CPS packet. In other words, it executes processing to temporarily rewrite the QoS class of the ATM cell to be sent to a QoS class of a higher priority. In this case, furthermore, the fact that a priority has been inherited is notified to the QoS class recovery module 11.

The ATM multiplexer 3, when operating normally (i.e. when the band that can be provided is larger than the demanded band), reads out and ATM-multiplexes the ATM cell held in the buffer 8 for ATM cells (AAL 2) to be sent with the prescribed output timing allotted to AAL type-2.

However, when the multiplexing order is determined in the order of priority (i.e. when the demanded band exceeds the band that can be provided), the ATM multiplexer 3 determines the multiplexing order on the basis of the QoS class that has been temporarily rewritten by the priority inheritance, and operates so as to read out with the determined prescribed timing. The QoS class recovery module 11, moreover, operates so that, when that ATM cell (AAL 2) is read out, it excludes the previously inherited priority and restores the original QoS class.

Thus the operation after priority inheritance becomes the same as in the case of the fourth embodiment. To be on the safe side, however, how uncontrolled priority inversions are prevented in the present embodiment will also be described.

Let it be assumed that, at the point in time where user data of AAL type-2 and QoS class 3 are AAL-multiplexed and formed into an ATM cell, a CPS packet with a QoS class of 1 has been input to the buffer 51 for packets to be AAL multiplexed.

At this point in time, in cases where the awaiting-multiplexing queue of the buffer 51 for packets to be AAL multiplexed corresponding to that CPS packet exceeds the critical level, the priority of the QoS class 1 is higher than the QoS class 3 of the ATM cell in the buffer 8 for ATM cells (AAL 2) to be sent, wherefore the QoS class of the ATM cell in the buffer for ATM cells (AAL 2) to be sent is raised to QoS class 1 (having become QoS class 1 by the priority inheritance).

When this happens, even if ATM cells belonging to AAL type-5 and having a QoS class of 2 are successively transmitted, in that case, the AAL type-2 priority becomes higher than the AAL type-5 priority. The ATM cells of AAL type-2 are therefore ATM-multiplexed and output on a priority basis without having to wait until the AAL type-5 ATM cells are completely transmitted.

Furthermore, as the next entity to be transmitted of that AAL type-2, the ATM cell (AAL 2) formed by AAL-multiplexing the CPS packet of QoS class 1, used earlier for sending the ATM cell on a priority basis, is selected, and that ATM cell is ATM-multiplexed with the next output timing.

In this manner the priority transfer of CPS packets (user data) having a QoS class of high priority is guaranteed. When this is the case, moreover, ATM cells (AAL 2) that have inherited a priority higher than their own priority are also transferred, wherefore this can be guaranteed even in cases where the demands are strict in terms of loss rate.

(F-3) Benefits of the Sixth Embodiment

Thus, with the sixth embodiment, not only is the unified control of AAL type-1 and type-5 possible while maintaining high multiplexing effectiveness, but priority levels in QoS classes and ATM cell loss rates can also be guaranteed, and the benefits noted below can also be gained.

That is, as based on the ATM cell multiplexing apparatus in this embodiment, priority inheritance is executed conditionally, and priority inheritance is performed only when the awaiting-multiplexing queue in the buffers 5iB (where i=1, 2, . . . n−1) for the CPS packets to be AAL multiplexed exceeds a critical level. For this reason, the ATM multiplexer 3 will multiplex ATM cells (AAL 2) using the original QoS class so long as the band can be guaranteed. Hence it is possible to make it so that priority inversions do not readily occur between the priority of one ATM cell (AAL 2) and the priority of another ATM cell (AAL 1 or 5) resulting from priority inheritance.

(G) Seventh Embodiment (G-1) Apparatus Configuration

Figure 8:
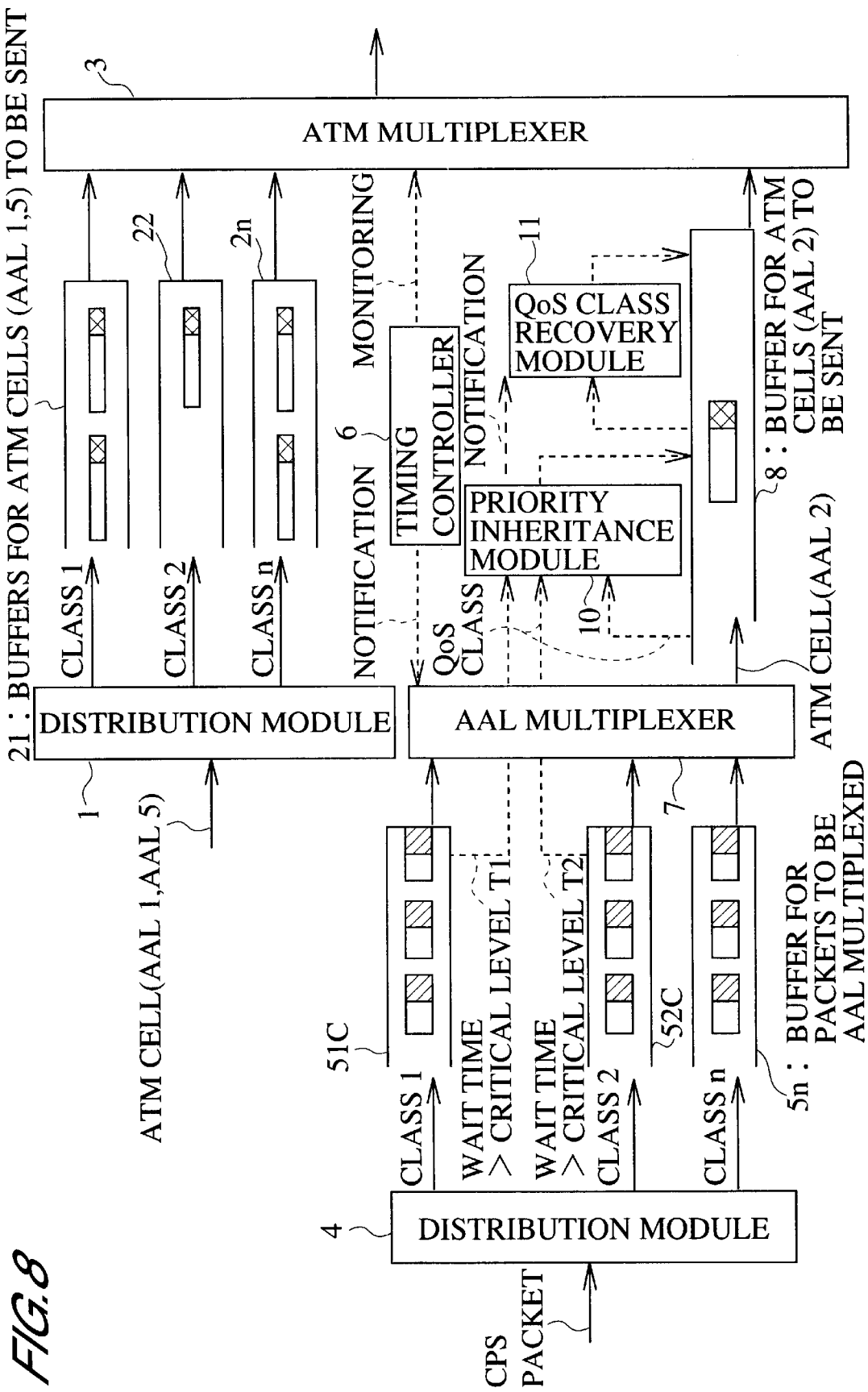
FIG. 8 is a functional block configuration diagram of a seventh embodiment of an ATM cell multiplexing apparatus according to the invention.

A functional block configuration diagram of an ATM cell multiplexing apparatus according to the seventh embodiment is shown in FIG. 8. In FIG. 8, parts that are the same as or that correspond to the parts shown in FIG. 5, are designated by the same or corresponding symbols, respectively. That is because the configuration of the seventh embodiment is based on the configuration of the fourth embodiment.

In the seventh embodiment also, as in the sixth embodiment, an ATM cell multiplexing apparatus is described which determines priority inheritance conditionally.

However, what is used as that condition differs from what is used in the sixth embodiment. Specifically, what is used as the condition in the seventh embodiment is whether or not a wait time T in each buffer 5iB (where i=1, 2, ... n−1) for packets to be AAL multiplexed corresponding to a QoS class exceeds a critical level established for each individual buffer (i.e. a boundary value Ti (where i=1, 2, ... n−1) at which the possibility arises of being unable to guarantee the QoS when the wait time exceeds that critical level).

When a wait time exceeds the critical level, there is a high possibility that the QoS cannot be unguaranteed. Thereupon, in this embodiment, a function is added to the buffers 5iC (where i=1, 2, ... n−1) for packets to be AAL multiplexed for outputting QoS class information only when the wait time exceeds the critical level. Thus a priority is inherited only in cases where there is a possibility of being unable to guarantee the QoS.

(F-2) Multiplexing Operations

The multiplexing operations in the ATM multiplex-transmission apparatus having such a configuration are described next. For the embodiment, moreover, because of the characteristics resident in the AAL type-2 ATM multiplex-transmission functions, the description focuses on those multiplex-transmission operation.

The ATM multiplex-transmission apparatus, when AAL 2 user data (CPS packets) are input, sends these to the CPS packet distribution module 4 and executes distribution processing based on the QoS class. The CPS packets are thus written, in the order of input, into either the buffers 5iB or the buffer 5n for packets to be multiplexed.

The timing controller 6 synchronizes the AAL multiprocessing timing and the ATM cell transmission timing. When it is time to output ATM cells (AAL 2), the timing controller 6 sends a multiprocessing start request to the AAL multiplexer 7, irrespective of the input traffic volume. The AAL multiplexer 7 makes the reading out of CPS packets and the multiple inclusion thereof in an ATM cell (AAL 2). That is, in the AAL multiplexer 7, the CPS packets are read out in accordance with the processing start timing so notified, and the CPS packet(s) read out are multiply included in an ATM cell (AAL 2).

When this is done, even when there are not enough CPS packets present in the buffers 5iC (where i=1 to n−1) and 5n for packets to be AAL multiplexed to sufficiently fill out an ATM cell payload, the ATM cell, after partially including the CPS packets, is sent to the buffers for ATM cells (AAL 2) to be sent.

Now, in parallel with this processing, in the n−1 buffers 5iC (where i=1 to n−1) for packets to be AAL multiplexed, which excludes the buffer 5n for packets to be AAL multiplexed that has the lowest priority, monitoring is performed to determine whether or not the wait time T at the current point in time exceeds a critical level Ti determined for each QoS class and, when it is judged that the wait time has exceeded a critical level, and only then, the QoS class information is communicated to the priority inheritance module 10.

Needless to say, moreover, the output of QoS class information ceases (priority inheritance is not requested) as soon as the wait time falls below the critical levels determined for the QoS classes.

The priority inheritance module 10 thus compares a QoS class that it is notified of (or the QoS class of highest priority when there is a plurality of such notifications) against the QoS class of the ATM cell held in the buffer 8 for ATM cells (AAL 2) to be sent, and determines which is higher, only in cases where a CPS packet exists for which the inheritance of a priority is requested.

Now, when it is determined that the CPS packet awaiting multiplexing has the higher priority, the priority inheritance module 10 executes processing to inherit the QoS class of the ATM cell in the buffer 8 for ATM cells (AAL 2) to be sent as the QoS class of that CPS packet. In other words, it executes processing to temporarily rewrite the QoS class of the ATM cell to be sent to a QoS class of a higher priority. In this case, furthermore, the fact that a priority has been inherited is notified to the QoS class recovery module 11.

The ATM multiplexer 3, when operating normally (i.e. when the band that can be provided is larger than the demanded band), reads out and ATM-multiplexes the ATM cell held in the buffer 8 for ATM cells (AAL 2) to be sent with the prescribed output timing allotted to AAL type-2.

However, when the multiplexing order is determined in the order of priority (i.e. when the demanded band exceeds the band that can be provided), the ATM multiplexer 3 determines the multiplexing order on the basis of the QoS class that has been temporarily rewritten by the priority inheritance, and operates so as to read out with the determined prescribed timing. The QoS class recovery module 11, moreover, operates so that, when that ATM cell (AAL 2) is read out, it excludes the previously inherited priority and thereby restores the original QoS class.

Thus the operation after priority inheritance becomes the same as in the case of the fourth embodiment (which is to say the same as in the case of the sixth embodiment, except for the condition that is used in determining whether or not to perform a priority inheritance). Accordingly, in this embodiment also, uncontrolled priority inversions do not occur.

Let it be assumed, for example, that, at the point in time where user data of AAL type-2 and QoS class 3 are AAL-multiplexed and formed into an ATM cell, a CPS packet with a QoS class of 1 has been input to the buffer 51 for packets to be AAL multiplexed.

At this point in time, in cases where the wait time in the buffer 51 for packets to be AAL multiplexed corresponding to that CPS packet exceeds the critical level, the priority of the QoS class 1 is higher than the QoS class 3 of the ATM cell in the buffer 8 for ATM cells (AAL 2) to be sent, wherefore the QoS class of the ATM cell in the buffer for ATM cells (AAL 2) to be sent is raised to QoS class 1 (having become QoS class 1 by the priority inheritance).

When this happens, even if ATM cells belonging to AAL type-5 and having a QoS class of 2 are successively transmitted, in that case, the AAL type-2 priority becomes higher than the AAL type-5 priority. The ATM cells of AAL type-2 are therefore ATM-multiplexed and output on a priority basis without having to wait until the AAL type-5 ATM cells are completely transmitted.

Furthermore, as the next entity to be transmitted of that AAL type-2, the ATM cell (AAL 2) formed by AAL-multiplexing the CPS packet of QoS class 1, used earlier for sending the ATM cell on a priority basis, is selected, and that ATM cell is ATM-multiplexed with the next output timing.

In this manner the priority transfer of CPS packets (user data) having a QoS class of high priority is guaranteed. When this is the case, moreover, ATM cells (AAL 2) that have inherited a priority higher than their own priority are also transferred, wherefore this can be guaranteed even in cases where the demands are strict in terms of loss rate.

(G-3) Benefits of the Seventh Embodiment

Thus, with the embodiment also, not only is the unified control of AAL type-1 and type-5 possible while maintaining high multiplexing effectiveness, but priority levels in QoS classes and ATM cell loss rates can also be guaranteed, and the benefits noted below can also be gained.

That is, as based on the ATM cell multiplexing apparatus in this embodiment, priority inheritance is executed conditionally, and priority inheritance is performed only when the wait time in the buffers 5iB (where i=1, 2, . . . n−1) for the CPS packets to be AAL multiplexed exceeds a critical level. For this reason, the ATM multiplexer 3 will multiplex ATM cells (AAL 2) using the original QoS class so long as the band can be guaranteed. Hence it is possible to make it so that priority inversions do not readily occur between the priority of one ATM cell (AAL 2) and the priority of another ATM cell (AAL 1 or 5) resulting from priority inheritance.

(H) Eighth Embodiment (H-1) Apparatus Configuration

Figure 9:
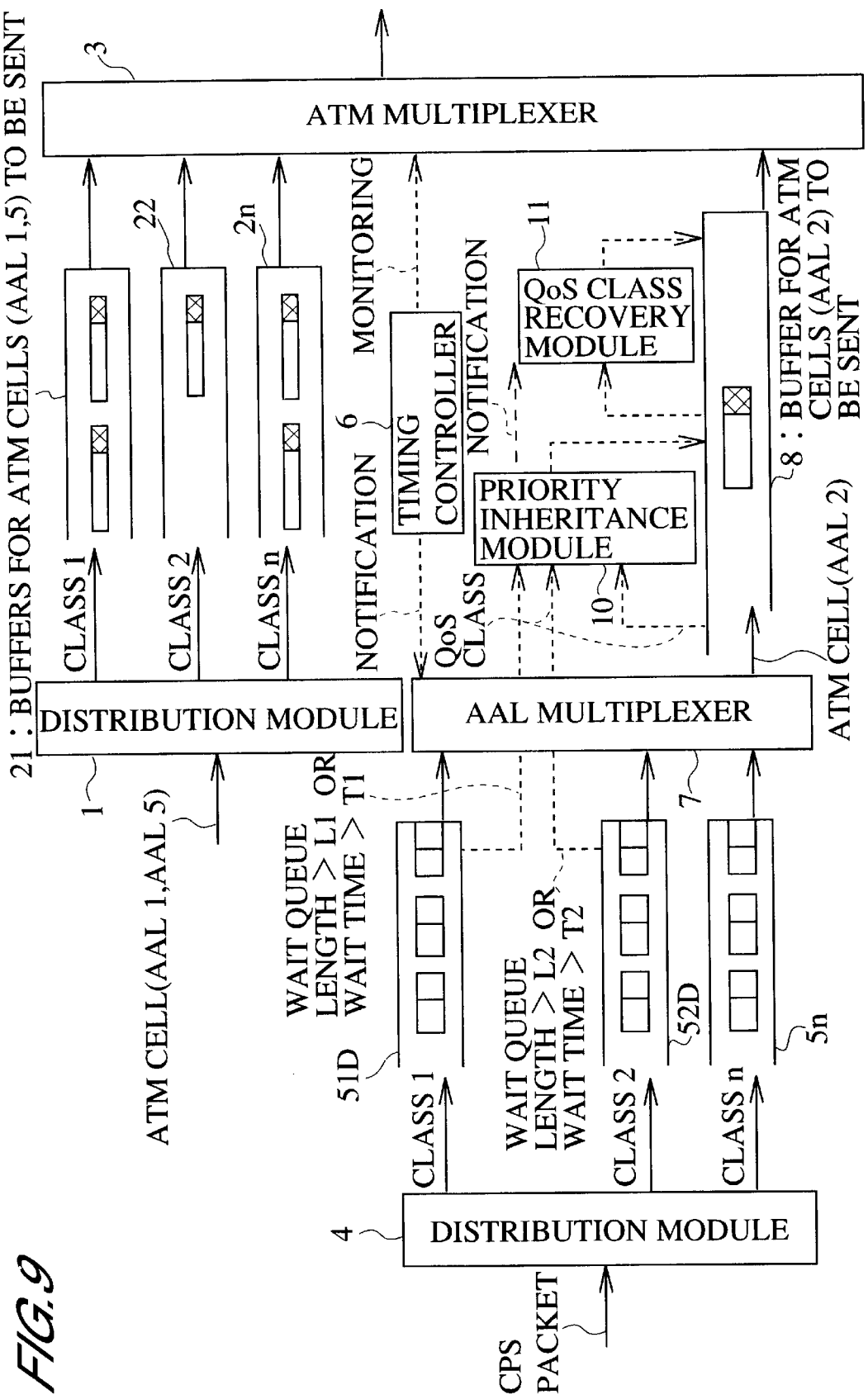
FIG. 9 is a functional block configuration diagram of an eighth embodiment of an ATM cell multiplexing apparatus according to the invention.

A functional block configuration diagram of an ATM cell multiplexing apparatus according to the eighth embodiment is shown in FIG. 9. In FIG. 9, parts that are the same as or that correspond to the parts shown in FIG. 5, are designated by the same or corresponding symbols, respectively. That is because the configuration of this eighth embodiment is based on the configuration of the fourth embodiment.

In this eighth embodiment also, as in the sixth and seventh embodiments, an ATM cell multiplexing apparatus is described which determines priority inheritance conditionally.

In this eighth embodiment, however, the number of conditions used is 2. That is, in this eighth embodiment, both wait queue length and wait time are used as determining conditions, and priority inheritance is only permitted when one of those conditions is fulfilled.

More specifically, it is determined that there is a high possibility that the QoS cannot be guaranteed, and QoS class information is output, (1) when the length L of the wait queue in a buffer 5iC (where i=1, 2, . . . n−1) for packets to be AAL multiplexed corresponding to a QoS class exceeds a critical level (i.e. the boundary value Li (where i=1, 2, . . . n−1) where the possibility arises of the QoS being unguaranteeable when the length of the wait queue exceeds that critical level) established separately for each buffer, or (2) when a wait time T in each buffer 5iC (where i=1, 2, . . . n−1) for packets to be AAL multiplexed corresponding to a QoS class exceeds a critical level (i.e. a boundary value Ti (where i=1, 2, . . . n−1) at which the possibility arises of being unable to guarantee the QoS when the wait time exceeds that critical level) established separately for each buffer.

(H-2) Multiplexing Operation

The multiplexing operations in the ATM multiplex-transmission apparatus having such a configuration will be described next. For this embodiment, moreover, because of the characteristics resident in the AAL type-2 ATM multiplex-transmission functions, the description focuses on those multiplex-transmission operation.

The ATM multiplex-transmission apparatus, when AAL 2 user data (CPS packets) are input, sends these data to the CPS packet distribution module 4 and executes distribution processing based on the QoS class. The CPS packets are thus written, in the order input, into either the buffers 5iD or the buffer 5n for packets to be multiplexed.

The timing controller 6 synchronizes the AAL multiprocessing timing and the ATM cell transmission timing. When it is time to output ATM cells (AAL 2), the timing controller 6 sends a multiprocessing start request to the AAL multiplexer 7, irrespective of the input traffic volume. The AAL multiplexer 7 makes the reading out of CPS packets and the multiple inclusion thereof in an ATM cell (AAL 2). That is, in the AAL multiplexer 7, the CPS packets are read out in accordance with the processing start timing so notified, and the CPS packet(s) read out are multiply included in an ATM cell (AAL 2).

When this is done, even when there are not enough CPS packets present in the buffers 5iD (where i=1 to n−1) and 5n for packets to be AAL multiplexed to sufficiently fill out an ATM cell payload, the ATM cell, after partially including the CPS packets, is sent to the buffers for ATM cells (AAL 2) to be sent.

Now, in parallel with this processing, in the n−1 buffers 5iD (where i=1 to n−1) for packets to be AAL multiplexed, which exclude the buffer 5n for packets to be AAL multiplexed that has the lowest priority, monitoring is performed to determine whether or not either the wait queue length L or the wait time T at the current point in time exceeds a critical level (wait queue length Li, wait time Ti) determined for each QoS class and, when it is judged that either the wait queue length or the wait time has exceeded a critical level, the QoS class information is communicated to the priority inheritance module 10.

Needless to say, moreover, the output of QoS class information ceases (priority inheritance is not requested) as soon as both the wait queue length and the wait time fall below the critical levels determined for the QoS classes.

The priority inheritance module 10 thus compares a QoS class that it is notified of (or the QoS class of highest priority when there is a plurality of such notifications) against the QoS class of the ATM cell held in the buffer 8 for ATM cells (AAL 2) to be sent, and determines which is higher, only in cases where a CPS packet exists for which the inheritance of a priority is requested.

Now, when it is determined that the CPS packet awaiting multiplexing has the higher priority, the priority inheritance module 10 executes processing to inherit the QoS class of the ATM cell in the buffer 8 for ATM cells (AAL 2) to be sent as the QoS class of that CPS packet. In other words, it executes processing to temporarily rewrite the QoS class of the ATM cell to be sent to a QoS class of a higher priority. In this case, furthermore, the fact that a priority has been inherited is notified to the QoS class recovery module 11.

The ATM multiplexer 3, when operating normally (i.e. when the band that can be provided is larger than the demanded band), reads out and ATM-multiplexes the ATM cell held in the buffer 8 for ATM cells (AAL 2) to be sent with the prescribed output timing allotted to AAL type-2.

However, when the multiplexing order is determined in the order of priority (i.e. when the demanded band exceeds the band that can be provided), the ATM multiplexer 3 determines the multiplexing order on the basis of the QoS class that has been temporarily rewritten by the priority inheritance, and operates so as to read out with the determined prescribed timing. The QoS class recovery module 11, moreover, operates so that, when that ATM cell (AAL 2) is read out, it excludes the previously inherited priority and thereby restores the original QoS class.

The multiplexing operations in the eighth embodiment are as described in the foregoing. Furthermore, cases where priority inheritance is performed in this eighth embodiment correspond at least to either the case where priority inheritance is performed in the sixth embodiment or the case where priority inheritance is performed in the seventh embodiment. Since uncontrolled priority inversion does not occur in either of those cases, uncontrolled priority inversion can be effectively avoided in this embodiment also, for the same reasons.

(H-3) Benefits of the Eighth Embodiment

Thus, with this embodiment also, not only is the unified control of AAL type-1 and type-5 possible while maintaining high multiplexing effectiveness, but priority levels in QoS classes and ATM cell loss rates can also be guaranteed, and the benefits noted below can also be gained.

That is, as based on the ATM cell multiplexing apparatus in this embodiment, priority inheritance is executed conditionally, and priority inheritance is performed at the stage where a condition is satisfied based on either one of two judgment criteria. Therefore, as compared to the case where that judgment is made on the bases of only one of those two conditions, the possibility of the occurrence of a priority inversion between an ATM cell of AAL type-2, on the one hand, and an ATM cell of AAL type-1 or type-5, on the other, can be significantly reduced.

(I) Ninth Embodiment (I-1) Apparatus Configuration

Figure 10:
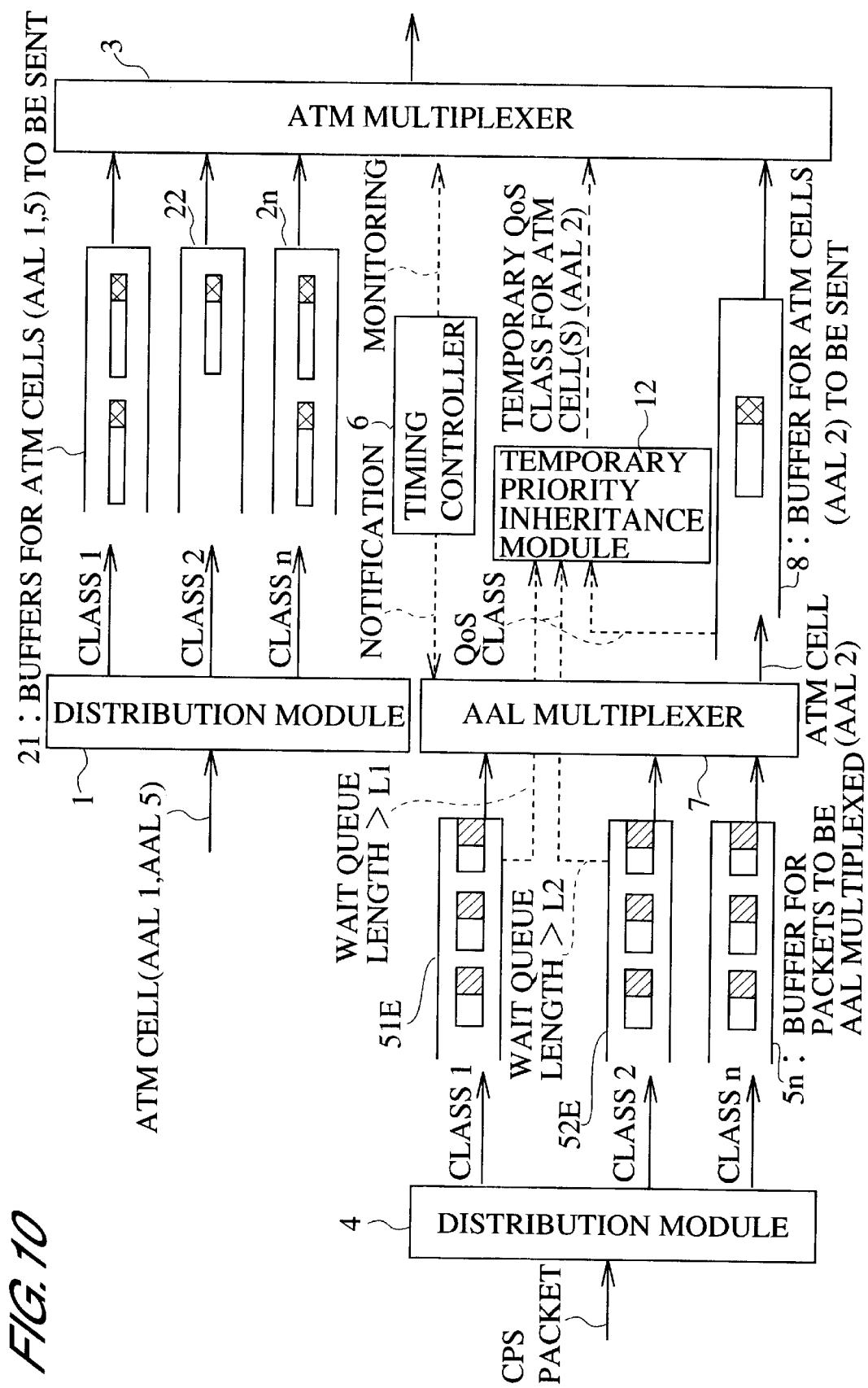
FIG. 10 is a functional block configuration diagram of a ninth embodiment of an ATM cell multiplexing apparatus according to the invention.

A functional block configuration diagram of an ATM cell multiplexing apparatus according to the ninth embodiment is shown in FIG. 10. In FIG. 10, parts that are the same as or that correspond to the parts shown in FIG. 6 are designated by the same or corresponding symbols, respectively. That is because the configuration of this ninth embodiment is based on the configuration of the fifth embodiment.

The relationship between this ninth embodiment and the fifth embodiment, moreover, is the same as that between the sixth embodiment and the fourth embodiment. That is, a conditional priority inheritance function has been added to the apparatus of the fifth embodiment.

In the fifth embodiment, the highest priority of the CPS packets awaiting multiplexing is unconditionally inherited, but the fundamental objective here can be attained by executing priority inheritance only in cases where the QoS class cannot otherwise be guaranteed. That being so, in this ninth embodiment, a function is added to the apparatus of the fifth embodiment for performing priority inheritance conditionally.

In this ninth embodiment, however, the condition that is employed is whether or not the wait queue length L in the buffer $5iE$ (where i=1, 2, . . . n-1) for packets to be AAL multiplexed corresponding to a QoS class exceeds a critical level (i.e. the boundary value $L_i$ (where i=1, 2, . . . n-1) where the possibility arises of the QoS being unguaranteeable when the length of the wait queue exceeds that critical level) established separately for each buffer.

When the length of the wait queue exceeds the critical level, there is a high possibility that the QoS cannot be guaranteed. Thereupon, in this embodiment, a function is added for outputting QoS class information to the buffers $5iE$ (where i=1, 2, . . . n-1) for packets to be AAL multiplexed only when the length of the wait queue exceeds the critical level. Thus the configuration is made such that priorities are inherited only in cases where there is a possibility of not being able to guarantee a QoS.

(I-2) Multiplexing Operations

The multiplexing operations in the ATM multiplex-transmission apparatus having such a configuration are described next. For this embodiment, moreover, because of the characteristics resident in the AAL type-2 ATM multiplex-transmission functions, the description focuses on those multiplex-transmission operation.

The ATM multiplex-transmission apparatus, when AAL 2 user data (CPS packets) are input, sends these data to the CPS packet distribution module 4 and executes distribution processing based on the QoS class. The CPS packets are thus written, in the order input, into either the buffers $5iE$ or the buffer 5n for packets to be multiplexed.

The timing controller 6 synchronizes the AAL multiprocessing timing and the ATM cell transmission timing. When it is time to output ATM cells (AAL 2), the timing controller 6 sends a multiprocessing start request to the AAL multiplexer 7, irrespective of the input traffic volume. The AAL multiplexer 7 makes the reading out of CPS packets and the multiple inclusion thereof in an ATM cell (AAL 2). That is, in the AAL multiplexer 7, the CPS packets are read out in accordance with the processing start timing so notified, and the CPS packet(s) read out are multiply included in an ATM cell (AAL 2).

When this is done, even when there are not enough CPS packets present in the buffers $5iE$ (where i=1 to n-1) and 5n for packets to be AAL multiplexed to sufficiently fill out an ATM cell payload, the ATM cell, after partially including the CPS packets, is sent to the buffers for ATM cells (AAL 2) to be sent.

Now, in parallel with this processing, in the n-1 buffers $5iE$ (where i=1 to n-1) for packets to be AAL multiplexed, which exclude the buffer 5n for packets to be AAL multiplexed that has the lowest priority, monitoring is performed to determine whether or not the length L of the wait queue at the current point in time exceeds a critical level $L_i$ determined for each QoS class and, when it is judged that the wait queue length has exceeded a critical level, and only then, QoS class information is communicated to the temporary priority inheritance module 12.

Needless to say, moreover, the output of QoS class information ceases (priority inheritance is not requested) as soon as the wait queue length falls below the critical levels determined for the QoS classes.

The temporary priority inheritance module 12 thus compares a QoS class that it is notified of (or the QoS class of highest priority when there is a plurality of such notifications) against the QoS class of the ATM cell held in the buffer 8 for ATM cells (AAL 2) to be sent, and determines which is higher, only in cases where a CPS packet exists for which the inheritance of a priority is requested.

Here, when it is determined that the CPS packet awaiting multiplexing has the higher priority, the temporary priority inheritance module 12 notifies the ATM multiplexer 3 that the priority (QoS class) of that CPS packet is the virtual QoS class for the ATM cell (AAL 2) in the buffer 8 for ATM cells (AAL 2) to be sent. That is, notification is made of a QoS class that differs from the actual QoS class.

So long as the demanded band does not exceed the band that can be supplied, the ATM multiplexer 3 reads out the ATM cell (AAL 2) written to the buffer 8A for ATM cells (AAL 2) to be sent with timing synchronized to that writing to the ATM multiplexer 3.

When the demanded band does exceed the band that can be supplied, however, the ATM multiplexer 3 will determine the multiplexing order of ATM cells in the order of priority. Even in that case, however, the ATM multiplexer 3 determines the multiplexing order based on the virtual QoS class notified thereto from the temporary priority inheritance module 12, wherefore multiplexing will be conducted on a priority basis even when the actual QoS class is low.

Furthermore, the QoS class of the ATM cells (AAL 2) actually multiplexed is still the original class, but, because multiprocessing is performed in the order determined, the multiplexing operations are not affected after the multiplexing order has once been determined. On the contrary, as was already described in conjunction with the fourth embodiment, when a change develops in an actual QoS class, there is a danger of user data being transposed during transmission, wherefore this is necessary in order to eliminate that danger.

When the ATM cells described in the foregoing are read out, by the way, the AAL multiplexer 7 selects the ATM cell obtained by AAL-multiplexing the highest-priority CPS packet that contributed to temporary priority inheritance, as the object of the next multiplexing operation, and therefore can guarantee the band for that ATM cell.

The multiplexing operations in this ninth embodiment will be described in the foregoing. All that remains now is to describe why uncontrolled priority inversions do not occur, using a specific example. Let it be assumed, for example, that, at the point in time where user data of AAL type-2 and QoS class 3 are AAL multiplexed and formed into an ATM cell, a CPS packet having a QoS class of 1 is input to the buffer 51E for packets to be AAL multiplexed, and that, at point in time, the length L of the wait queue in the buffer 51E for packets to be AAL multiplexed exceeds the critical level L1.

At this time, the buffer 51E for packets to be AAL multiplexed requests the temporary inheritance of a priority from the temporary priority inheritance module 12. At this juncture, moreover, the QoS class of the CPS packet for which the priority inheritance was requested is a higher priority than the QoS class of the ATM cell held in the buffer 8 for ATM cells (AAL 2) to be sent.

That being so, the temporary priority inheritance module 12 makes the decision to use the QoS class 1 notified of as a temporary QoS class, and notifies the ATM multiplexer 3 of that fact. Thereupon, because the ATM cell (AAL 2) QoS class so notified is the highest, the ATM multiplexer 3 gives priority to the ATM multiplexing [of that ATM cell (AAL 2)] over other ATM cells (AAL 1 and 5).

When that ATM cell is read out, moreover, an ATM cell formed by AAL-multiplexing the CPS packet that temporarily inherited the priority to that ATM cell is written to the buffer 8 for ATM cells (AAL 2) to be sent and is read out on a priority bases just as the earlier ATM cell (AAL 2).

In this manner the priority transfer of CPS packets (user data) having a QoS class of high priority is guaranteed. When this is the case, moreover, ATM cells (AAL 2) that have inherited a priority higher than their own priority are also transferred, wherefore this can be guaranteed even in cases where the demands are strict in terms of loss rate.

(I-3) Benefits of the Ninth Embodiment

As based on the ATM cell multiplexing apparatus in this embodiment, as described in the foregoing, not only is the unified control of AAL type-1 and type-5 possible while maintaining high multiplexing effectiveness, but priority levels in QoS classes and ATM cell loss rates can also be guaranteed, and the benefits noted below can also be gained.

That is, the same benefits can be realized simpler and faster than with the sixth embodiment. In the case of this ninth embodiment, moreover, it is possible to eliminate the necessity of providing an area for holding the original QoS class.

(J) Tenth Embodiment (J-1) Apparatus Configuration

Figure 11:
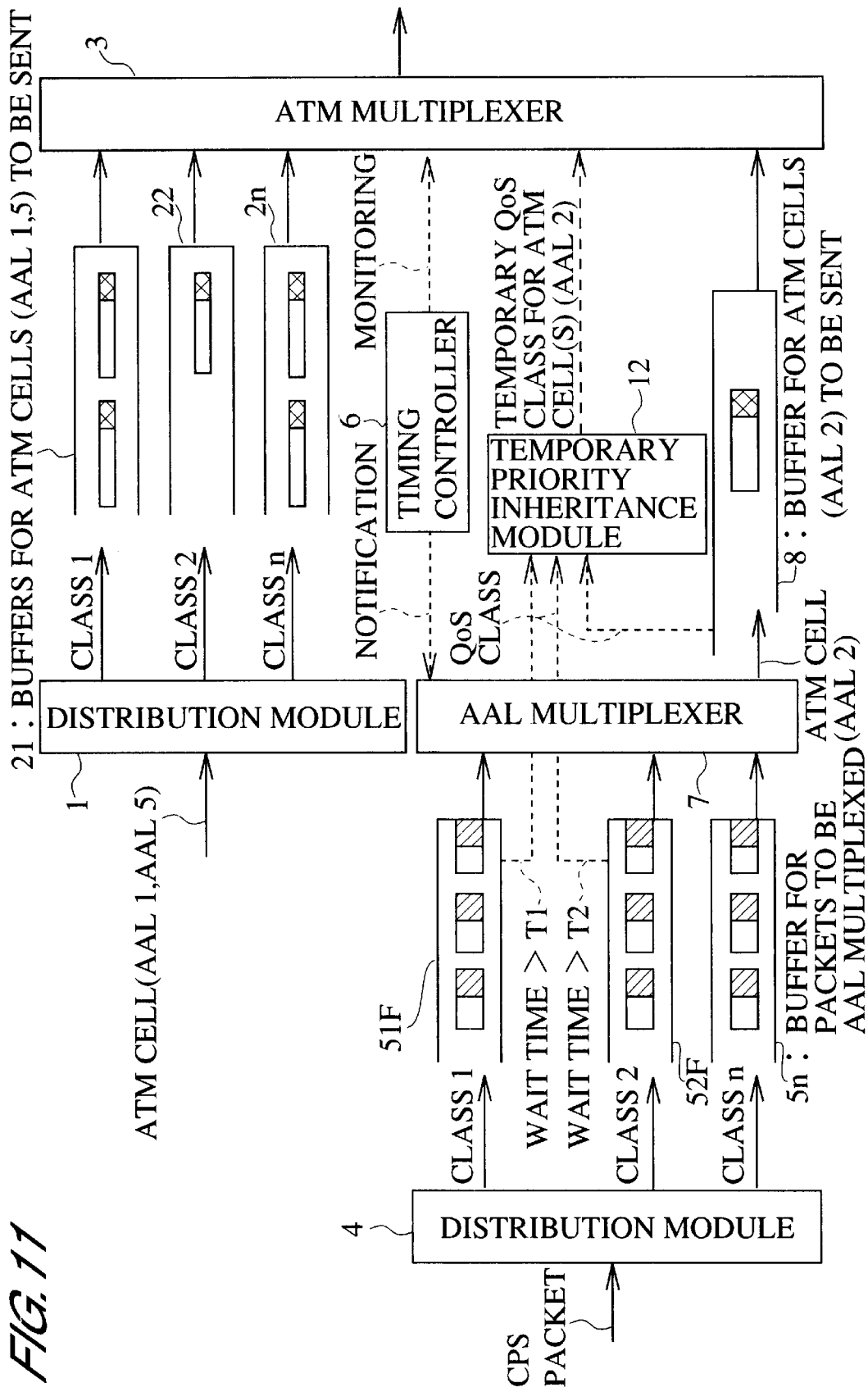
FIG. 11 is a functional block configuration diagram of a tenth embodiment of an ATM cell multiplexing apparatus according to the invention.

A functional block configuration diagram of an ATM cell multiplexing apparatus according to the tenth embodiment is shown in FIG. 11. In FIG. 11, parts that are the same as or that correspond to the parts shown in FIG. 6 are designated by the same or corresponding symbols, respectively. That is because the configuration of this tenth embodiment is based on the configuration of the fifth embodiment.

The relationship between this tenth embodiment and the fifth embodiment, moreover, is the same as that between the seventh embodiment and the fourth embodiment. That is, a conditional priority inheritance function has been added to the apparatus of the fifth embodiment.

In the fifth embodiment, the highest priority of the CPS packets awaiting multiplexing is unconditionally inherited, but the fundamental objective here can be attained by executing priority inheritance only in cases where the QoS class cannot otherwise be guaranteed. That being so, in this tenth embodiment, a function is added to the apparatus of the fifth embodiment for performing priority inheritance conditionally.

In this embodiment, however, the condition that is employed is whether or not the wait time T in the buffer 5iF (where i=1, 2, ... n−1) for packets to be AAL multiplexed corresponding to a QoS class exceeds a critical level (i.e. the boundary value Ti (where i=1, 2, ... n−1) where the possibility arises of being unable to guarantee the QoS when the wait time exceeds that critical level) established separately for each buffer.

When the wait time exceeds the critical level, there is a high possibility that the QoS cannot be guaranteed. Thereupon, in this embodiment, a function is added for outputting QoS class information to the buffers 5iF (where i=1, 2, ... n−1) for packets to be AAL multiplexed only when the wait time exceeds the critical level. In this way the configuration is made such that priorities are inherited only in cases where there is a possibility of not being able to guarantee a QoS.

(J-2) Multiplexing Operations

The multiplexing operations in the ATM multiplex-transmission apparatus having such a configuration will be described next. For this embodiment, moreover, because of the characteristics resident in the AAL type-2 ATM multiplex-transmission functions, the description focuses on those multiplex-transmission operation.

The ATM multiplex-transmission apparatus, when AAL 2 user data (CPS packets) are input, sends these data to the CPS packet distribution module 4 and executes distribution processing based on the QoS class. The CPS packets are thus written, in the order input, into either the buffers 5iF or the buffer 5n for packets to be multiplexed.

The timing controller 6 synchronizes the AAL multiprocessing timing and the ATM cell transmission timing. When it is time to output ATM cells (AAL 2), the timing controller 6 sends a multiprocessing start request to the AAL multiplexer 7, irrespective of the input traffic volume. The AAL multiplexer 7 makes the reading out of CPS packets and the multiple inclusion thereof in an ATM cell (AAL 2). That is, in the AAL multiplexer 7, the CPS packets are read out in accordance with the processing start timing so notified, and the CPS packet(s) read out are multiply included in an ATM cell (AAL 2). The When this is done, even when there are not enough CPS packets present in the buffers 5iF (where i=1 to n−1) and 5n for packets to be AAL multiplexed to sufficiently fill out an ATM cell payload, the ATM cell, after partially including the CPS packets, is sent to the buffers for ATM cells (AAL 2) to be sent.

Now, in parallel with this processing, in the n−1 buffers 5iF (where i=1 to n−1) for packets to be AAL multiplexed, which exclude the buffer 5n for packets to be AAL multiplexed that has the lowest priority, monitoring is performed to determine whether or not the wait time T at the current point in time exceeds a critical level Ti determined for each QoS class and, when it is judged that the wait time has exceeded a critical level, and only then, QoS class information is communicated to the temporary priority inheritance module 12.

Needless to say, moreover, the output of QoS class information ceases (priority inheritance is not requested) as soon as the wait time falls below the critical levels determined for the QoS classes.

The temporary priority inheritance module 12 thus compares a QoS class that it is notified of (or the QoS class of highest priority when there is a plurality of such notifications) against the QoS class of the ATM cell held in the buffer 8 for ATM cells (AAL 2) to be sent, and determines which is higher, only in cases where a CPS packet exists for which the inheritance of a priority is requested.

Here, when it is determined that the CPS packet awaiting multiplexing has the higher priority, the temporary priority inheritance module 12 notifies the ATM multiplexer 3 that the priority (QoS class) of that CPS packet is the virtual QoS class for the ATM cell (AAL 2) in the buffer 8 for ATM cells (AAL 2) to be sent. That is, notification is made of a QoS class that differs from the actual QoS class.

So long as the demanded band does not exceed the band that can be supplied, the ATM multiplexer 3 reads out the ATM cell (AAL 2) written to the buffer 8A for ATM cells (AAL 2) to be sent with timing synchronized to that writing to the ATM multiplexer 3.

When the demanded band does exceed the band that can be supplied, however, the ATM multiplexer 3 will determine the multiplexing order of ATM cells in the order of priority. Even in that case, however, the ATM multiplexer 3 determines the multiplexing order based on the virtual QoS class notified thereto from the temporary priority inheritance module 12, wherefore multiplexing will be conducted on a priority basis even when the actual QoS class is low.

Furthermore, the QoS class of the ATM cells (AAL 2) actually multiplexed is still the original class, but, because multiprocessing is performed in the order determined, the multiplexing operations are not affected after the multiplexing order has once been determined. On the contrary, as was already described in conjunction with the fourth embodiment, when a change develops in an actual QoS class, there is a danger of user data being transposed during transmission, wherefore this is necessary in order to eliminate that danger.

When the ATM cells described in the foregoing are read out, by the way, the AAL multiplexer 7 selects the ATM cell obtained by AAL-multiplexing the highest-priority CPS packet that contributed to temporary priority inheritance, as the object of the next multiplexing operation, and therefore can guarantee the band for that ATM cell.

The multiplexing operations in this embodiment are described in the foregoing. All that remains now is to describe why uncontrolled priority inversions do not occur, using a specific example. Let it be assumed, for example, that, at the point in time where user data of AAL type-2 and QoS class 3 are AAL multiplexed and formed into an ATM cell, a CPS packet having a QoS class of 1 is input to the buffer 51F for packets to be AAL multiplexed, and that, at point in time, the wait time T in the buffer 51F for packets to be AAL multiplexed exceeds the critical level T1.

At this time, the buffer 51F for packets to be AAL multiplexed requests the temporary inheritance of a priority from the temporary priority inheritance module 12. At this juncture, moreover, the QoS class of the CPS packet for which the priority inheritance was requested is a higher priority than the QoS class of the ATM cell held in the buffer 8 for ATM cells (AAL 2) to be sent.

That being so, the temporary priority inheritance module 12 makes the decision to use the QoS class notified of as a temporary QoS class, and notifies the ATM multiplexer 3 of that fact. Thereupon, because the ATM cell (AAL 2) QoS class so notified of is the highest, the ATM multiplexer 3 gives priority to the ATM multiplexing of that ATM cell (AAL 2) over other ATM cells (AAL 1 and 5).

When that ATM cell is read out, moreover, an ATM cell formed by AAL-multiplexing the CPS packet that tempo-rarily inherited the priority to that ATM cell is written to the buffer 8 for ATM cells (AAL 2) to be sent and is read out on a priority bases just as the earlier ATM cell (AAL 2).

In this manner the priority transfer of CPS packets (user data) having a QoS class of high priority is guaranteed. When this is the case, moreover, ATM cells (AAL 2) that have inherited a priority higher than their own priority are also transferred, wherefore this can be guaranteed even in cases where the demands are strict in terms of loss rate.

(J-3) Benefits of the Tenth Embodiment

As based on the ATM cell multiplexing apparatus in this embodiment, as described in the foregoing, not only is the unified control of AAL type-1 and type-5 possible while maintaining high multiplexing effectiveness, but priority levels in QoS classes and ATM cell loss rates can also be guaranteed, and the benefits noted below can also be gained.

That is, the same benefits can be realized simpler and faster than with the sixth embodiment. In the case of this tenth embodiment, moreover, it is possible to eliminate the necessity of providing an area for holding the original QoS class.

(K) Eleventh Embodiment (K-1) Apparatus Configuration

Figure 12:
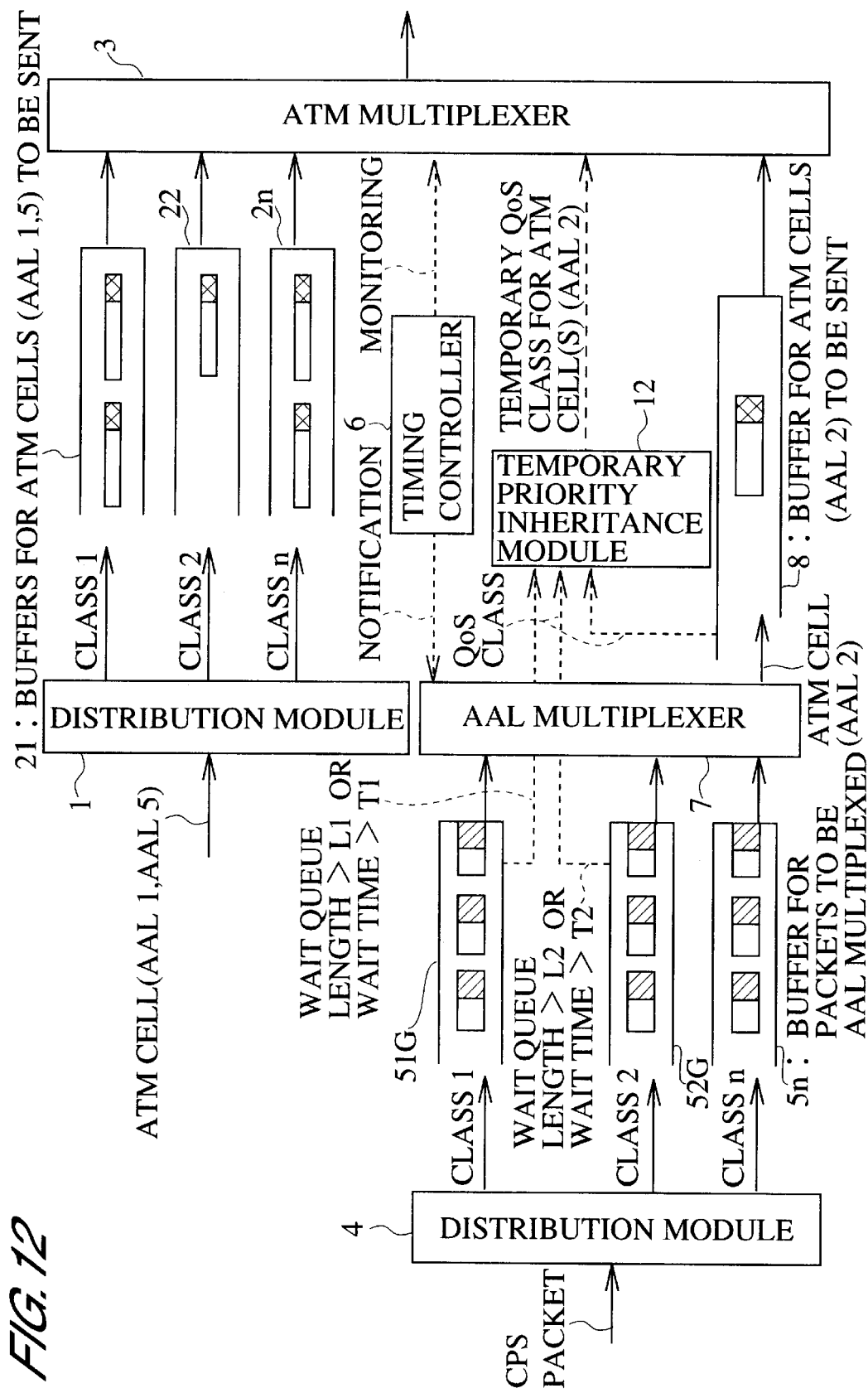
FIG. 12 is a functional block configuration diagram of an eleventh embodiment of an ATM cell multiplexing apparatus according to the invention.

A functional block configuration diagram of an ATM cell multiplexing apparatus in an eleventh embodiment is shown in FIG. 12. In FIG. 12, parts that are the same as or that correspond to the parts shown in FIG. 6 are designated by the same or corresponding symbols, respectively. That is because the configuration of this eleventh embodiment is based on the configuration of the fifth embodiment.

The relationship between this eleventh embodiment and the fifth embodiment, moreover, is the same as that between the eighth embodiment and the fourth embodiment. That is, a conditional priority inheritance function has been added to the apparatus of the fifth embodiment.

In the fifth embodiment, the highest priority of the CPS packets awaiting multiplexing is unconditionally inherited, but the fundamental objective here can be attained by executing priority inheritance only in cases where the QoS class cannot otherwise be guaranteed. That being so, in this eleventh embodiment, a function is added to the apparatus of the fifth embodiment for performing priority inheritance conditionally.

In this eleventh embodiment, however, the number of conditions used is 2. That is, in this eleventh embodiment, the configuration is made so that both wait queue length and wait time are used as determining conditions, and priority inheritance is only permitted when one of those conditions is fulfilled.

More specifically, it is determined that there is a high possibility that the QoS cannot be guaranteed, and QoS class information is output, (1) when the length L of the wait queue in a buffer 5iG (where i=1, 2, ... n−1) for packets to be AAL multiplexed corresponding to a QoS class exceeds a critical level (i.e. the boundary value Li (where i=1, 2, ... n−1) where the possibility arises of the QoS being unguaranteeable when the length of the wait queue exceeds that critical level) established separately for each buffer, or (2) when a wait time Tin each buffer 5iG (where i=1, 2, ... . n−1) for packets to be AAL multiplexed corresponding to a QoS class exceeds a critical level (i.e. a boundary value Ti (where i=1, 2, ... n−1) at which the possibility arises of being unable to guarantee the QoS when the wait time exceeds that critical level) established separately for each buffer.

(K-2) Multiplexing Operation

The multiplexing operations in the ATM multiplex-transmission apparatus having such a configuration will be described next. For this eleventh embodiment, moreover, because of the characteristics resident in the AAL type-2 ATM multiplex-transmission functions, the description focuses on those multiplex-transmission operation.

The ATM multiplex-transmission apparatus, when AAL 2 user data (CPS packets) are input, sends these data to the CPS packet distribution module 4 and executes distribution processing based on the QoS class. The CPS packets are thus written, in the order input, into either the buffers 5iG or the buffer 5n for packets to be multiplexed.

The timing controller 6 synchronizes the AAL multiprocessing timing and the ATM cell transmission timing. When it is time to output ATM cells (AAL 2), the timing controller 6 sends a multiprocessing start request to the AAL multiplexer 7, irrespective of the input traffic volume. The AAL multiplexer 7 makes the reading out of CPS packets and the multiple inclusion thereof in an ATM cell (AAL 2). That is, in the AAL multiplexer 7, the CPS packets are read out in accordance with the processing start timing so notified, and the CPS packet(s) read out are multiply included in an ATM cell (AAL 2).

When this is done, even when there are not enough CPS packets present in the buffers 5iG (where i=1 to n−1) and 5n for packets to be AAL multiplexed to sufficiently fill out an ATM cell payload, the ATM cell, after partially including the CPS packets, is sent to the buffers for ATM cells (AAL 2) to be sent.

Now, in parallel with this processing, in the n−1 buffers 5iG (where i=1 to n−1) for packets to be AAL multiplexed, which exclude the buffer 5n for packets to be AAL multiplexed that has the lowest priority, monitoring is performed to determine whether or not either the wait queue length L or the wait time T at the current point in time exceeds a critical level (i.e. the length Li for a wait queue, and the length Ti for a wait time) determined for each QoS class and, when it is judged that either the wait queue length or the wait time has exceeded a critical level, the QoS class information is communicated to the temporary priority inheritance module 12.

Needless to say, moreover, the output of QoS class information ceases (priority inheritance is not requested) as soon as both the wait queue length and the wait time fall below the critical levels determined for the QoS classes.

The temporary priority inheritance module 12 thus compares a QoS class that it is notified of (or the QoS class of highest priority when there is a plurality of such notifications) against the QoS class of the ATM cell held in the buffer 8 for ATM cells (AAL 2) to be sent, and determines which is higher, only in cases where a CPS packet exists for which the inheritance of a priority is requested.

Here, when it is determined that the CPS packet awaiting multiplexing has the higher priority, the temporary priority inheritance module 12 notifies the ATM multiplexer 3 that the priority (QoS class) of that CPS packet is the virtual QoS class for the ATM cell (AAL 2) in the buffer 8 for ATM cells (AAL 2) to be sent. That is, notification is made of a QoS class that differs from the actual QoS class.

So long as the demanded band does not exceed the band that can be supplied, the ATM multiplexer 3 reads out the ATM cell (AAL 2) written to the buffer 8A for ATM cells (AAL 2) to be sent with timing synchronized to that writing to the ATM multiplexer 3.

When the demanded band does exceed the band that can be supplied, however, the ATM multiplexer 3 will determine the multiplexing order of ATM cells in the order of priority. Even in that case, however, the ATM multiplexer 3 determines the multiplexing order based on the virtual QoS class notified thereto from the temporary priority inheritance module 12, wherefore multiplexing will be conducted on a priority basis even when the actual QoS class is low.

Furthermore, the QoS class of the ATM cells (AAL 2) actually multiplexed is still the original class, but, because multiprocessing is performed in the order determined, the multiplexing operations are not affected after the multiplexing order has once been determined. On the contrary, as was already described in conjunction with the fourth embodiment, when a change develops in an actual QoS class, there is a danger of user data being transposed during transmission, wherefore this is necessary in order to eliminate that danger.

When the ATM cells described in the foregoing are read out, by the way, the AAL multiplexer 7 selects the ATM cell obtained by AAL-multiplexing the highest-priority CPS packet that contributed to temporary priority inheritance, as the object of the next multiplexing operation, and therefore can guarantee the band for that ATM cell.

The multiplexing operations in this embodiment are as described in the foregoing. Furthermore, cases where priority inheritance is performed in this eleventh embodiment correspond at least to either the case where priority inheritance is performed in the ninth embodiment or the case where priority inheritance is performed in the tenth embodiment. Since uncontrolled priority inversion does not occur in either of those cases, uncontrolled priority inversion can be effectively avoided in this embodiment also, for the same reasons.

(K-3) Benefits of the Eleventh Embodiment

Thus, with this embodiment also, not only is the unified control of AAL type-1 and type-5 possible while maintaining high multiplexing effectiveness, but priority levels in QoS classes and ATM cell loss rates can also be guaranteed, and the benefits noted below can also be gained.

That is, as based on the ATM cell multiplexing apparatus in this embodiment, temporary priority inheritance is executed conditionally, and temporary priority inheritance is performed at the stage where a condition is satisfied based on either one of two judgment criteria. Therefore, as compared to the case where that judgment is made on the bases of only one of those two conditions, the possibility of the occurrence of a priority inversion between an ATM cell of AAL type-2, on the one hand, and an ATM cell of AAL type-1 or type-5, on the other, can be significantly reduced.

(L) Twelfth Embodiment (L-1) Apparatus Configuration

Figure 13:
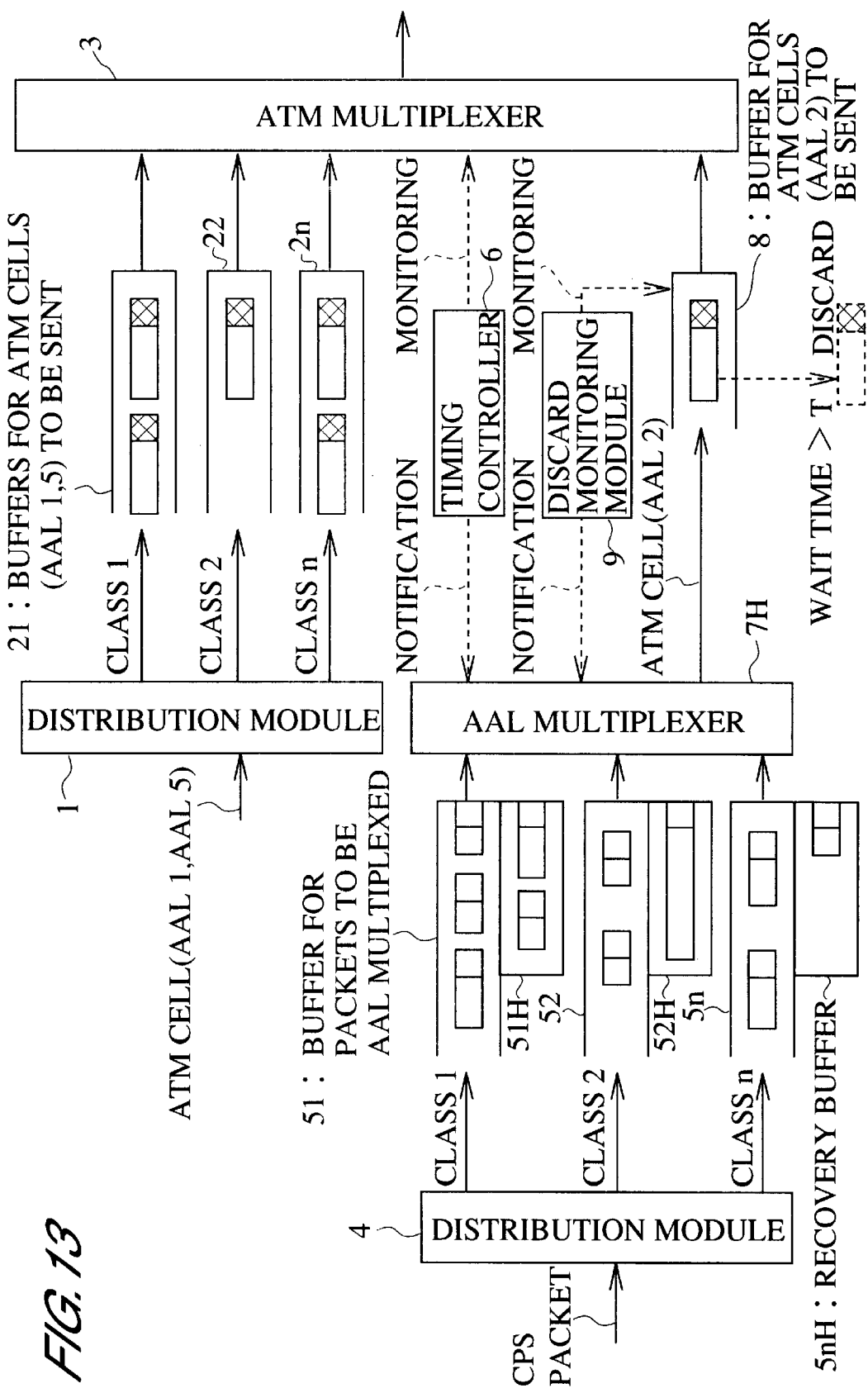
FIG. 13 is a functional block configuration diagram of a twelfth embodiment of an ATM cell multiplexing apparatus according to the invention.

A functional block configuration diagram of an ATM cell multiplexing apparatus according to an twelfth embodiment is shown in FIG. 13. In FIG. 13, parts that are the same as or that correspond to the parts shown in FIG. 2 are designated by the same or corresponding symbols, respectively. That is because the configuration of this twelfth embodiment is based on the configuration of the first embodiment.

The point of difference between this twelfth embodiment and the first embodiment is that, in the latter, recovery buffers 5iH (where i=1, 2, . . . n) are provided to make it possible to resend discarded ATM cells (AAL 2).

The functional configuration of each part is now described with an emphasis on the configurational differences noted. The ATM cell multiplexing apparatus in this embodiment, moreover, is configured with a distribution module 1, buffers 2i for ATM cells (AAL 1 and 5) to be sent, an ATM multiplexer 3, a CPS packet distribution module 4, buffers 5i for packets to be AAL multiplexed, recovery buffers 5iH, an AAL multiplexers 7H, a buffers for ATM cells (AAL 2) to be sent, and a discard monitoring module 9.

Of these components, the recovery buffers 5iH (where i=1, 2, . . . n) are memory means capable of holding a plurality of CPS packets, provided according to the number of QoS classes (n buffers in the case shown in FIG. 13). These recovery buffers 5iH are means for temporarily holding CPS packets read out for AAL multiplexing, in anticipation of their being discarded. They hold the CPS packets until it is indicated that they be discarded. The copying of CPS packets, to these recovery buffers 5iH is performed simultaneously with AAL multiplexing.

The AAL multiplexer 7H, under normal circumstances (when there is no notification of cell discard), is the means for determining the buffer 5i for packets to be AAL multiplexed that is to read out the CPS packets so that the band demanded for each QoS class is guaranteed, as well as the means for multiplexing the read CPS packets in an ATM cell format and outputting them to a buffer 8 for ATM cells (AAL 2) to be sent. When a cell discard notification has been sent from the discard monitoring module 9, however, the AAL multiplexer 7H is made so that it designates the next CPS packet to be multiplexed having the highest priority (i.e. the lowest QoS class), reads this out, and multiplexes it to an ATM cell.

The AAL multiplexer 7H is also provided with the function described next, which is a function peculiar to this embodiment. That is, the AAL multiplexer 7H, in cases where the same QoS class as the previously discarded ATM cell becomes the subject of the next AAL multiplexing, reads out the CPS packet from the recovery buffer 5iH corresponding to that same QoS class and performs AAL multiplexing once more.

When there are few CPS packets in the recovery buffers 5iH, the AAL multiplexer 7H AAL-multiplexes those together with other CPS packets in the buffers 5i for packets to be AAL multiplexed in order to raise AAL multiplexing efficiency. This is done, of course, when other CPS packets already exist in the buffers 5i for packets to be AAL multiplexed. When AAL multiplexing is performed together with other CPS packets in the buffers 5i for packets to be AAL multiplexed, the CPS packets that have newly become subjects for multiplexing are add-copied to the recovery buffers 5iH (i.e. not overwritten).

The AAL multiplexer 7H also controls the number of times such re-AAL-multiplexing operations are done and, when that number exceeds a predetermined number, no longer reads out from the recovery buffers 5iH, but issues a command to discard the CPS packets stored in the recovery buffers 5iH.

(L-2) Multiplexing Operations

The multiplexing operations in the ATM multiplex-transmission apparatus having such a configuration will be described next. For this twelfth embodiment, moreover, because of the characteristics resident in the AAL type-2 ATM multiplex-transmission functions, the description focuses on those multiplex-transmission operation.

The ATM multiplex-transmission apparatus, when AAL 2 user data (CPS packets) are input, sends these data to the CPS packet distribution module 4 and executes distribution processing based on the QoS class. The CPS packets are thus written, in the order input, into the corresponding buffers 5i (=1, 2, . . . n) for packets to be multiplexed.

The timing controller 6 synchronizes the AAL multiprocessing timing and the ATM cell (AAL 2) transmission timing. When it is time to output ATM cells (AAL 2), the timing controller 6 sends a multiprocessing start request to the AAL multiplexer 7H, irrespective of the input traffic volume. The AAL multiplexer 7H makes the reading out of CPS packets and the multiple inclusion thereof in an ATM cell (AAL 2). That is, in the AAL multiplexer 7, the CPS packets are read out in accordance with the processing start timing so notified, and the CPS packets read out are multiply included in an ATM cell (AAL 2).

When this is done, even when there are not enough CPS packets present in the buffers 5i (where i=1, 2, . . . n) for packets to be AAL multiplexed to sufficiently fill out an ATM cell payload, the AAL multiplexer 7H makes inclusion of the CPS packet or packets in a part of an ATM cell (AAL 2) and then sends that ATM cell (AAL 2) to the buffer 8 for ATM cells (AAL 2) to be sent.

When this is done, moreover, the AAL-multiplexed CPS packets are overwrite-copied to the recovery buffers 5iH (where i=1, 2, . . . n) (whereupon the CPS packets that were already there disappear).

After that, so long as the band demanded for the ATM multiplexer 3 does not exceed the band that can be supplied, the ATM cells (AAL 2) written into the buffer 8 for ATM cells (AAL 2) to be sent are read out and ATM-multiplexed with timing synchronized to that write operation.

However, when the demanded band does exceed the band that can be provided, and ATM cell multiprocessing in the ATM multiplexer 3 is being performed in the order of priority, the ATM cells (AAL 2) are not sent out unless their QoS class is higher than the QoS class of the other ATM cells (AAL 1 and 5).

Here, the ATM cell (AAL 2) written to the buffer 8 for ATM cells (AAL 2) to be sent is output immediately if its QoS class is higher than that of the other ATM cells (AAL 1 and 5). When, on the other hand, the ATM cell (AAL 2) has a QoS class that is lower than the QoS class of the other ATM cells (AAL 1 and 5), the ATM cell (AAL 2) is not read out and, accordingly, a situation ensues wherein the wait period exceeds the prescribed time-over period T.

In this case, the buffer 8 for ATM cells to be sent discards the ATM cell (AAL 2) currently held therein and enters a state preparative to transmitting CPS packets of high priority.

When such ATM cell discarding occurs, the discard monitoring module 9 detects this and notifies the AAL multiplexer 7H of the occurrence of that ATM cell discarding. When it has confirmed that an ATM cell has been discarded, the AAL multiplexer 7H reads out the CPS packets of the lowest QoS class (i.e. highest priority) from among the CPS packets stored in the buffers 5i for packets to be AAL multiplexed and AAL-multiplexes these in ATM cell format.

As a result, the priority of the ATM cell held in the buffer 8 for ATM cells (AAL 2) to be sent becomes higher, in general, than the immediately previous priority (although it is also possible that that priority will be the same). The ATM multiplexer 3 performs priority determination between the newly replaced ATM cell (AAL 2) and the other ATM cells (AAL 1 and 5), and, based on the results of that determination, performs ATM multiplexing in the prescribed order. When this is done, if the priority of the AAL type-2 ATM cell is higher than that of the other types of ATM cells (AAL 1 and 5), those AAL type-2 ATM cells will be transmitted without fail, even when the demanded band exceeds the band that can be provided.

Now, a characteristic of this AAL multiplexer 7H is that, when the AAL multiplexing operation associated with such discarding is completed, it awaits the arrival of the next AAL multiplexing timing, and makes selections of buffers 5i for packets to be AAL multiplexed so that each QoS class band is filled. When a buffer 5i for packets to be AAL multiplexed is selected, the AAL multiplexer 7H verifies for that buffer that no discarding has occurred with respect to a previously read CPS packet.

If the previous ATM cell has been normally ATM-multiplexed, the AAL multiplexer 7H AAL-multiplexes the CPS packet(s) in the buffers 5i for packets to be AAL multiplexed (so that they are simultaneously copied to the recovery buffers 5iH).

When, on the other hand, the previous ATM cell has been discarded, the AAL multiplexer 7H once more reads out and AAL-multiplexes the CPS packets copied to the recovery buffers 5iH. Here, when there are small number of CPS packets in the recovery buffers 5iH (not enough for one ATM cell), and CPS packet is present in the buffers 5i for packets to be AAL multiplexed, the former CPS packets to which the CPS packet or packets present in those buffers 5i for packets to be AAL multiplexed have been added is AAL-multiplexed and simultaneously add-copied (not overwritten) to the recovery buffers 5iH in order to enhance AAL-multiplexing efficiency.

This operation is executed again and again so long as that ATM cell (AAL 2) is discarded repeatedly. However, at the point in time where it is judged in the AAL multiplexer 7H that a predetermined number of re-AAL-multiplexing operations has been exceeded, the CPS packet or packets in the recovery buffers 5iH are discarded without being re-AAL-multiplexed.

(L-3) Benefits of the Twelfth Embodiment

As based on the ATM cell multiplexing apparatus in this embodiment, described in the foregoing, the configuration is made so that, when the wait time for ATM cell (AAL 2) in the buffer 8 for ATM cells (AAL 2) to be sent exceeds a prescribed time-over period T, that cell is discarded. Therefore, the danger of ATM cells of relatively high priority (i.e. low QoS class) being made to wait for an unlimited period of time by ATM cells of relatively low priority (i.e. high QoS class) can be definitely eliminated (so that no uncontrolled priority inversions occur).

In addition, because another ATM-multiplexing opportunity is provided even to ATM cells that are discarded to avoid uncontrolled priority inversions, the probability of cell losses occurring can be reduced, and cell loss rates can be guaranteed.

(M) Thirteenth Embodiment (M-1) Apparatus Configuration

Figure 14:
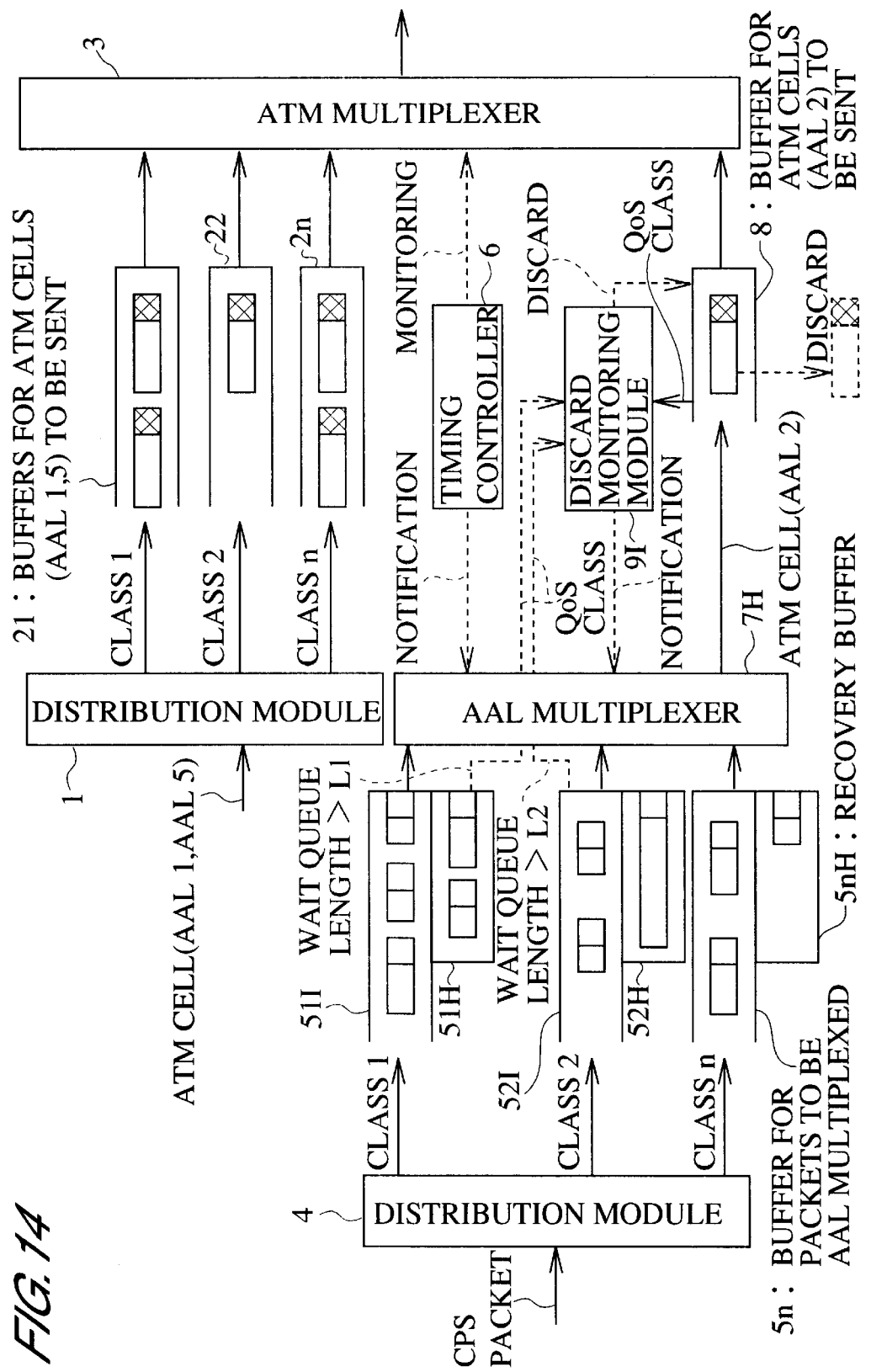
FIG. 14 is a functional block configuration diagram of a thirteenth embodiment of an ATM cell multiplexing apparatus according to the invention.

A functional block configuration diagram of an ATM cell multiplexing apparatus in a thirteenth embodiment is shown in FIG. 14. In FIG. 14, parts that are the same as or that correspond to the parts shown in FIG. 13 are designated by the same or corresponding symbols, respectively. That is because the configuration of this thirteenth embodiment is based on the configuration of the twelfth embodiment.

The difference between this thirteenth embodiment and the twelfth embodiment is one of whether ATM cell discarding is performed conditionally (variably) or unconditionally (fixedly). That is, the twelfth embodiment is configured so that, when the wait time for the ATM cell waiting in the buffer 8 for ATM cells to be sent exceeds a prescribed time-over period T, that ATM cell is unconditionally discarded. The fundamental objective here can be achieved, however, by executing such ATM cell discarding only in cases where the QoS class cannot be guaranteed.

That being so, in this thirteenth embodiment, a function is added to the twelfth embodiment for inducing ATM cell discarding conditionally.

In this thirteenth embodiment, what is used as the condition is whether or not the length L of a wait queue in the buffers 5iI (where i=1, 2, . . . n–1) for packets to be AAL multiplexed corresponding to a QoS class exceeds a critical level (i.e. the boundary value Li (where i=1, 2, . . . n–1) where the possibility arises of the QoS being unguaranteeable when the length of the wait queue exceeds that critical level) established separately for each buffer.

When the length of the wait queue exceeds the critical level, there is a high possibility that the QoS cannot be guaranteed. Thereupon, in this embodiment, a function is added for outputting QoS class information to the buffers 5iI (where i=1, 2, . . . . n–1) for packets to be AAL multiplexed when the length of the wait queue exceeds the critical level. Thus the configuration is made such that an ATM cell discard request is caused to be output only in cases where there is a possibility of not being able to guarantee a QoS.

However, there is no need for discarding if the priority in the buffer 5iI for packets to be AAL multiplexed that requested the discard is lower. Thereupon, in the discard monitoring module 9I in this embodiment, a function is provided wherewith, when QoS classes that constitute discard requests are provided from one or more of the buffers 5iI (where i=1, 2, . . . n–1) for packets to be AAL multiplexed, those are compared against the QoS class of the ATM cell held in the buffer 8 for ATM cells (AAL 2) to be sent to determine which is smaller (i.e. which has the higher priority).

The discard monitoring module 9I, thereupon, issues a discard command to the buffer 8 for ATM cells (AAL 2) to be sent only if the QoS class in the buffer(s) 5iI for packets to be AAL multiplexed that issued the discard request is the smaller one (i.e. when the priority therein is higher).

(M-2) Multiplexing Operations

The multiplexing operations in the ATM multiplex-transmission apparatus having such a configuration will be described next. For this embodiment, moreover, because of the characteristics resident in the AAL type-2 ATM multiplex-transmission functions, the description focuses on those multiplex-transmission operation.

The ATM multiplex-transmission apparatus, when AAL 2 user data (CPS packets) are input, sends these data to the CPS packet distribution module 4 and executes distribution processing based on the QoS class. The CPS packets are thus written, in the order input, into the corresponding buffers 5iI (=1, 2, . . . n–1) and 5n for packets to be multiplexed.

The timing controller 6 synchronizes the AAL multiprocessing timing and the ATM cell (AAL 2) transmission timing. When it is time to output ATM cells (AAL 2), the timing controller 6 sends a multiprocessing start request to the AAL multiplexer 7H, irrespective of the input traffic volume. The AAL multiplexer 7 makes the reading out of CPS packets and the multiple inclusion thereof in an ATM cell (AAL 2). That is, in the AAL multiplexer 7, the CPS packets are read out in accordance with the processing start timing so notified, and the CPS packets read out are multiply included in an ATM cell (AAL 2).

When this is done, even when there are not enough CPS packets present in the buffers 5i (where i=1, 2, . . . n) for packets to be AAL multiplexed to sufficiently fill out an ATM cell payload, the AAL multiplexer 7H makes inclusion of the CPS packet or packets in a part of an ATM cell (AAL 2) and then sends that ATM cell (AAL 2) to the buffer 8 for ATM cells (AAL 2) to be sent.

When this is done, moreover, the AAL-multiplexed CPS packets are overwrite-copied to the recovery buffers 5iH (where i=1, 2, . . . n) (whereupon the CPS packets that were already there disappear).

After that, so long as the band demanded for the ATM multiplexer 3 does not exceed the band that can be supplied, the ATM cell (AAL 2) written into the buffer 8 for ATM cells (AAL 2) to be sent is read out and ATM-multiplexed with timing synchronized to that write operation.

However, when the demanded band does exceed the band that can be provided, and ATM cell multiprocessing in the ATM multiplexer 3 is being performed in the order of priority, the ATM cell (AAL 2) is not sent out unless its QoS class is higher than the QoS class of the other ATM cells (AAL 1 and 5).

Here, the ATM cell (AAL 2) written to the buffer 8 for ATM cells (AAL 2) to be sent is output immediately if its QoS class is higher than that of the other ATM cells (AAL 1 and 5). When, on the other hand, that ATM cell (AAL 2) has a QoS class that is lower than the QoS class of the other ATM cells (AAL 1 and 5), the ATM cell (AAL 2) is not read out and, accordingly, the waiting state continues as is.

Now, in parallel with this processing, the n−1 buffers 5iI (where i=1 to n−1) for packets to be AAL multiplexed, which exclude the buffer 5n for packets to be AAL multiplexed that has the lowest priority, perform monitoring to determine whether or not the length L of the wait queue at the current point in time exceeds a critical level Li determined for each QoS class and, when they judge that the wait queue length has exceeded a critical level, they communicate the QoS class information to the discard monitoring module 9I.

Needless to say, moreover, the output of QoS class information ceases (priority inheritance is not requested) as soon as the length of the wait queue falls below the critical levels determined for the QoS classes.

The discard monitoring module 9I, as soon as it confirms from this QoS class notification that there has been a discard request, compares the QoS class so notified of with the QoS class of the ATM cell held in the buffer 8 for ATM cells (AAL 2) to be sent, and determines which is smaller.

Thereupon, when it is determined that the QoS class of the CPS packet awaiting AAL multiplexing is the smaller (i.e. has the highest priority), the discard monitoring module 9I discards the ATM cell (AAL 2) from the buffer 8 for ATM cells to be sent and notifies the AAL multiplexer 7H that a discard has occurred.

When notification of that ATM cell discard is made, the AAL multiplexer 7H reads out the CPS packet held in the buffer 5iI for packets to be AAL multiplexed that issued the discard request (reading out the CPS packet with the highest priority when more than one discard request has been made), and AAL-multiplexes that CPS packet in ATM cell format.

As a result, the priority of the ATM cell held in the buffer 8 for ATM cells (AAL 2) to be sent becomes higher than the immediately previous priority. The ATM multiplexer 3 performs priority determination between the newly replaced ATM cell (AAL 2) and the other ATM cells (AAL 1 and 5), and, based on the results of that determination, performs ATM multiplexing in the prescribed order. When this is done, if the priority of the AAL type-2 ATM cell is higher than that of the other types of ATM cells (AAL 1 and 5), those AAL type-2 ATM cells will be transmitted without fail, even when the demanded band exceeds the band that can be provided.

Now, a characteristic of this AAL multiplexer 7H is that, when the AAL multiplexing operation associated with such discarding is completed, it awaits the arrival of the next AAL multiplexing timing, and makes selections of buffers 5iI for packets to be AAL multiplexed so that each QoS class band is filled.

When a buffer 5iI for packets to be AAL multiplexed is selected, the AAL multiplexer 7H verifies for that buffer that no discarding has occurred with respect to a previously read CPS packet.

If the previous ATM cell has been normally ATM-multiplexed, the AAL multiplexer 7H AAL-multiplexes the CPS packets in the buffers 5iI for packets to be AAL multiplexed (so that they are simultaneously copied to the recovery buffers 5iH).

When, on the other hand, the previous ATM cell has been discarded, the AAL mutiplexer 7H once more reads out and AAL-multiplexes the CPS packet(s) copied to the recovery buffers 5iH. Here, when there are smaller number of CPS packets in the recovery buffers 5iH (not enough for one ATM cell), and CPS packet is present in the buffers 5iI for packets to be AAL multiplexed, the former CPS packets to which the CPS packets present in those buffers 5iI for packets to be AAL multiplexed have been added is AAL-multiplexed and simultaneously add-copied (not overwritten) to the recovery buffers 5iH in order to enhance AAL-multiplexing efficiency.

This operation is executed again and again so long as that ATM cell (AAL 2) is discarded repeatedly. However, at the point in time where it is judged in the AAL multiplexer 7H that a predetermined number of re-AAL-multiplexing operations has been exceeded, the CPS packet or packets in the recovery buffers 5iH are discarded without being re-AAL-multiplexed.

(M-3) Benefits of the Thirteenth Embodiment

Thus, in this thirteenth embodiment also, as in the twelfth embodiment, both the priority level and the ATM cell loss rate can be guaranteed, while realizing the additional benefit noted below.

That is, as based on the ATM cell multiplexing apparatus in this embodiment, the decision of whether to discard or not is made after determining the status of the CPS packets awaiting AAL multiplexing, wherefore wasteful discard operations can be eliminated.

(N) Fourteenth Embodiment (N-1) Apparatus Configuration

Figure 15:
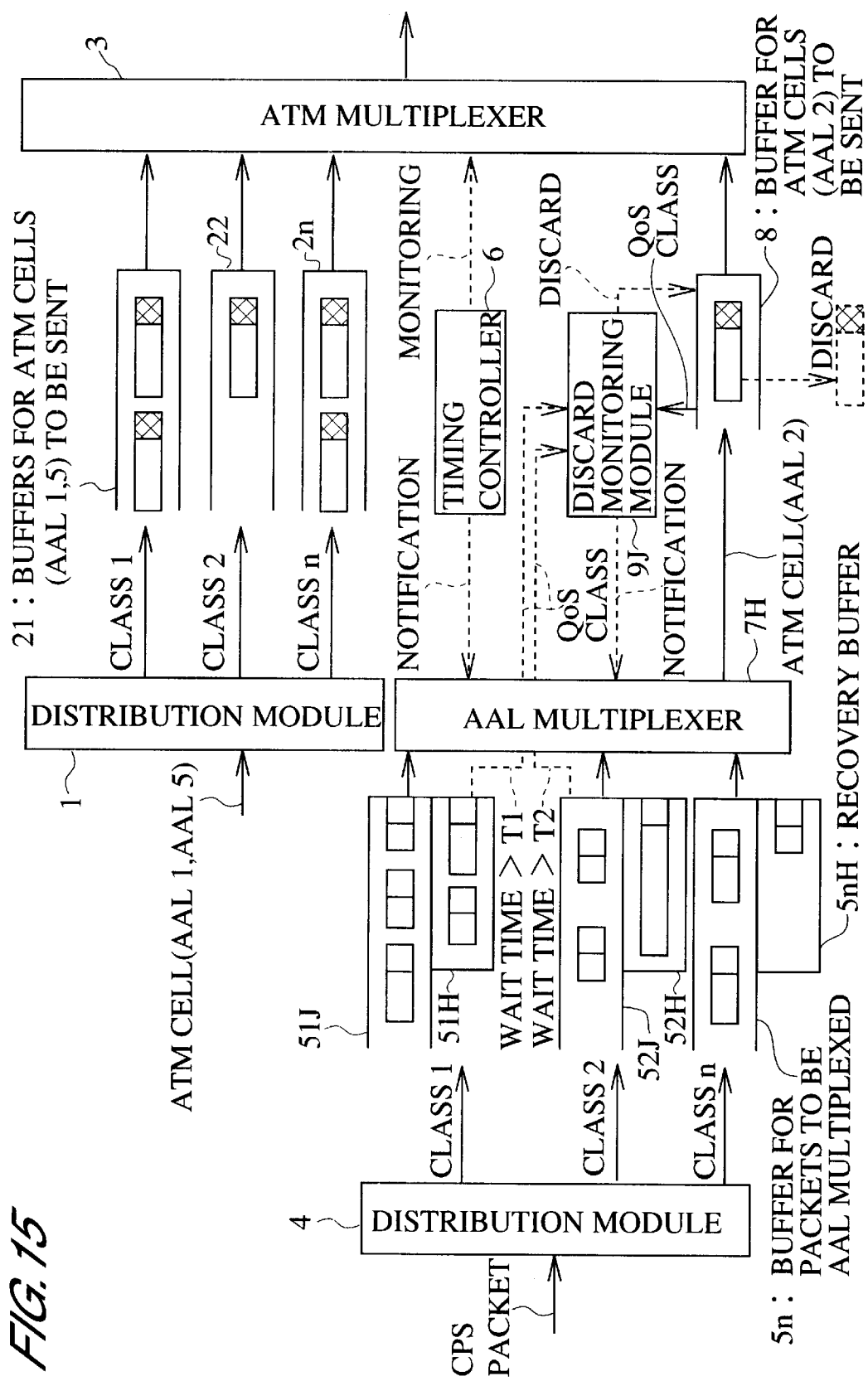

A functional block configuration diagram of an ATM cell multiplexing apparatus according to the fourteenth embodiment is shown in FIG. 15. In FIG. 15, parts that are the same as or that correspond to the parts shown in FIG. 13 are designated by the same or corresponding symbols, respectively. That is because the configuration of this fourteenth embodiment is based on the configuration of the twelfth embodiment.

In the case of this fourteenth embodiment also, as in the thirteenth embodiment, an ATM cell multiplexing apparatus is described which performs discarding conditionally.

However, what is used as that condition differs from what is used in the thirteenth embodiment. Specifically, what is used as the condition in this fourteenth embodiment is whether or not a wait time T in each buffer 5iJ (where i=1, 2, ... n−1) for packets to be AAL multiplexed corresponding to a QoS class exceeds a critical level established for each individual buffer (i.e. a boundary value Ti (where i=1, 2, ... n−1) at which the possibility arises of being unable to guarantee the QoS when the wait time exceeds that critical level).

When a wait time exceeds the critical level, there is a high possibility of the QoS being unguaranteeable. Thereupon, in this embodiment, a function is added to the buffers 5ij (where i=1, 2, ... n−1) for packets to be AAL multiplexed for outputting QoS class information only when the wait time exceeds the critical level, and an ATM cell discard request is caused to be output only in cases where there is a possibility of being unable to guarantee the QoS.

However, there is no need for discarding if the priority in the buffer 5iJ for packets to be AAL multiplexed that requested the discard is lower. Thereupon, in the discard monitoring module 9J in this embodiment, a function is provided wherewith, when QOS classes that constitute discard requests are provided from one or more of the buffers 5iJ (where i=1, 2, . . . n–1) for packets to be AAL multiplexed, those are compared against the QoS class of the ATM cell held in the buffer 8 for ATM cells (AAL 2) to be sent to determine which is smaller (i.e. which has the higher priority).

The discard monitoring module 9J, thereupon, issues a discard command to the buffer 8 for ATM cells (AAL 2) to be sent only if the QoS class in the buffer(s) 5iJ for packets to be AAL multiplexed that issued the discard request is the smaller (i.e. when the priority therein is higher).

(N-2) Multiplexing Operations

The multiplexing operations in the ATM multiplex-transmission apparatus having such a configuration are described next. For this embodiment, moreover, because of the characteristics resident in the AAL type-2 ATM multiplex-transmission functions, the description focuses on those multiplex-transmission operation.

The ATM multiplex-transmission apparatus, when AAL 2 user data (CPS packets) are input, sends these data to the CPS packet distribution module 4 and executes distribution processing based on the QoS class. The CPS packets are thus written, in the order input, into the corresponding buffers 5iJ (=1, 2, . . . n–1) and 5n for packets to be multiplexed.

The timing controller 6 synchronizes the AAL multiprocessing timing and the ATM cell (AAL 2) transmission timing. When it is time to output ATM cells (AAL 2), the timing controller 6 sends a multiprocessing start request to the AAL multiplexer 7H, irrespective of the input traffic volume. The AAL multiplexer 7H makes the reading out of CPS packets and the multiple inclusion thereof in an ATM cell (AAL 2). That is, in the AAL multiplexer 7H, the CPS packets are read out in accordance with the processing start timing so notified, and the CPS packets read out are multiply included in an ATM cell (AAL 2).

When this is done, even when there are not enough CPS packets present in the buffers 5i (where i=1, 2, . . . n) for packets to be AAL multiplexed to sufficiently fill out an ATM cell payload, the AAL multiplexer 7H makes inclusion of the CPS packets in a part of an ATM cell (AAL 2) and then sends that ATM cell (AAL 2) to the buffer 8 for ATM cells (AAL 2) to be sent.

When this is done, moreover, the AAL-multiplexed CPS packets are overwrite-copied to the recovery buffers 5iH (where i=1, 2, . . . n) (whereupon the CPS packets that were already there disappear).

After that, so long as the band demanded for the ATM multiplexer 3 does not exceed the band that can be supplied, the ATM cell (AAL 2) written into the buffer 8 for ATM cells (AAL 2) to be sent is read out and ATM-multiplexed with timing synchronized to that write operation.

However, when the demanded band does exceed the band that can be provided, and ATM cell multiprocessing in the ATM multiplexer 3 is being performed in the order of priority, the ATM cell (AAL 2) is not sent out unless its QoS class is higher than the QoS class of the other ATM cells (AAL 1 and 5).

Here, the ATM cell (AAL 2) written to the buffer 8 for ATM cells (AAL 2) to be sent is output immediately if its QoS class is higher than that of the other ATM cells (AAL 1 and 5). When, on the other hand, the ATM cell (AAL 2) has a QoS class that is lower than the QoS class of the other ATM cells (AAL 1 and 5), the ATM cell (AAL 2) is not read out and, accordingly, the waiting state continues as is.

Now, in parallel with this processing, the n–1 buffers 5iJ (where i=1 to n–1) for packets to be AAL multiplexed, which exclude the buffer 5n for packets to be AAL multiplexed that has the lowest priority, perform monitoring to determine whether or not the wait time T at the current point in time exceeds a critical level Ti determined for each QoS class and, when they judge that the wait time has exceeded a critical level, they communicate the QoS class information to the discard monitoring module 9J.

Needless to say, moreover, the output of QoS class information ceases (priority inheritance is not requested) as soon as the CPS packet wait time falls below the critical levels determined for the QoS classes.

The discard monitoring module 9J, as soon as it confirms from this QoS class notification that there has been a discard request, compares the QoS class so notified of with the QoS class of the ATM cell held in the buffer 8 for ATM cells (AAL 2) to be sent, and determines which is smaller.

Thereupon, when it is determined that the QoS class of the CPS packet awaiting AAL multiplexing is the smaller one (i.e. has the highest priority), the discard monitoring module 9J discards the ATM cell (AAL 2) from the buffer 8 for ATM cells to be sent and notifies the AAL multiplexer 7H that a discard has occurred.

When notification of that ATM cell discard is made, the AAL multiplexer 7H reads out the CPS packet held in the buffer 5iJ for packets to be AAL multiplexed that issued the discard request (reading out the CPS packet with the highest priority when more than one discard request has been made), and AAL-multiplexes that CPS packet in ATM cell format.

As a result, the priority of the ATM cell held in the buffer 8 for ATM cells (AAL 2) to be sent becomes higher than the immediately previous priority. The ATM multiplexer 3 performs priority determination between the newly replaced ATM cell (AAL 2) and the other ATM cells (AAL 1 and 5), and, based on the results of that determination, performs ATM multiplexing in the prescribed order. When this is done, if the priority of the AAL type-2 ATM cell is higher than that of the other types of ATM cells (AAL 1 and 5), that AAL type-2 ATM cell will be transmitted without fail, even when the demanded band exceeds the band that can be provided.

Now, a characteristic of this AAL multiplexer 7H is that, when the AAL multiplexing operation associated with such discarding is completed, it awaits the arrival of the next AAL multiplexing timing, and makes selections of buffers 5iJ for packets to be AAL multiplexed so that each QoS class band is filled.

When a buffer 5iJ for packets to be AAL multiplexed is selected, the AAL multiplexer 7H verifies for that buffer that no discarding has occurred with respect to a previously read CPS packet.

If the previous ATM cell has been normally ATM-multiplexed, the AAL multiplexer 7H AAL-multiplexes the CPS packets in the buffers 5iJ for packets to be AAL multiplexed ([so that they] are simultaneously copied to the recovery buffers 5iH).

When, on the other hand, the previous ATM cell has been discarded, the AAL multiplexer 7H once more reads out and AAL-multiplexes the CPS packets copied to the recovery buffers 5iH. Here, when there are smaller number of CPS packets in the recovery buffers 5iH (not enough for one ATM cell), and CPS packet(s) is present in the buffers 5iJ for packets to be AAL multiplexed, the former CPS packets to which the packet(s) present in those buffers 5iJ for packets to be AAL multiplexed have been added is AAL-multiplexed and simultaneously add-copied (not overwritten) to the recovery buffers 5iH in order to enhance AAL-multiplexing efficiency.

This operation is executed again and again so long as the ATM cell (AAL 2) is discarded repeatedly. However, at the point in time where it is judged in the AAL multiplexer 7H that a predetermined number of re-AAL-multiplexing operations has been exceeded, the CPS packet or packets in the recovery buffers 5iH are discarded without being re-AAL-multiplexed.

(N-3) Benefits of the Fourteenth Embodiment

Thus, in this fourteenth embodiment also, as in the twelfth embodiment, both the priority level and the ATM cell loss rate can be guaranteed, while realizing the additional benefit noted below.

That is, as based on the ATM cell multiplexing apparatus in this embodiment, the decision of whether to discard or not is made after determining the status of the CPS packets awaiting AAL multiplexing, wherefore wasteful discard operations can be eliminated.

(O) Fifteenth Embodiment (O-1) Apparatus Configuration

Figure 16:
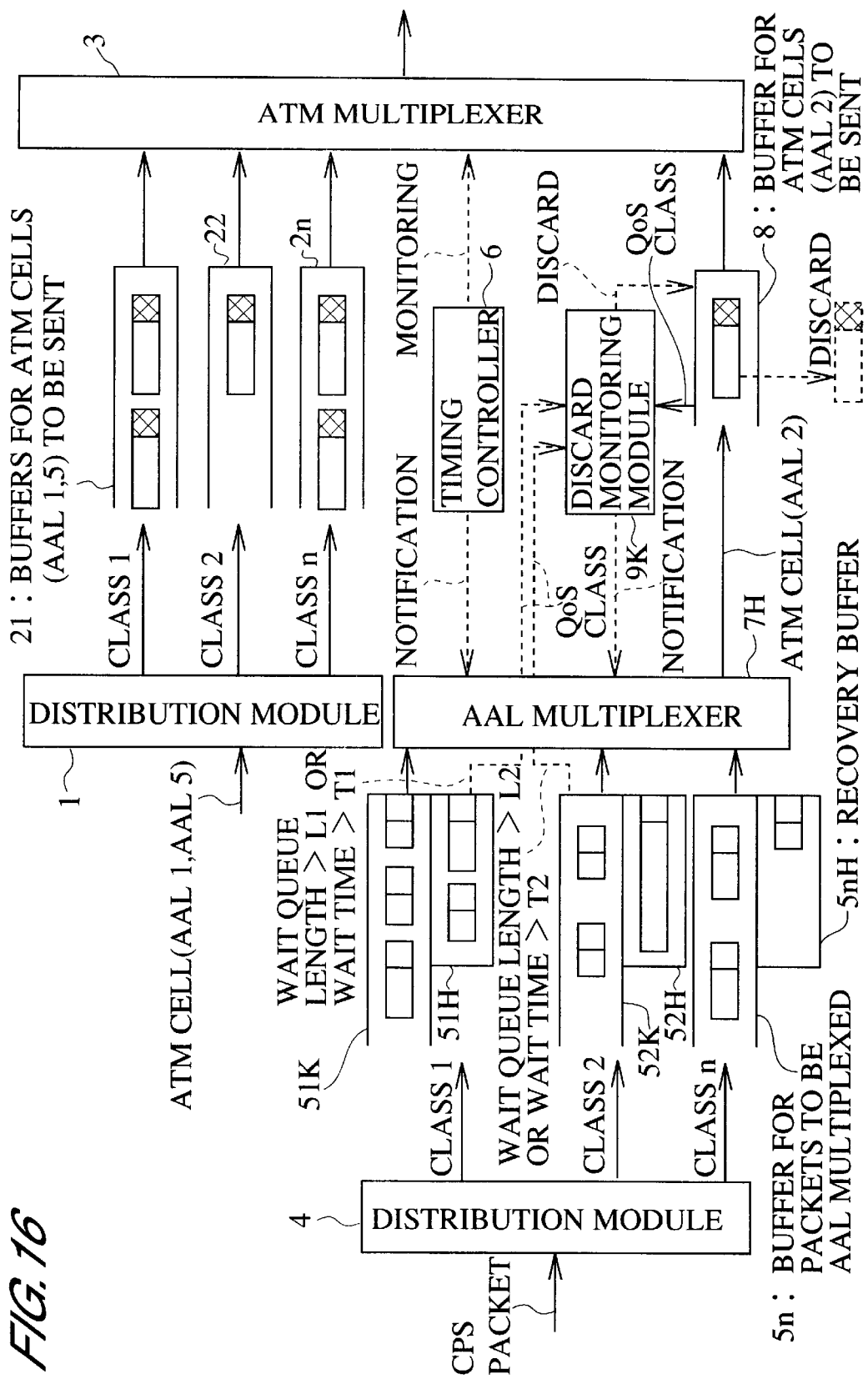
FIG. 16 is a functional block configuration diagram of a fifteenth embodiment of an ATM cell multiplexing apparatus according to the invention.

A functional block configuration diagram of an ATM cell multiplexing apparatus according to the fifteenth embodiment is shown in FIG. 16. In FIG. 16, parts that are the same as or that correspond to the parts shown in FIG. 13 are designated by the same or corresponding symbols, respectively. That is because the configuration of this fifteenth embodiment is based on the configuration of the twelfth embodiment.

In the case of this fifteenth embodiment also, as in the thirteenth embodiment and the fourteenth embodiment, an ATM cell multiplexing apparatus is described which performs discarding conditionally.

In this fifteenth embodiment, however, the number of conditions used is 2. That is, in this fifteenth embodiment, the configuration is made so that both wait queue length and wait time are used as determining conditions, and ATM cell discard is requested only when one of those conditions is fulfilled.

More specifically, it is determined that there is a high possibility of not being able to guarantee the QoS, and QoS class information is output, (1) when the length of the wait queue in a buffer 5iK (where i=1, 2, . . . n−1) for packets to be AAL multiplexed corresponding to a QoS class exceeds a critical level (i.e. the boundary value Li (where i=1, 2, . . . n−1) where the possibility arises of the QoS being unguaranteeable when the length of the wait queue exceeds that critical level) established separately for each buffer, or (2) when a wait time T in each buffer 5iK (where i=1, 2, . . . n−1) for packets to be AAL multiplexed corresponding to a QoS class exceeds a critical level (i.e. a boundary value Ti (where i=1, 2, . . . n−1) at which the possibility arises of being unable to guarantee the QoS when the wait time exceeds that critical level) established separately for each buffer.

Moreover, in this case also, there is no need for discarding if the priority in the buffer 5iK for packets to be AAL multiplexed that requested the discard is lower. Thereupon, in the discard monitoring module 9K in this embodiment, a function is provided wherewith, when QoS classes that constitute discard requests are provided from one or more of the buffers 5iK (where i=1, 2, . . . n−1) for packets to be AAL multiplexed, those are compared against the QoS class of the ATM cell held in the buffer 8 for ATM cells (AAL 2) to be sent to determine which is smaller (i.e. which has the higher priority).

The discard monitoring module 9K, thereupon, issues a discard command to the buffer 8 for ATM cells (AAL 2) to be discarded only if the QoS class in the buffer(s) 5iK for packets to be AAL multiplexed that issued the discard request is the smaller (i.e. when the priority therein is higher).

(O-2) Multiplexing Operations

The multiplexing operations in the ATM multiplex-transmission apparatus having such a configuration will be described next. For this embodiment, moreover, because of the characteristics resident in the AAL type-2 ATM multiplex-transmission functions, the description focuses on those multiplex-transmission operation.

The ATM multiplex-transmission apparatus, when AAL 2 user data (CPS packets) are input, sends these data to the CPS packet distribution module 4 and executes distribution processing based on the QoS class. The CPS packets are thus written, in the order input, into the corresponding buffers 5iK (=1, 2, . . . n−1) and 5n for packets to be multiplexed.

The timing controller 6 synchronizes the AAL multiprocessing timing and the ATM cell (AAL 2) transmission timing. When it is time to output ATM cells (AAL 2), the timing controller 6 sends a multiprocessing start request to the AAL multiplexer 7H, irrespective of the input traffic volume. The AAL multiplexer 7H makes the reading out of CPS packets and the multiple inclusion thereof in an ATM cell (AAL 2). That is, in the AAL multiplexer 7H, the CPS packets are read out in accordance with the processing start timing so notified, and the CPS packets readout are multiply included in an ATM cell (AAL 2).

When this is done, even when there are not enough CPS packets present in the buffers 5i (where i=1, 2, . . . n) for packets to be AAL multiplexed to sufficiently fill out an ATM cell payload, the AAL multiplexer 7H makes inclusion of the CPS packet or packets in a part of an ATM cell (AAL 2) and then sends that ATM cell (AAL 2) to the buffer 8 for ATM cells (AAL 2) to be sent.

When this is done, moreover, the AAL-multiplexed CPS packets are overwrite-copied to the recovery buffers 5iH (where i=1, 2, . . . n) (whereupon the CPS packets that were already there disappear).

After that, so long as the band demanded for the ATM multiplexer 3 does not exceed the band that can be supplied, the ATM cell (AAL 2) written into the buffer 8 for ATM cells (AAL 2) to be sent is read out and ATM-multiplexed with timing synchronized to that write operation.

However, when the demanded band does exceed the band that can be provided, and ATM cell multiprocessing in the ATM multiplexer 3 is being performed in the order of priority, the ATM cell (AAL 2) is not sent out unless its QoS class is higher than the QoS class of the other ATM cells (AAL 1 and 5).

Here, the ATM cell (AAL 2) written to the buffer 8 for ATM cells (AAL 2) to be sent is output immediately if its QoS class is higher than that of the other ATM cells (AAL 1 and 5). When, on the other hand, the ATM cell (AAL 2) has a QoS class that is lower than the QoS class of the other ATM cells (AAL 1 and 5), the ATM cell (AAL 2) is not read out and, accordingly, the waiting state continues as is.

Now, in parallel with this processing, the n−1 buffers 5iK (where i=1 to n−1) for packets to be AAL multiplexed, which exclude the buffer 5n for packets to be AAL multiplexed that has the lowest priority, perform monitoring to determine whether or not the wait queue length L or the wait time T at the current point in time exceeds a critical level (wait queue length Li, wait time Ti) determined for each QoS class and, when they judge that either the wait queue length or the wait time (i.e. one or the other) has exceeded a critical level, they communicate the QoS class information to the discard monitoring module 9K.

Needless to say, moreover, the output of QoS class information ceases (priority inheritance is not requested) as soon as both the CPS packet wait queue length and wait time fall below the critical levels.

The discard monitoring module 9K, as soon as it confirms from this QoS class notification that there has been a discard request, compares the QoS class so notified of with the QoS class of the ATM cell held in the buffer 8 for ATM cells (AAL 2) to be sent, and determines which is smaller.

Thereupon, when it is determined that the QoS class of the CPS packet awaiting AAL multiplexing is the smaller one (i.e. has the highest priority), the discard monitoring module 9K discards the ATM cell (AAL 2) from the buffer 8 for ATM cells to be sent and notifies the AAL multiplexer 7H that a discard has occurred.

When notification of that ATM cell discard is made, the AAL multiplexer 7H reads out the CPS packet held in the buffer 5iK for packets to be AAL multiplexed that issued the discard request (reading out the CPS packet with the highest priority when more than one discard request has been made), and AAL-multiplexes that CPS packet in ATM cell format.

As a result, the priority of the ATM cell held in the buffer 8 for ATM cells (AAL 2) to be sent becomes higher than the immediately previous priority. The ATM multiplexer 3 performs priority determination between the newly replaced ATM cell (AAL 2) and the other ATM cells (AAL 1 and 5), and, based on the results of that determination, performs ATM multiplexing in the prescribed order. When this is done, if the priority of the AAL type-2 ATM cell is higher than that of the other types of ATM cells (AAL 1 and 5), that AAL type-2 ATM cell will be transmitted without fail, even when the demanded band exceeds the band that can be provided.

Now, a characteristic of this AAL multiplexer 7H is that, when the AAL multiplexing operation associated with such discarding is completed, it awaits the arrival of the next AAL multiplexing timing, and makes selections of buffers 5iK for packets to be AAL multiplexed so that each QoS class band is filled.

When a buffer 5iK for packets to be AAL multiplexed is selected, the AAL multiplexer 7H verifies for that buffer that no discarding has occurred with respect to a previously read CPS packet.

If the previous ATM cell has been normally ATM-multiplexed, the AAL multiplexer 7H AAL-multiplexes the CPS packets in the buffers 5iK for packets to be AAL multiplexed (so that they are simultaneously copied to the recovery buffers 5iH).

When, on the other hand, the previous ATM cell has been discarded, the AAL multiplexer 7H once more reads out and AAL-multiplexes the CPS packets copied to the recovery buffers 5iH. Here, when there are smaller number of CPS packets in the recovery buffers 5iH (not enough for one ATM cell), and CPS packet(s) is present in the buffers 5iK for packets to be AAL multiplexed, the former CPS packets to which the CPS packet(s) present in those buffers 5iK for packets to be AAL multiplexed have been added is AAL-multiplexed and simultaneously add-copied (not overwritten) to the recovery buffers 5iH in order to enhance AAL-multiplexing efficiency.

This operation is executed again and again so long as the ATM cell (AAL 2) is discarded repeatedly. However, at the point in time where it is judged in the AAL multiplexer 7H that a predetermined number of re-AAL-multiplexing operations has been exceeded, the CPS packet or packets in the recovery buffers 5iH are discarded without being re-AAL-multiplexed.

(O-3) Benefits of the Fifteenth Embodiment

Thus, in this fifteenth embodiment also, as in the twelfth embodiment, both the priority level and the ATM cell loss rate can be guaranteed, while realizing the additional benefit noted below.

That is, as based on the ATM cell multiplexing apparatus in this embodiment, the decision of whether to discard or not is made after determining the status of the CPS packets awaiting AAL multiplexing, wherefore wasteful discard operations can be eliminated.

Furthermore, in the case in this embodiment, the configuration is made so that a discard is requested when conditions are such that either one of two judgment criteria is satisfied. Therefore, as compared to the case where that judgment is made on the bases of only one of those two conditions, the possibility of the occurrence of a priority inversion between an ATM cell of AAL type-2, on the one hand, and an ATM cell of AAL type-1 or type-5, on the other, can be significantly reduced.

(P) Sixteenth Embodiment (P-1) Apparatus Configuration

Figure 17:
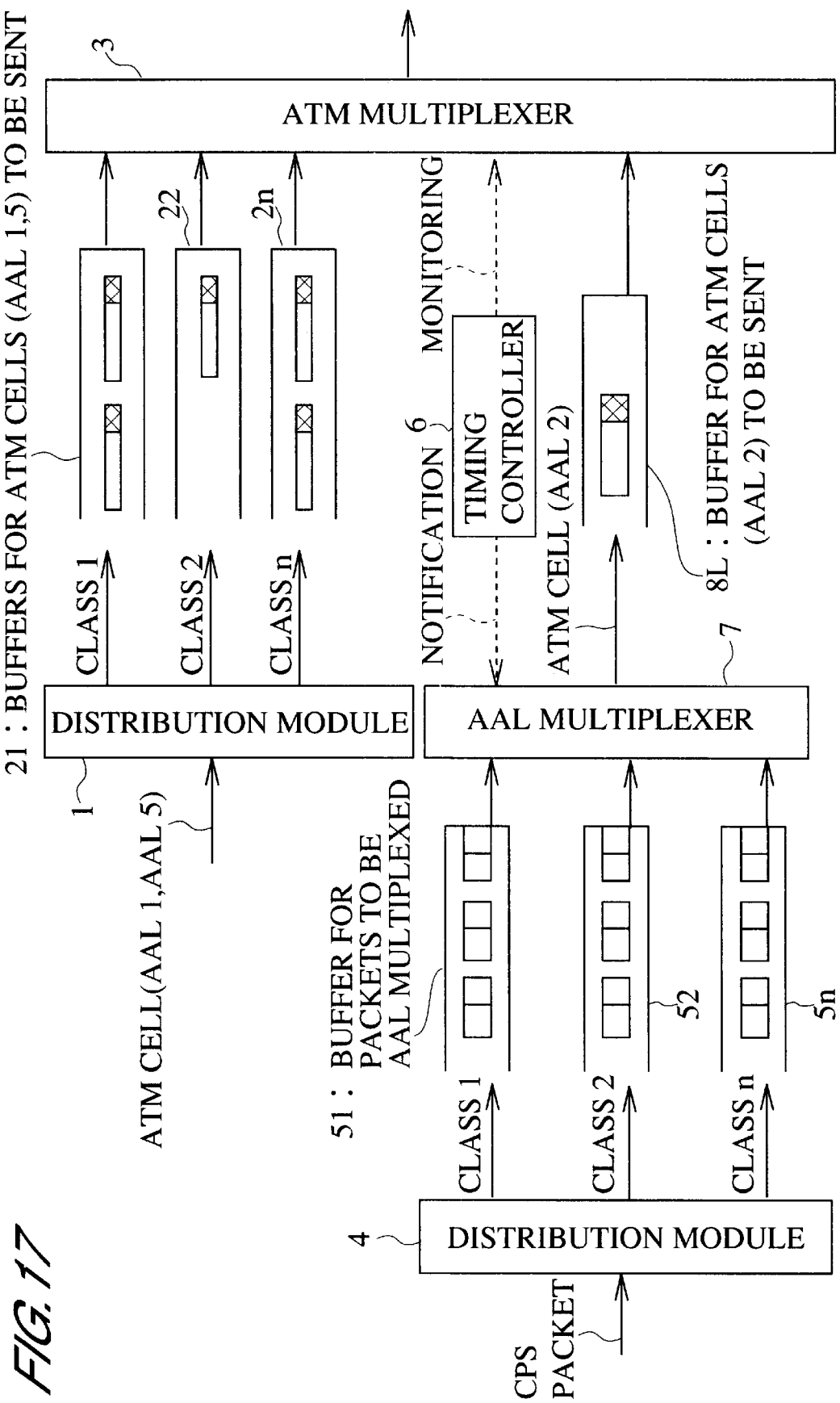
FIG. 17 is a functional block configuration diagram of a sixteenth embodiment of an ATM cell multiplexing apparatus according to the invention.

A functional block configuration diagram of an ATM cell multiplexing apparatus according to the sixteenth embodiment is shown in FIG. 17. In FIG. 17, parts that are the same as or that correspond to the parts shown in FIG. 1 are designated by the same or corresponding symbols, respectively.

The difference between this embodiment and the other embodiments is that, in the former, the QoS class of the ATM cells (AAL 2) is made a fixed value that is not dependent on (that, in other words, is independent of) the QoS class of the CPS packets being AAL-multiplexed.

More specifically, in the other embodiments, the QoS class of the ATM cells (AAL 2) is made to fluctuate according to the QoS class of the CPS packets prior to AAL-multiplexing (or to fluctuate according to the QoS class of the following CPS packets when priority inheritance or temporary priority inheritance is performed), while in this embodiment the QoS class of the ATM cells (AAL 2) is fixed (i.e. the priority is fixed). That is the difference.

The functional configuration of each part is now described with an emphasis on the configurational difference noted. The ATM cell multiplexing apparatus in this embodiment, moreover, is configured with a distribution module 1, buffers 2i (where i=1, 2, . . . n) for ATM cells (AAL 1 and 5) to be sent, an ATM multiplexer 3, a CPS packet distribution module 4, buffers 5i (where i=1, 2, . . . n) for packets to be AAL multiplexed, timing controller 6, AAL multiplexer 7, and buffer 8L for ATM cells (AAL 2) to be sent.

Of these components, the buffer 8L for ATM cells (AAL 2) to be sent is the configurational component peculiar to this embodiment. In this embodiment, the buffer 8L for ATM cells (AAL 2) to be sent sets the QoS class of the ATM cells (AAL 2) input from the AAL multiplexer 7 to the QoS class 1 which provides the highest priority, irrespective of the QoS class of the CPS packets making up the ATM cells (AAL 2). The value set, of course, need not be limited to this value, but it is preferable to set that value to QoS class 1 in the interest of guaranteeing service quality (QoS).

(P-2) Multiplexing Operations

The multiplexing operations in the ATM multiplex-transmission apparatus having such a configuration are described next. For this embodiment, moreover, because of the characteristics resident in the AAL type-2 ATM multiplex-transmission functions, the description focuses on those multiplex-transmission operation.

The ATM multiplex-transmission apparatus, when AAL type-2 user data (CPS packets) are input, sends these to the CPS packet distribution module 4 and executes distribution processing based on the QoS class. The CPS packets are thus written, in the order input, into the corresponding buffers 5 for packets to be multiplexed.

The timing controller 6 synchronizes the AAL multiprocessing timing and the ATM cell (AAL 2) transmission timing. When it is time to output ATM cells (AAL 2), irrespective of the input traffic volume, the timing controller 6 sends a multiprocessing start request to the AAL multiplexer 7. The AAL multiplexer 7 reads out the CPS packets, giving priority to those having a high QoS class, in accordance with the notified process start timing. After that, the AAL multiplexer 7 makes multiply inclusion of the CPS packets so read in an ATM cell (AAL 2) and sends that ATM cell (AAL 2) to the buffer 8L for ATM cells (AAL 2) to be sent.

When this is done, even when there are not enough CPS packets present in the buffers 5 for packets to be AAL multiplexed to sufficiently fill out an ATM cell payload, the AAL multiplexer 7 makes inclusion of the CPS packets in part of an ATM cell (AAL 2), and then sends that ATM cell (AAL 2) to the buffer 8L for ATM cells (AAL 2) to be sent.

The buffer 8L for ATM cells (AAL 2) to be sent, as soon as it reads in the ATM cell (AAL 2), changes the QoS class of that ATM cell (AAL 2) to the fixed value (here the Qos class 1) set beforehand.

As a result, the QoS class of this ATM cell (AAL 2) that belongs to the AAL type-2 will attain the state of highest priority, and be sent out on the transmission path in a priority manner, not only when the band demanded for the ATM multiplexer 3 does not exceed the band that can be supplied, but also when the band demanded does exceed the band that can be provided, and the multiprocessing of ATM cells in the ATM multiplexer 3 is performed in the order of priority. That is, no priority inversion will occur. Furthermore, because the ATM cell (AAL 2) QoS class is set so as to yield the highest priority, the service quality (QoS) of the CPS packets will always be satisfied.

(P-3) Benefits of the Sixteenth Embodiment

As based on the ATM cell multiplexing apparatus in this embodiment, as described in the foregoing, QoS classes for AAL type-2 ATM cells are fixed to the value of the highest priority determined irrespective of the QoS class prior to the AAL-multiplexing thereof, thereby making it possible to ATM-multiplex those ATM cells (AAL 2) on a priority basis.

In other words, in applications wherein real-time transmission is demanded or high QoS is required, ATM cells can be transmitted safely without fear of priority inversion. In audio applications, for example, the QoS class usually will have a higher priority than ordinary QoS classes. Accordingly, if the audio data are transmitted using ATM cells of AAL type-2 while ATM cells of AAL type-5 are used in sending ordinary packets, the audio data can be transmitted on a priority basis.

There are, moreover, different levels of audio data. If there are audio data of high priority (high QoS class) such as audio data transferred in emergency telephone calls or high-toll (high call quality) telephone calls, there are also audio data of low priority (low QoS class) such as the audio data transferred in low-toll telephone calls. Thus, even among data that is all audio data, adjustments in priority become necessary. Such adjustments can be effected with the AAL multiplexer 7. As based on this embodiment, in other words, an ATM cell multiplexing apparatus can be realized wherewith, while satisfying the QoS class demands of various kinds of audio data, those audio data can be transmitted with priority over other ordinary packets.

(Q) Seventeenth Embodiment (Q-1) Apparatus Configuration

Figure 18:
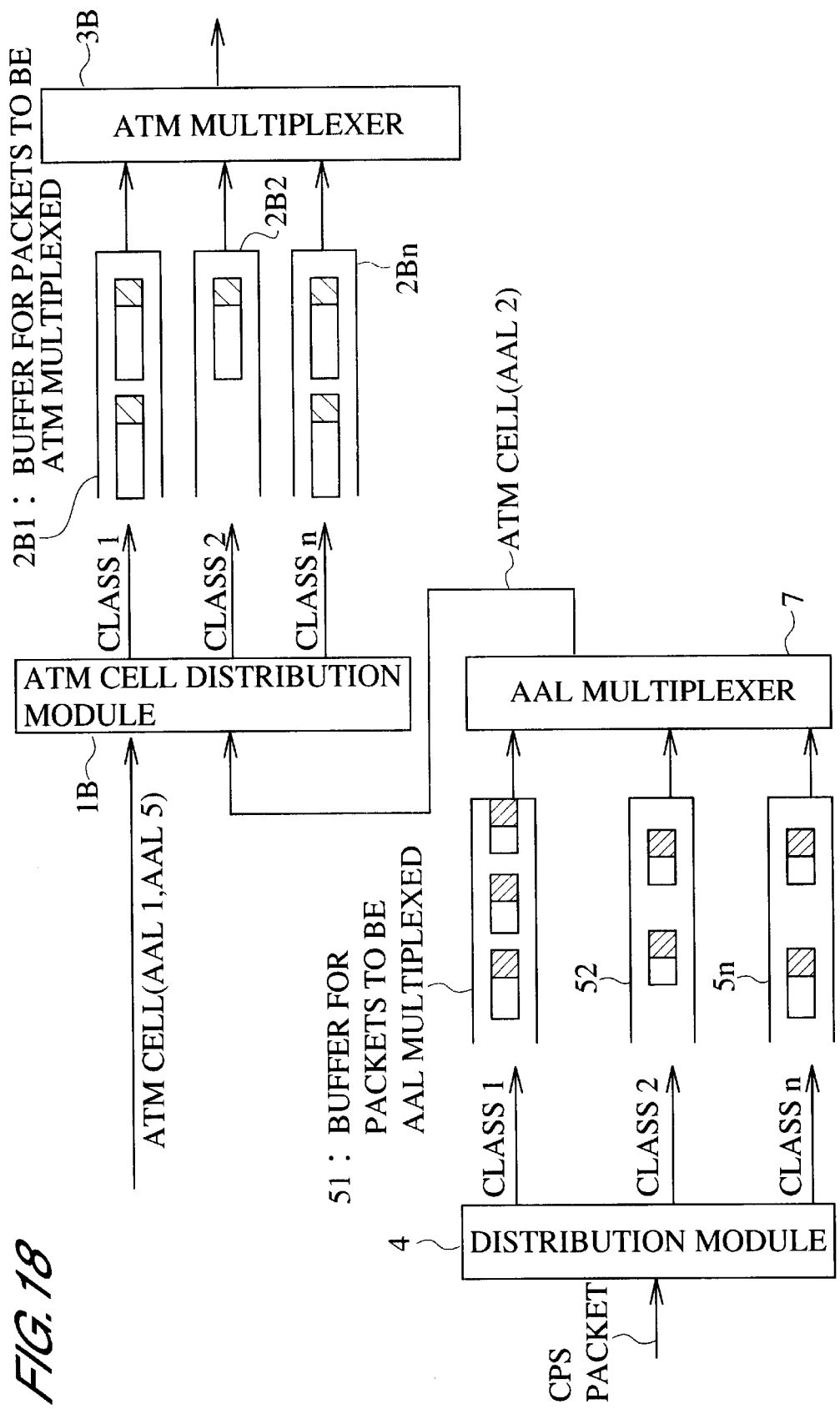
FIG. 18 is a functional block configuration diagram of a seventeenth embodiment of an ATM cell multiplexing apparatus according to the invention.

A functional block configuration diagram of an ATM cell multiplexing apparatus in a seventeenth embodiment is shown in FIG. 18. Here, in FIG. 17, parts that are the same as or that correspond to the parts shown in FIG. 1 are designated by the same or corresponding symbols, respectively.

The functional configuration of each component will be described below.

An ATM cell distribution module 1B is a distribution module for ATM cells of AAL type-1, type-2, and type-5. When ATM cells are input thereto, this distribution module 1B distributes those cells to corresponding buffers 2Bi (where i=1, 2, . . . n) for ATM cells (AAL 1, 2, and 5) to be multiplexed, according to the QoS class thereof. The QoS classes are the same as the classes of the CPS packets.

The buffers 2Bi (where i=1, 2, . . . n) for ATM cells (AAL 1, 2, and 5) to be multiplexed accumulate the AAL types-1, −2, and −5 by QoS class, and are provided in a number (n in the case shown in FIG. 1) corresponding to the number of QoS classes. These buffers 2Bi for packets to be multiplexed are configured as FIFO buffers that are capable of accommodating multiple ATM cells.

A CPS packet distribution module 4 is a distribution module for CPS packets of AAL type-2. When CPS packets are input thereto, this CPS packet distribution module 4 distributes those packets to corresponding buffers 5i (where i=1, 2, . . . n) for packets to be AAL multiplexed, according to the QoS class thereof.

The buffers 5i (where i=1, 2, . . . n) for packets to be AAL multiplexed are also provided in a number (n in the case shown in FIG. 1) corresponding to the number of QoS classes and are configured, for example, as FIFO buffers capable of accommodating multiple CPS packets.

An AAL multiplexer 7 constitutes means for determining which buffer 5i for packets to be AAL multiplexed reads out the CPS packets so that the band required by each QoS class is guaranteed, multiplexing the CPS packets read out in ATM cell format, and outputting those ATM cells to the ATM cell distribution module 1B.

The ATM multiplexer 3B constitutes means for multiplexing and outputting ATM cells input from the buffers 2Bi for ATM cells (AAL 1, 2, and 5) to be multiplexed. Here, when the demanded band does not exceed the band that can be provided, the ATM multiplexer 3B performs multiprocessing after determined or identifying the priorities among the classes of the ATM cells belonging to AAL type-1, type-2, and type-5. When, on the other hand, the demanded band does exceed the band that can be provided, the ATM-multiplexer 3B performs multiprocessing based on the priority.

(Q-2) Multiplexing Operations

The multiplexing operations in the ATM multiplexing apparatus having such a configuration will be described next. For this embodiment, moreover, because of the characteristics resident in the AAL type-2 ATM multiplex-transmission functions, the description focuses on those multiplex-transmission operation.

The ATM multiplex-transmission apparatus, when AAL type-2 user data (CPS packets) are input, sends those to the CPS packet distribution module 4 and executes distribution processing based on the QoS class. The CPS packets are thus written, in the order input, into the corresponding buffers 5i for packets to be multiplexed.

The AAL multiplexer 7 performs the reading of CPS packets according to the processing start timing, and performs the multiply inclusion of the CPS packets read out in ATM cells (AAL 2). One example of process timing would be in a case where an awaiting-multiplexing timer is started upon the arrival of a CPS packet, and then, when a predetermined awaiting-multiplexing time is reached, the accumulated quantity of CPS packets input to the buffer(s) exceeds 47 octets. At that time, even if there are not enough CPS packets in the buffer 5 for packets to be AAL-multiplexed to sufficiently fill out an ATM cell payload, the AAL multiplexer 7 performs the inclusion of inclusion of the CPS packets in a part of an ATM cell (AAL 2) and, thereafter, sends that ATM cell (AAL 2) to the ATM cell distribution module 1B.

When ATM cells (AAL 1, 2, 5) are input thereto, the ATM cell distribution module 1B distributes them to the corresponding buffer 2Bi for packets to be multiplexed, according to the QoS class thereof.

The buffers 2Bi for ATM cells to be multiplexed accumulate the distributed ATM cells (AAL 1, 2, 5) according to their QoS class.

When ATM cells are input thereto from the buffers 2Bi for ATM cells (AAL 1, 2, and 5) to be multiplexed, the ATM multiplexer 3B performs multiprocessing after determining whether or not the demanded band exceeds the band that can be provided. When the demanded band does not exceed the band that can be provided, the ATM multiplexer 3B performs multiprocessing after determining the priorities in the classes of the ATM cells belonging to AAL type-1, type-2, and type-5, whereas, when the demanded band does exceed the band that can be provided, it performs multiprocessing based on the priorities.

(Q-3) Benefits of the Seventeenth Embodiment

As based on the ATM cell multiplexing apparatus in this embodiment, as described in the foregoing, the configuration is such that CPS packets are input to buffers for packets to be ATM multiplexed which are common to AAL1, AAL2, and AAL5, without being accumulated in buffers that are exclusively for AAL-multiplexed ATM cells (AAL 2) to be sent. It is therefore possible therewith to safely eliminate the danger of ATM cells of relatively high priority (i.e. low QoS class) being made to wait for an unlimited time by ATM cells of relatively low priority (i.e. high QoS class) (and thus to prevent the occurrence of uncontrolled priority inversions).

Furthermore, not only is the unified control of AAL types 1, 2, and 5 made possible, but the QoS class (priority) can also be guaranteed.

(Q-4) Modified Embodiment

The embodiments above are described in terms of applications wherein multiplexing operations for ATM cells of different AAL types (i.e. AAL 1, 2, and 5) are controlled in a unified manner. However, these embodiments can also be applied in apparatuses for multiplex-transmitting ATM cells of AAL type-2 only.

(R) Other Embodiment

In the embodiments described in the foregoing, a timing controller is provided between the AAL multiplexer and the ATM multiplexer, but configurations may also be used wherein no timing controller is used. In such cases, it is preferable to use FIFO buffers capable of accommodating multiple ATM cells for the buffers for ATM cells (AAL 2) to be sent.

The embodiments above are described in terms of applications wherein multiplexing operations for ATM cells of different AAL types (i.e. AAL 1, 2, and 5) are controlled in a unified manner. However, these embodiments can also be applied in apparatuses for multiplex-transmitting ATM cells of AAL type-2 only.

As based on a first invention, an ATM cell multiplexing apparatus can be implemented wherewith uncontrolled priority inversions do not occur.

As based on a second invention, an ATM cell multiplexing apparatus can be implemented wherewith not only do uncontrolled priority inversions not occur, but the cell loss ratio can also be guaranteed.

As based on a third invention, an ATM cell multiplexing apparatus can be implemented wherewith the same benefits as obtained with the second invention are obtained with a simpler configuration.

As based on a fourth invention, an ATM cell multiplexing apparatus can be implemented wherewith the multiplexing efficiency is superior to that obtainable with the third invention.

As based on a fifth invention, an ATM cell multiplexing apparatus can be implemented wherewith the same benefits as obtained with the fourth invention are obtained with a simpler configuration.

As based on sixth, seventh, and eighth inventions, ATM cell multiplexing apparatuses can be implemented which are superior even to the fourth invention in terms of less wasteful multiplexing efficiency.

As based on ninth, tenth, and eleventh inventions, ATM cell multiplexing apparatuses can be implemented which are superior even to the fifth invention in terms of less wasteful multiplexing efficiency.

As based on a twelfth invention, an ATM cell multiplexing apparatus can be implemented wherewith not only do uncontrolled priority inversions not occur, but the cell loss ratio can also be guaranteed.

As based on thirteenth, fourteenth, and fifteenth inventions, ATM cell multiplexing apparatuses can be implemented which are superior even to the twelfth invention in terms of less wasteful multiplexing efficiency.

As based on sixteenth and seventeenth inventions, ATM cell multiplexing apparatuses having simple configurations can be implemented wherewith uncontrolled priority inversions do not occur.

What is claimed is:

1. An ATM cell multiplexing apparatus comprising:
   an AAL multiplexer for generating ATM cells from AAL type-2 user data;
   a buffer for cells to be sent for temporarily holding generated ATM cells; and
   an ATM multiplexer for ATM-multiplexing ATM cells read out from said buffer for cells to be sent; wherein:
   said buffer for cells to be sent comprises functions for discarding ATM cells when transmission waiting period therefor exceeds a time-over period; and
   said AAL multiplexer comprises functions for giving priority to user data having a quality of service higher than quality of service of discarded ATM cell user data, as priority of ATM cells to be generated immediately after discarding.

2. An ATM cell multiplexing apparatus comprising:
   AAL multiplexers for generating ATM cells from AAL type-2 user data; and
   buffers for cells to be sent for temporarily holding generated AAL type-2 ATM cells;
   wherein:
   said AAL multiplexers and said buffers for cells to be sent are comprised in a plurality of sets for each quality of service;
   ATM cells read out from said buffers for cells to be sent are ATM-multiplexed by said ATM multiplexers; and
   said buffers for cells to be sent, respectively, comprise functions for discarding ATM cells when transmission waiting periods thereof exceed time-over periods set for each quality of service.

3. An ATM cell multiplexing apparatus comprising:
a plurality of sets of buffers for packets to be AAL multiplexed provided for each quality of service;
an AAL multiplexer for generating ATM cells from AAL type-2 user data read out from said buffers for packets to be AAL multiplexed;
a buffer for cells to be sent for temporarily holding ATM cells generated;
an ATM multiplexer for ATM-multiplexing ATM cells read out from said buffers for cells to be sent;
a priority inheritance module for comparing quality of service notified of from said buffers for packets to be AAL multiplexed holding user data awaiting multiplexing against quality of service of ATM cell held in said buffer for cells to be sent, and, when quality of service of said user data is higher than quality of service of said ATM cell, causing quality of service of said user data to be inherited as quality of service of said ATM cell; and
a quality of service recovery module for determining multiplexing order and for restoring quality of service of ATM cells read into said ATM multiplexer from said buffer for cells to be sent to original pre-inheritance quality of service.

4. An ATM cell multiplexing apparatus comprising:
a plurality of sets of buffers for packets to be AAL multiplexed provided for each quality of service;
an AAL multiplexer for generating ATM cells from AAL type-2 user data read out from said buffers for packets to be AAL multiplexed;
a buffer for cells to be sent for temporarily holding ATM cells generated;
an ATM multiplexer for ATM-multiplexing ATM cells read out from said buffers for cells to be sent; and
a temporary priority inheritance module for comparing quality of service notified of from said plurality of sets of buffers for packets to be AAL multiplexed holding user data awaiting multiplexing against quality of service of ATM cell held in said buffer for cells to be sent, and, when quality of service of said user data is higher than quality of service of said ATM cell, notifying said ATM multiplexer of said quality of service of said user data as quality of service of said ATM cell.

5. The ATM cell multiplexing apparatus according to claim 3, wherein said buffers for packets to be AAL multiplexed notify said priority inheritance module of quality of service only when wait queue length for user data held therein exceeds a critical level set for each quality of service that corresponds to said user data.

6. The ATM cell multiplexing apparatus according to claim 3, wherein said buffers for packets to be AAL multiplexed notify said priority inheritance module of quality of service only when wait period for user data held therein exceeds a critical level set for each quality of service that corresponds to said user data.

7. The ATM cell multiplexing apparatus according to claim 3, wherein said buffers for packets to be AAL multiplexed notify said priority inheritance module of quality of service only when either wait queue length for user data held therein or wait period for user data held therein exceeds a respective corresponding critical level set for each quality of service that corresponds to said user data.

8. The ATM cell multiplexing apparatus according to claim 4, wherein said plurality of sets of buffers for packets to be AAL multiplexed notify said temporary priority inheritance module of quality of service only when a wait queue length for user data held therein exceeds a critical level set for each quality of service that corresponds to said user data.

9. The ATM cell multiplexing apparatus according to claim 4, wherein said plurality of sets of buffers for packets to be AAL multiplexed notify said temporary priority inheritance module of quality of service only when wait period for user data held therein exceeds a critical level set for each quality of service that corresponds to said user data.

10. The ATM cell multiplexing apparatus according to claim 4, wherein said plurality of sets of buffers for packets to be AAL multiplexed notify said temporary priority inheritance module of quality of service only when either wait queue length for user data held therein or wait period for user data held therein exceeds a respective corresponding critical level set for each quality of service that corresponds to said user data.

11. An ATM cell multiplexing apparatus comprising:
a plurality of sets of buffers for packets to be AAL multiplexed provided for each quality of service;
a plurality of sets of recovery buffers forming pairs with said buffers for packets to be AAL multiplexed;
an AAL multiplexer for generating ATM cells from AAL type-2 user data read out from said buffers for packets to be AAL multiplexed;
a buffer for cells to be sent for temporarily holding ATM cells generated; and
an ATM multiplexer for ATM-multiplexing ATM cells read out from said buffers for cells to be sent; wherein:
said buffer for cells to be sent comprises functions for discarding ATM cells when transmission wait period therefor exceeds a time-over period; and
said AAL multiplexer comprises:
functions for giving priority to user data having a quality of service higher than quality of service of discarded ATM cell user data, as priority of ATM cells to be generated immediately after discarding; and
functions for, when generating next ATM cell from user data having same quality of service as quality of service of discarded ATM cell, reading out same user data as discarded ATM cell from recovery buffer corresponding to that quality of service, and again generating same ATIM cell from said user data.

12. An ATM cell multiplexing apparatus comprising:
a plurality of sets of buffers for packets to be AAL multiplexed provided for each quality of service;
a plurality of sets of recovery buffers forming pairs with said buffers for packets to be AAL multiplexed;
an AAL multiplexer for generating ATM cells from AAL type-2 user data read out from said buffers for packets to be AAL multiplexed;
a buffer for cells to be sent for temporarily holding ATM cells generated; and
an ATM multiplexer for ATM-multiplexing ATM cells read out from said buffers for cells to be sent; wherein:
said buffer for cells to be sent comprises functions for discarding ATM cell currently held therein when quality of service of buffer for packets to be AAL multiplexed requesting ATM cell discard is higher than quality of service of said ATM cell held therein;
said buffers for packets to be AAL multiplexed each comprises functions for requesting said buffer for cells to be sent to discard ATM cell only when wait queue length for user data held in that buffer for packets to be AAL multiplexed exceeds a critical level set for each quality of service corresponding to that user data; and said AAL multiplexer comprises:

functions for giving priority to user data having a quality of service higher than quality of service of discarded ATM cell user data, as priority of ATM cell to be generated immediately after discarding; and functions for, when generating next ATM cell from user data having same quality of service as quality of service of discarded ATM cell, reading out same user data as discarded ATM cell from recovery buffer corresponding to that quality of service, and again generating same ATM cell from said user data.

13. An ATM cell multiplexing apparatus comprising:

a plurality of sets of buffers for packets to be AAL multiplexed provided for each quality of service;

a plurality of sets of recovery buffers forming pairs with said buffers for packets to be AAL multiplexed;

an AAL multiplexer for generating ATM cells from AAL type-2 user data read out from said buffers for packets to be AAL multiplexed;

a buffer for cells to be sent for temporarily holding ATM cells generated; and an ATM multiplexer for ATM-multiplexing ATM cells read out from said buffers for cells to be sent; wherein:

said buffer for cells to be sent comprises functions for discarding ATM cell currently held therein when quality of service of buffer for packets to be AAL multiplexed requesting ATM cell discard is higher than quality of service of said ATM cell held therein;

said buffers for packets to be AAL multiplexed each comprises functions for requesting said buffer for cells to be sent to discard ATM cell only when wait time for user data held in that buffer for packets to be AAL multiplexed exceeds a critical level set for each quality of service corresponding to that user data; and said AAL multiplexer comprises:

functions for giving priority to user data having a quality of service higher than quality of service of discarded ATM cell user data, as priority of ATM cell to be generated immediately after discarding; and functions for, when generating next ATM cell from user data having same quality of service as quality of service of discarded ATM cell, reading out same user data as discarded ATM cell from recovery buffer corresponding to that quality of service, and again generating same ATM cell from said user data.

14. An ATM cell multiplexing apparatus comprising:

a plurality of sets of buffers for packets to be AAL multiplexed provided for each quality of service;

a plurality of sets of recovery buffers forming pairs with said buffers for packets to be AAL multiplexed;

an AAL multiplexer for generating ATM cells from AAL type-2 user data read out from said buffers for packets to be AAL multiplexed;

a buffer for cells to be sent for temporarily holding ATM cells generated; and an ATM multiplexer for ATM-multiplexing ATM cells read out from said buffers for cells to be sent; wherein:

said buffer for cells to be sent comprises functions for discarding ATM cell currently held therein when quality of service of buffer for packets to be AAL multiplexed requesting ATM cell discard is higher than quality of service of said ATM cell held therein;

said buffers for packets to be AAL multiplexed each comprises functions for requesting said buffer for cells to be sent to discard ATM cell only when either wait queue length for user data held in that buffer for packets to be AAL multiplexed or wait time for user data held therein exceeds a critical level set respectively for each quality of service corresponding to that user data; and said AAL multiplexer comprises:

functions for giving priority to user data having a quality of service higher than quality of service of discarded ATM cell user data, as priority of ATM cell to be generated immediately after discarding; and functions for, when generating next ATM cell from user data having same quality of service as quality of service of discarded ATM cell, reading out same user data as discarded ATM cell from recovery buffer corresponding to that quality of service, and again generating same ATM cell from said user data.

15. An ATM cell multiplexing apparatus comprising:

packet distribution means for outputting input packets after distributing them in quality classes;

packet accumulation means, connected to said packet distribution means, for accumulating packets in each of said quality classes and outputting them according to read-out timing;

packet multiplexing means, connected to said packet accumulation means, for multiplexing packets into ATM cells and outputting same;

ATM cell distribution means, connected to said packet multiplexing means, for outputting ATM cells after distributing them in quality classes;

ATM cell accumulation means, connected to said ATM cell distribution means, for accumulating ATM cells in quality classes and outputting them according to read-out timing; and ATM cell multiplexing means, connected to said ATM cell accumulation means, and for multiplexing ATM cells and outputting same.

16. The ATM cell multiplexing apparatus according to claim 15, wherein said packets are AAL type-2 CPS packets.

17. The ATM cell multiplexing apparatus according to claim 15, wherein said ATM cell distribution means take input AAL type-1, type-2, and type-5 ATM cells and distribute them in said quality classes.

18. The ATM cell multiplexing apparatus according to claim 15 wherein quality class or classes handled by said packet distribution means and said ATM cell distribution means are same class or classes.

19. An ATM cell multiplexing method wherein:

input CPS packets are distributed by packet distribution means based on quality classes;

CPS packets distributed on basis of said quality classes are accumulated in packet accumulation means in order input;

said CPS packets are read out from said packet accumulation means and multiplexed in ATM cells by packet multiplexing means;

AAL type-2 ATM cells wherein said CPS packets are multiplexed and distributed on basis of quality classes by ATM cell distribution means together with ATM cells of other AAL types;

ATM cells distributed on basis of said quality classes are accumulated in ATM cell accumulation means;

said ATM cells are read out from said ATM cell accumulation means and multiplexed by ATM cell multiplexing means; and an awaiting-multiplexing timer is started upon arrival of a CPS packet, and, when a predetermined awaiting-multiplexing time is reached, or when quantity of input CPS packets accumulated in said packet accumulation means sufficiently fills an ATM cell payload, said CPS packets are read out from said packet accumulation means and multiplexed in an ATM cell.

20. The ATM cell multiplexing method according to claim 19, wherein, when ATM cells are input to ATM cell multiplexing means from said ATM cell accumulation means, multiprocessing is performed after determining priority or priorities among classes of ATM cells belonging to AAL type-1, type-2, or type-5 in cases where demanded band does not exceed band that can be provided, and multiprocessing is performed based on priorities in cases where demanded band does exceed band that can be provided.

21. The ATM cell multiplexing method according to claim 19, wherein, when ATM cells are input to ATM cell multiplexing means from said ATM cell accumulation means, multiprocessing is performed after determining priority or priorities among classes of ATM cells belonging to AAL type-1, type-2, or type-5 in cases where demanded band does not exceed band that can be provided, and multiprocessing is performed based on priorities in cases where demanded band does exceed band that can be provided.

* * * * *